(12) United States Patent
Chiyo

(10) Patent No.: US 11,409,905 B2
(45) Date of Patent: Aug. 9, 2022

(54) MANAGEMENT APPARATUS, MANAGEMENT SYSTEM, SERVER SYSTEM, REMOTE DEVICE MANAGEMENT SYSTEM, AND DATA DELETION REQUEST METHOD

(71) Applicant: Ricoh Company, Ltd., Tokyo (JP)

(72) Inventor: Naoki Chiyo, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 380 days.

(21) Appl. No.: 16/809,633

(22) Filed: Mar. 5, 2020

(65) Prior Publication Data
US 2020/0302083 A1 Sep. 24, 2020

(30) Foreign Application Priority Data
Mar. 20, 2019 (JP) .............................. JP2019-052343

(51) Int. Cl.
*H04L 29/06* (2006.01)
*G06F 21/62* (2013.01)
*H04L 12/28* (2006.01)

(52) U.S. Cl.
CPC .. *G06F 21/6245* (2013.01); *G06F 2221/2143* (2013.01); *H04L 12/28* (2013.01)

(58) Field of Classification Search
CPC ......... G06F 21/6245; G06F 2221/2143; H04L 12/28
USPC ......................................................... 726/26
See application file for complete search history.

(56) References Cited

U.S. PATENT DOCUMENTS

| 11,113,415 | B1* | 9/2021 | Amico ................ G06F 11/1446 |
| 2006/0293940 | A1 | 12/2006 | Tsyganskiy et al. |
| 2007/0143827 | A1* | 6/2007 | Nicodemus ......... G06F 21/6218 726/2 |
| 2009/0198746 | A1* | 8/2009 | Hintze .................... G06F 16/00 |
| 2010/0299737 | A1 | 11/2010 | Ueno |
| 2011/0004725 | A1* | 1/2011 | Tanaka ................. G06F 21/805 711/103 |
| 2012/0284637 | A1 | 11/2012 | Boyer et al. |
| 2014/0223124 | A1 | 8/2014 | Fujii et al. |

(Continued)

FOREIGN PATENT DOCUMENTS

| JP | 2009-020720 | 1/2009 |
| JP | 2014-170525 | 9/2014 |

OTHER PUBLICATIONS

Extended European Search Report dated Jun. 25, 2020 in European Patent Application No. 20160175.4, 8 pages.

(Continued)

*Primary Examiner* — Shin-Hon (Eric) Chen
(74) *Attorney, Agent, or Firm* — Xsensus LLP

(57) ABSTRACT

A management apparatus, a management system, a server system, a remote device management system, and a data deletion request method. The management apparatus acquires apparatus identification information for identifying a processing apparatus storing device event data indicating content of an event executed by a device to be managed from one or more processing apparatuses that process the device event data and requests deletion of the device event data to the processing apparatus identified by the acquired apparatus identification information in response to a device event data deletion request.

12 Claims, 54 Drawing Sheets

(56) References Cited

U.S. PATENT DOCUMENTS

| | | |
|---|---|---|
| 2015/0263909 A1 | 9/2015 | Okubo |
| 2016/0292937 A1 | 10/2016 | Taylor et al. |
| 2017/0366342 A1* | 12/2017 | Gehrmann .......... H04W 12/041 |
| 2018/0373891 A1* | 12/2018 | Barday ............... G06F 11/3476 |
| 2019/0156053 A1* | 5/2019 | Vogel .................. G06F 21/6245 |
| 2019/0303610 A1* | 10/2019 | Bodegas Martinez ...................... G06F 16/2456 |
| 2020/0119904 A1* | 4/2020 | Philyaw ............... H04L 9/0637 |
| 2020/0293651 A1* | 9/2020 | Meyer ...................... G06N 3/08 |

OTHER PUBLICATIONS

European Office Action dated Jan. 18, 2022, issued in corresponding European Application No. 20160175.4, 6 pages.

\* cited by examiner

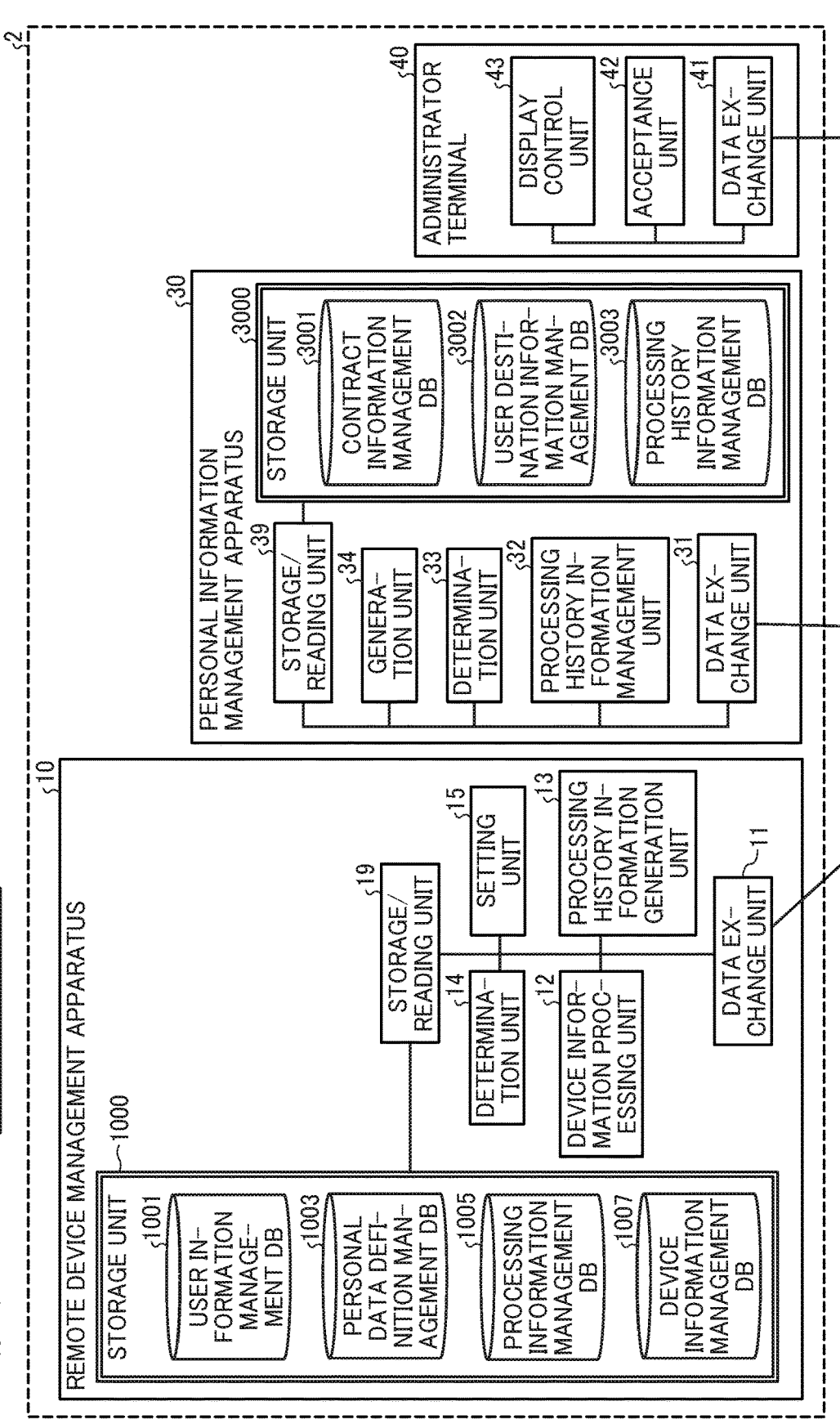
FIG. 9A  FIG. 9 | FIG. 9A | FIG. 9B |

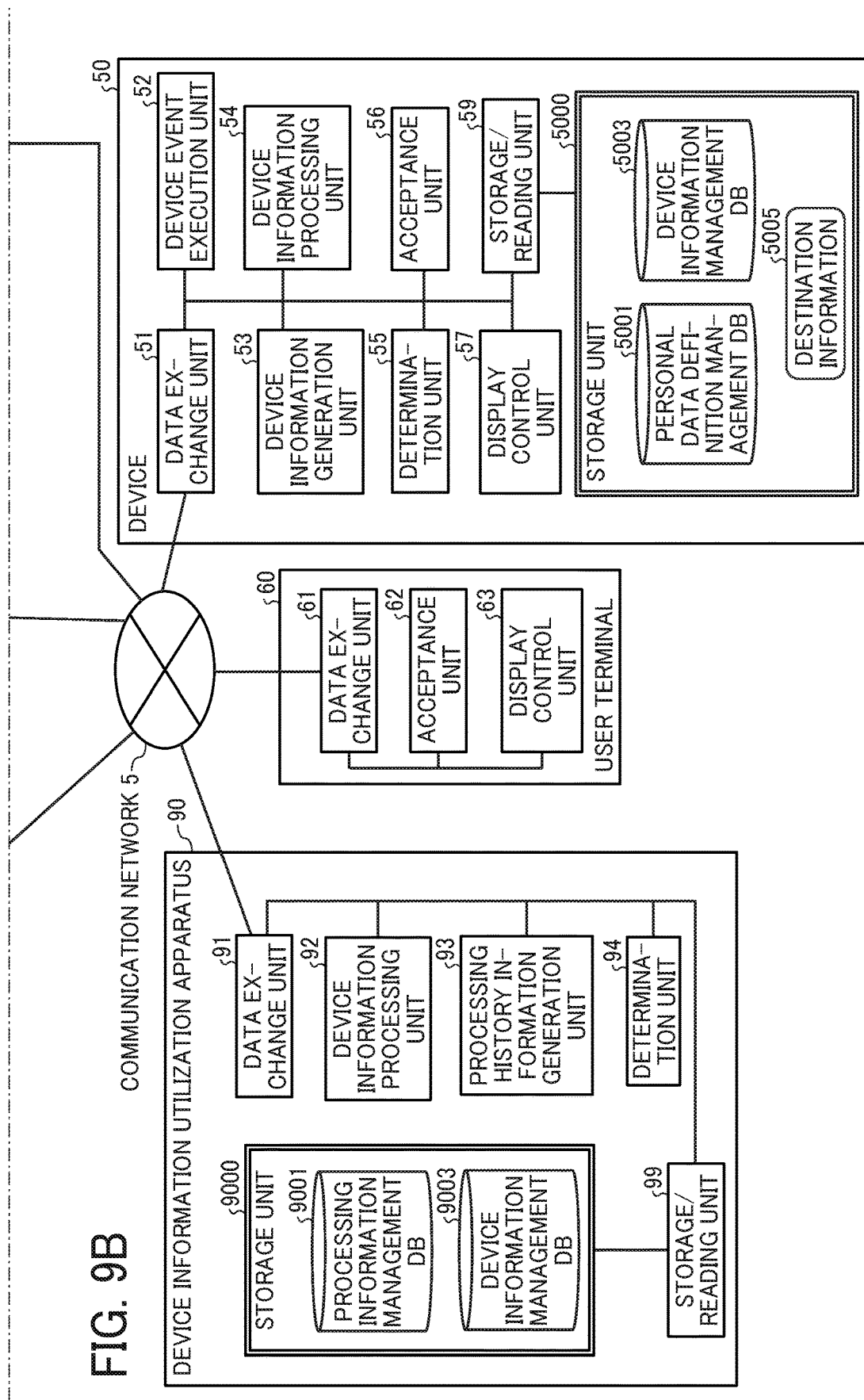

FIG. 10

USER INFORMATION MANAGEMENT TABLE

| CUSTOMER ID | USER ID |
|---|---|
| AAA | AAA0001 |
| | AAA0002 |
| | AAA0003 |
| | ... |
| BBB | BBB0001 |
| | BBB0002 |
| | ... |
| ... | ... |

FIG. 11

PERSONAL DATA DEFINITION MANAGEMENT TABLE

EU    JP

| PERSONAL DATA DEFINITION |
|---|
| DEVICE ADMINISTRATOR NAME |
| TELEPHONE NUMBER |
| ADDRESS |
| IP ADDRESS |
| USER ID: ALL |
| ... |

FIG. 12A

PROCESSING INFORMATION MANAGEMENT TABLE
(REMOTE DEVICE MANAGEMENT APPARATUS 10a)

| DESTINATION NAME | DESTINATION INFORMATION | PROCESSING |
|---|---|---|
| DEVICE INFORMATION UTILIZATION APPARATUS 90a | remoteA.co.jp | STORAGE/ TRANSFER |
| ... | ... | ... |

FIG. 12B

PROCESSING INFORMATION MANAGEMENT TABLE
(DEVICE INFORMATION UTILIZATION APPARATUS 90a)

| DESTINATION NAME | DESTINATION INFORMATION | PROCESSING |
|---|---|---|
| DEVICE INFORMATION UTILIZATION APPARATUS 90b | remoteB.co.eu | TRANSFER |
| ... | ... | ... |

FIG. 12C

PROCESSING INFORMATION MANAGEMENT TABLE
(DEVICE INFORMATION UTILIZATION APPARATUS 90b)

| DESTINATION NAME | DESTINATION INFORMATION | PROCESSING |
|---|---|---|
| - | - | STORAGE |
| ... | ... | ... |

FIG. 12D

PROCESSING INFORMATION MANAGEMENT TABLE
(REMOTE DEVICE MANAGEMENT APPARATUS 10b)

| DESTINATION NAME | DESTINATION INFORMATION | PROCESSING |
|---|---|---|
| - | - | STORAGE |
| ... | ... | ... |

FIG. 13A

CONTRACT INFORMATION MANAGEMENT TABLE

| DEVICE NAME | DEVICE ID | MODEL NUMBER ID | CUSTOMER ID |
|---|---|---|---|
| MFP 200 | MP30 | MP30-1234 | AAA |
| | | MP30-1241 | AAA |
| | | MP30-4359 | AAA |
| | | ... | ... |
| IWB 300 | IWB45 | IWB45-5678 | BBB |
| | | IWB45-7896 | BBB |
| | | ... | ... |
| | ... | ... | ... |

FIG. 13B

USER DESTINATION INFORMATION MANAGEMENT TABLE

| USER ID | USER DESTINATION INFORMATION |
|---|---|
| AAA0001 | XXX.co.jp |
| AAA0001 | appA「ID；0101XX」 |
| AAA0002 | https://www.XXX.co.jp/ |
| AAA0003 | https://128.34.876.XX/XXX |
| BBB0001 | XXX.co.jp |
| BBB0001 | appA「ID；0101XX」 |
| BBB0002 | YYY@XXX.com |
| ... | ... |

FIG. 14

PROCESSING HISTORY INFORMATION MANAGEMENT TABLE

| DATA IDENTIFICATION INFORMATION | | | PROCESSING SERVER INFORMATION | | | TRANSMISSION DESTINATION INFORMATION | | | PROCESSING HISTORY | PROCESSING TIME |
|---|---|---|---|---|---|---|---|---|---|---|
| DEVICE NAME | DEVICE ID | MODEL NUMBER ID | DEVICE INFORMATION ID | SERVER NAME | DESTINATION INFORMATION | AREA | SERVER NAME | DESTINATION INFORMATION | AREA | | |
| MFP 200 | MP30 | MP30-1234 | MP30-1234_20180829 2255 | REMOTE DEVICE MANAGEMENT APPARATUS 10a | manageA.co.jp | JP | DEVICE INFORMATION UTILIZATION APPARATUS 90a | remoteA.co.jp | JP | STORAGE/ TRANSFER | 08292018 22:55 |
| MFP 200 | MP30 | MP30-1234 | MP30-1234_20180829 2355 | DEVICE INFORMATION UTILIZATION APPARATUS 90a | remoteA.co.jp | JP | DEVICE INFORMATION UTILIZATION APPARATUS 90b | remoteB.co.eu | EU | TRANSFER | 08292018 23:55 |
| MFP 200 | MP30 | MP30-1234 | MP30-1234_20180829 2358 | DEVICE INFORMATION UTILIZATION APPARATUS 90b | remoteB.co.eu | EU | — | — | — | STORAGE | 08292018 23:58 |
| IWB 300 | IWB45 | IWB45-5678 | IWB45-5678_20180829 2359 | REMOTE DEVICE MANAGEMENT APPARATUS 10b | manageB.co.us | US | — | — | — | STORAGE | 08292018 23:59 |
| ... | ... | ... | ... | ... | ... | ... | ... | ... | ... | ... | ... |

FIG. 16

DEVICE EVENT DATA

| | ITEM | DATA | EVENT OCCURRENCE TIME |
|---|---|---|---|
| DEVICE SPECIFIC INFORMATION | DEVICE ID | MP30 | |
| | MODEL NUMBER ID | MP30-1234 | |
| | DEVICE ADMINISTRATOR NAME | AAAA BBBB | |
| | TELEPHONE NUMBER | 012-3456-XXXX | |
| | ADDRESS | OHTA, TOKYO | |
| | DEVICE SOFTWARE VERSION | 1.20.34 | |
| | IP ADDRESS | 123.123.123.XXX | |
| EVENT HISTORY INFORMATION | TONER INFORMATION | CYAN: LOW QUANTITY | 08292018 22:54 |
| | USER ID: AAA0001 USER NAME | CCCC DDDD | 08292018 22:54 |
| | USER ID: AAA0001 COUNTER | COPY: 100SHEETS PRINT: 100SHEETS | 08292018 22:54 |

FIG. 18

| DEVICE INFORMATION | | | | PERSONAL DATA INFORMATION | |
|---|---|---|---|---|---|
| | ITEM | DATA | EVENT OCCURRENCE TIME | PERSONAL FLAG | USER INFORMATION |
| DEVICE SPECIFIC INFORMATION | DEVICE ID | MP30 | | – | – |
| | MODEL NUMBER ID | MP30-1234 | | – | – |
| | DEVICE ADMINISTRATOR NAME | AAAA BBBB | | SET | MP30-1234 ; AAA |
| | TELEPHONE NUMBER | 012-3456-XXXX | | SET | MP30-1234 ; AAA |
| | ADDRESS | OHTA, TOKYO | | SET | MP30-1234 ; AAA |
| | DEVICE SOFTWARE VERSION | 1.20.34 | | – | – |
| | IP ADDRESS | 123.123.123.XXX | | SET | MP30-1234 ; AAA |
| EVENT HISTORY INFORMATION | TONER INFORMATION | CYAN: LOW QUANTITY | 08292018 22:54 | – | – |
| | USER ID: AAA0001 USER NAME | CCCC DDDD | 08292018 22:54 | SET | MP30-1234 ; AAA0001 |
| | USER ID: AAA0001 COUNTER | COPY: 100SHEETS PRINT: 100SHEETS | 08292018 22:54 | SET | MP30-1234 ; AAA0001 |

FIG. 21A

PROCESSING HISTORY INFORMATION

| DATA IDENTIFICATION INFORMATION | | | | PROCESSING SERVER INFORMATION | | | TRANSMISSION DESTINATION INFORMATION | | | PROCESSING HISTORY | PROCESSING TIME |
|---|---|---|---|---|---|---|---|---|---|---|---|
| DEVICE NAME | DEVICE ID | MODEL NUMBER ID | DEVICE INFORMATION ID | SERVER NAME | DESTINATION INFORMATION | AREA | SERVER NAME | DESTINATION INFORMATION | AREA | | |
| MFP 200 | MP30 | MP30-1234 | MP30-1234_20180829 2255 | REMOTE DEVICE MANAGEMENT APPARATUS 10a | manageA.co.jp | JP | DEVICE INFORMATION UTILIZATION APPARATUS 90a | remoteA.co.jp | JP | STORAGE/ TRANSFER | 08292018 22:55 |
| MFP 200 | MP30 | MP30-1234 | MP30-1234_20180829 2355 | DEVICE INFORMATION UTILIZATION APPARATUS 90a | remoteA.co.jp | JP | DEVICE INFORMATION UTILIZATION APPARATUS 90b | remoteB.co.eu | EU | TRANSFER | 08292018 23:55 |
| MFP 200 | MP30 | MP30-1234 | MP30-1234_20180829 2358 | DEVICE INFORMATION UTILIZATION APPARATUS 90b | remoteB.co.eu | EU | — | — | — | STORAGE | 08292018 23:58 |

FIG. 21B

PROCESSING HISTORY INFORMATION

| DATA IDENTIFICATION INFORMATION | | | | PROCESSING SERVER INFORMATION | | | TRANSMISSION DESTINATION INFORMATION | | | PROCESSING HISTORY | PROCESSING TIME |
|---|---|---|---|---|---|---|---|---|---|---|---|
| DEVICE NAME | DEVICE ID | MODEL NUMBER ID | DEVICE INFORMATION ID | SERVER NAME | DESTINATION INFORMATION | AREA | SERVER NAME | DESTINATION INFORMATION | AREA | | |
| IWB 300 | IWB45 | IWB45-5678 | IWB45-5678_20180829 2359 | REMOTE DEVICE MANAGEMENT APPARATUS 10b | manageB.co.us | US | — | — | — | STORAGE | 08292018 23:59 |

FIG. 27

| DEVICE INFORMATION | | | | PERSONAL DATA INFORMATION | |
|---|---|---|---|---|---|
| | ITEM | DATA | EVENT OCCURRENCE TIME | PERSONAL FLAG | USER INFORMATION |
| DEVICE SPECIFIC INFORMATION | DEVICE ID | MP30 | | – | – |
| | MODEL NUMBER ID | MP30-1234 | | – | – |
| | DEVICE ADMINISTRATOR NAME | AAAA BBBB | | SET | MP30-1234 ; AAA |
| | TELEPHONE NUMBER | 012-3456-XXXX | | SET | MP30-1234 ; AAA |
| | ADDRESS | OHTA, TOKYO | | SET | MP30-1234 ; AAA |
| | DEVICE SOFTWARE VERSION | 1.20.34 | | – | – |
| | IP ADDRESS | 123.123.123.XXX | | SET | MP30-1234 ; AAA |
| EVENT HISTORY INFORMATION | TONER INFORMATION | CYAN: LOW QUANTITY | 08292018 22:54 | – | – |
| | USER ID: AAA0001 USER NAME | ********* | ***** | *** | ******** |
| | USER ID: AAA0001 COUNTER | ********* | ***** | *** | ******** |

FIG. 28

PROCESSING HISTORY INFORMATION MANAGEMENT TABLE

| DATA IDENTIFICATION INFORMATION ||| PROCESSING SERVER INFORMATION |||| TRANSMISSION DESTINATION INFORMATION |||| PROCESSING HISTORY | PROCESSING TIME |
|---|---|---|---|---|---|---|---|---|---|---|---|
| DEVICE NAME | DEVICE ID | MODEL NUMBER ID | DEVICE INFORMATION ID | SERVER NAME | DESTINATION INFORMATION | AREA | SERVER NAME | DESTINATION INFORMATION | AREA | | |
| MFP 200 | MP30 | MP30-1234 | MP30-1234_ 201808292255 | REMOTE DEVICE MANAGEMENT APPARATUS 10a | manageA.co.jp | JP | DEVICE INFORMATION UTILIZATION APPARATUS 90a | remoteA.co.jp | JP | STORAGE/ TRANSFER | 08292018 22:55 |
| MFP 200 | MP30 | MP30-1234 | MP30-1234_ 201808292355 | DEVICE INFORMATION UTILIZATION APPARATUS 90a | remoteA.co.jp | JP | DEVICE INFORMATION UTILIZATION APPARATUS 90b | remoteB.co.eu | EU | TRANSFER | 08292018 23:55 |
| MFP 200 | MP30 | MP30-1234 | MP30-1234_ 201808292358 | DEVICE INFORMATION UTILIZATION APPARATUS 90b | remoteB.co.eu | EU | — | — | — | STORAGE | 08292018 23:58 |
| IWB 300 | IWB45 | IWB45-5678 | IWB45-5678_ 201808292359 | REMOTE DEVICE MANAGEMENT APPARATUS 10b | manageB.co.us | US | — | — | — | STORAGE | 08292018 23:59 |
| MFP 200 | MP30 | MP30-1234 | — | REMOTE DEVICE MANAGEMENT APPARATUS 10a | manageA.co.jp | JP | — | — | — | DELETION | 10162018 12:00 |
| MFP 200 | MP30 | MP30-1234 | — | DEVICE INFORMATION UTILIZATION APPARATUS 90b | remoteB.co.eu | EU | — | — | — | DELETION | 10162018 12:00 |
| ... | ... | ... | ... | ... | ... | ... | ... | ... | ... | ... | ... |

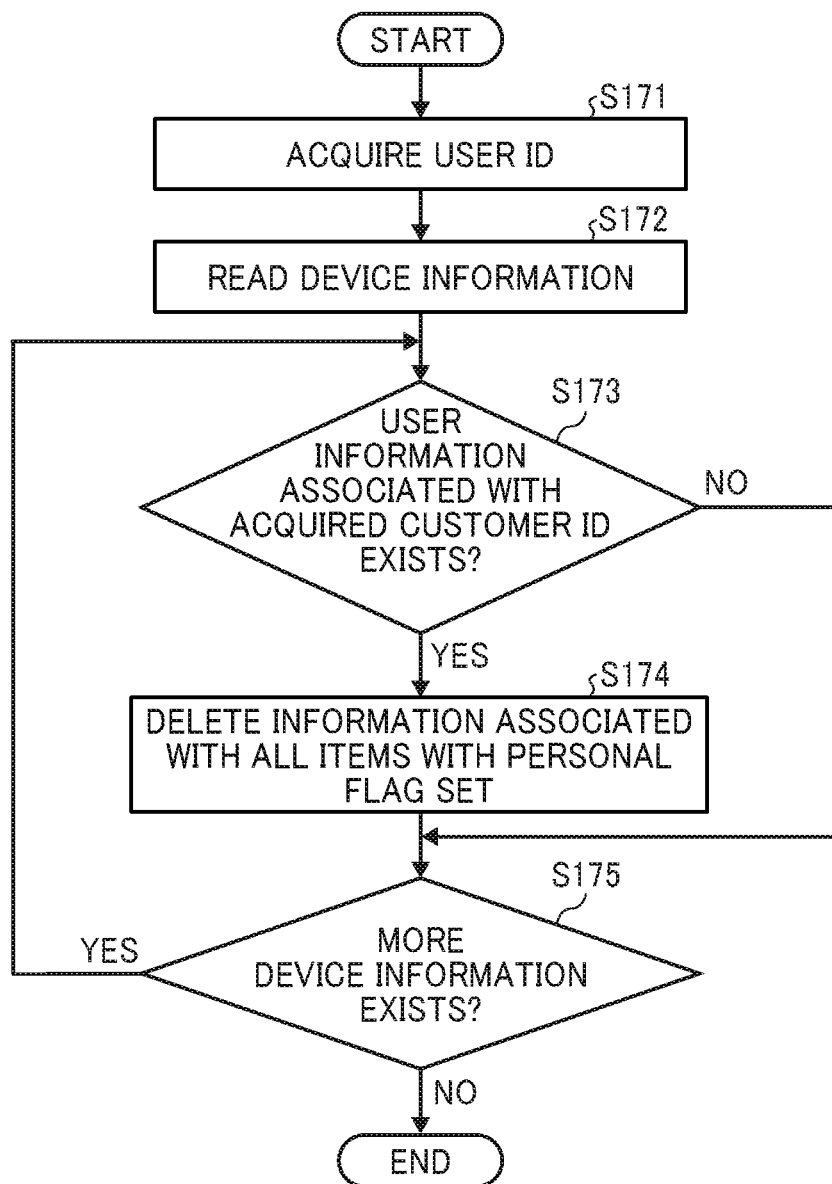

FIG. 31

| DEVICE INFORMATION | | | | PERSONAL DATA INFORMATION | |
|---|---|---|---|---|---|
| | ITEM | DATA | EVENT OCCURRENCE TIME | PERSONAL FLAG | USER INFORMATION |
| DEVICE SPECIFIC INFORMATION | DEVICE ID | MP30 | | – | – |
| | MODEL NUMBER ID | MP30-1234 | | – | – |
| | DEVICE ADMINISTRATOR NAME | ***** | | ** | ***** |
| | TELEPHONE NUMBER | ***** | | ** | ***** |
| | ADDRESS | ***** | | ** | ***** |
| | DEVICE SOFTWARE VERSION | 1.20.34 | | – | – |
| | IP ADDRESS | ***** | | ** | ***** |
| EVENT HISTORY INFORMATION | TONER INFORMATION | CYAN: LOW QUANTITY | 08292018 22:54 | – | – |
| | USER ID: AAA0001 USER NAME | ***** | **** | ** | ***** |
| | USER ID: AAA0001 COUNTER | ***** | **** | ** | ***** |

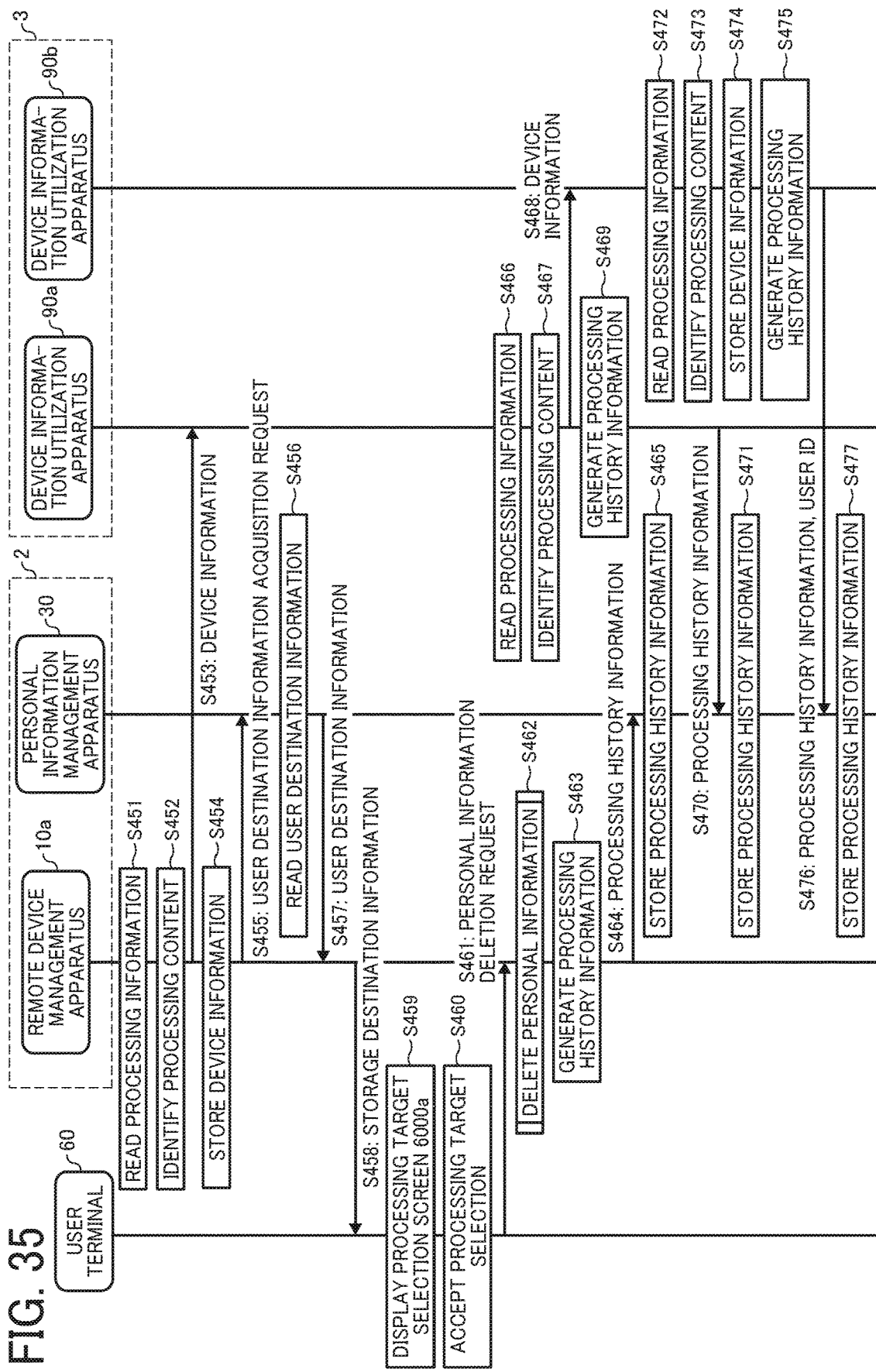

FIG. 36

Processing Target Selection  user ID : AAA0001

Select Data

| | Server Name | Destination Information | Area | Device Information ID | Target Device | Processing Time |
|---|---|---|---|---|---|---|
| ☐ | Remote Device Management Apparatus 10a | manageA.co.jp | JP | MP30-1234_201808292355 | MFP 200 | 08292018 23:55 |
| ☐ | Device Information Utilization Apparatus 90b | remoteB.co.eu | EU | MP30-1234_201808292358 | MFP 200 | 08292018 23:58 |
| ... | ... | ... | ... | ... | ... | ... |

Select Item

Target Data:
- ☐ ALL
- ☐ MP30-1234_201808292355
- ☑ MP30-1234_201808292358
- ...

Item:
- ☑ Device ID
- ☐ Model Number
- ☐ Device Administrator
- ☐ Telephone Number
- ☑ Address
- ...

[Delete] [Move] [Store] [Cancel]

Destination: ▸

FIG. 38

Deletion History Notification user ID : AAA0001

| Server Name | Destination Information | Area | Device Information ID | Target Device | Processing Time | Processing History |
|---|---|---|---|---|---|---|
| Remote Device Management Apparatus 10a | manageA.co.jp | JP | MP30-1234_201808292355 | MFP 200 | 08292018 23:55 | Deleted |
| Device Information Utilization Apparatus 90b | remoteB.co.eu | EU | MP30-1234_201808292358 | MFP 200 | 08292018 23:58 | Deleted |
| ... | ... | ... | ... | ... | ... | ... |

Close

FIG. 46

| DEVICE INFORMATION | | | | PERSONAL DATA INFORMATION | |
|---|---|---|---|---|---|
| | ITEM | DATA | EVENT OCCURRENCE TIME | PERSONAL FLAG | USER INFORMATION |
| DEVICE SPECIFIC INFORMATION | DEVICE ID | IWB45 | | – | – |
| | MODEL NUMBER ID | IWB45-5678 | | – | – |
| | DEVICE ADMINISTRATOR NAME | AAAA BBBB | | SET | IWB45-5678 ; BBB |
| | TELEPHONE NUMBER | 012-3456-XXXX | | SET | IWB45-5678 ; BBB |
| | ADDRESS | OHTA, TOKYO | | SET | IWB45-5678 ; BBB |
| | DEVICE SOFTWARE VERSION | 1.15.32 | | – | – |
| | IP ADDRESS | 134.124.124.XXX | | SET | IWB45-5678 ; BBB |
| EVENT HISTORY INFORMATION | USER ID: BBB0001 | EEEE FFFF | 08292018 23:53 | SET | IWB45-5678 ; BBB0001 |
| | DISPLAY DATA | ZZZ.pdf | 08292018 23:53 | SET | IWB45-5678 ; BBB0001 |
| | DISPLAY DATA | XXX.pdf | 08292018 23:53 | SET | IWB45-5678 ; BBB0001 |
| | ... | ... | ... | ... | ... |

FIG. 49

| DEVICE INFORMATION | | | | PERSONAL DATA INFORMATION | |
|---|---|---|---|---|---|
| | ITEM | DATA | EVENT OCCURRENCE TIME | PERSONAL FLAG | USER INFORMATION |
| DEVICE SPECIFIC INFORMATION | DEVICE ID | MP30 | | – | – |
| | MODEL NUMBER ID | MP30-1234 | | – | – |
| | DEVICE ADMINISTRATOR NAME | AAAA BBBB | | SET | MP30-1234 ; AAA |
| | TELEPHONE NUMBER | 012-3456-XXXX | | SET | MP30-1234 ; AAA |
| | ADDRESS | OHTA, TOKYO | | SET | MP30-1234 ; AAA |
| | DEVICE SOFTWARE VERSION | 1.20.34 | | – | – |
| | IP ADDRESS | 123.123.123.XXX | | SET | MP30-1234 ; AAA |
| EVENT HISTORY INFORMATION | USER ID: AAA0001 | EEEE FFFF | 06152018 15:23 | SET | MP30-1234 ; AAA0001 |
| | DISPLAY DATA | YYY.pdf | 06152018 15:23 | SET | MP30-1234 ; AAA0001 |
| | DISPLAY DATA | AAA.pdf | 06152018 15:23 | – | – |
| | ... | ... | ... | ... | ... |

FIG. 52

DEVICE INFORMATION

| | ITEM | DATA | EVENT OCCURRENCE TIME | PERSONAL DATA INFORMATION | |
|---|---|---|---|---|---|
| | | | | PERSONAL FLAG | USER INFORMATION |
| DEVICE SPECIFIC INFOR- MATION | DEVICE ID | UCS60 | | – | – |
| | MODEL NUMBER ID | UCS60-4321 | | – | – |
| | DEVICE ADMINISTRATOR NAME | AAAA BBBB | | SET | UCS60-4321 ; CCC |
| | TELEPHONE NUMBER | 012-3456-XXXX | | SET | UCS60-4321 ; CCC |
| | ADDRESS | OHTA, TOKYO | | SET | UCS60-4321 ; CCC |
| | DEVICE SOFTWARE VERSION | 2.15.78 | | – | – |
| | IP ADDRESS | 145.145.145.XXX | | SET | UCS60-4321 ; CCC |
| EVENT HISTORY INFOR- MATION | USER ID: CCC0001 | GGGG HHHH | 11242018 10:17 | SET | UCS60-4321 ; CCC0001 |
| | CAPTURED IMAGE DATA | BBB.jpg | 11242018 10:17 | – | – |
| | CAPTURED IMAGE DATA | CCC.jpg | 11242018 10:17 | SET | UCS60-4321 ; CCC0001 |
| | ... | ... | ... | ... | ... |

STORAGE AREA MANAGEMENT TABLE

| STORAGE AREA | PERSONAL INFORMATION PRESENT? |
|---|---|
| STORAGE AREA A | NO |
| STORAGE AREA B | NO |
| STORAGE AREA C | YES |
| ... | ... |

FIG. 56

USER INFORMATION MANAGEMENT TABLE

COMMON CUSTOMER ID: XXX

| CUSTOMER ID | USER ID | COMMON USER ID |
|---|---|---|
| AAA | AAA0001 | XXX0001 |
| | AAA0002 | XXX0002 |
| | AAA0003 | XXX0003 |
| | ... | ... |
| BBB | BBB0001 | XXX0001 |
| | BBB0002 | XXX0002 |
| | ... | ... |
| ... | ... | ... |

MANAGEMENT APPARATUS, MANAGEMENT SYSTEM, SERVER SYSTEM, REMOTE DEVICE MANAGEMENT SYSTEM, AND DATA DELETION REQUEST METHOD

CROSS-REFERENCE TO RELATED APPLICATIONS

This patent application is based on and claims priority pursuant to 35 U.S.C. § 119(a) to Japanese Patent Application No. 2019-052 343, filed on Mar. 20, 2019 in the Japan Patent Office, the entire disclosure of which is hereby incorporated by reference herein.

BACKGROUND

Technical Field

The present disclosure relates to a management apparatus, a management system, a server system, a remote device management system, and a data deletion request method.

Background Art

A remote device management system for remotely managing devices existing in a local network such as a local area network (LAN) from outside the local network has been known. The remote device management system implements remote management of the devices, for example, by establishing communication between the device existing in the local network and the remote device management system located outside the local network.

When a user requests deletion of personal information, a system administrator is required by laws and regulations such as the General Data Protection Regulation (GDPR) to delete, for example, the personal information held by the management system. Managing the location of files containing the personal information or confidential information is a known technique for complying with such laws and regulations.

SUMMARY

Embodiments of the present disclosure describe a management apparatus, a management system, a server system, a remote device management system, and a data deletion request method. The management apparatus acquires apparatus identification information for identifying a processing apparatus storing device event data indicating content of an event executed by a device to be managed, from one or more processing apparatuses that process the device event data and requests deletion of the device event data to the processing apparatus identified by the acquired apparatus identification information, in response to a device event data deletion request.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 9A and FIG. 9B are block diagrams illustrating an example of a functional configuration of the remote device management system;

FIG. 10 is a conceptual diagram illustrating an example of a user information management table;

FIG. 11 is a conceptual diagram illustrating an example of a personal data definition management table;

FIGS. 12A to 12D are conceptual diagrams illustrating an example of a processing information management table;

FIG. 13A is a conceptual diagram illustrating an example of a contract information management table, and FIG. 13B is a conceptual diagram illustrating an example of a user destination information management table;

FIG. 14 is a conceptual diagram illustrating an example of a processing history information management table;

FIG. 16 is a diagram illustrating an example of device event data;

FIG. 18 is a diagram illustrating an example of device information;

FIGS. 21A and 21B are diagrams illustrating an example of processing history information;

FIG. 27 is a diagram illustrating an example of the device information from which the personal information has been deleted;

FIG. 28 is a diagram illustrating an example of processing history information;

FIG. 30 is a flowchart illustrating an example of a process for deleting the personal information in response to a request from a device administrator;

FIG. 31 is a diagram illustrating an example of the device information from which the personal information has been deleted;

FIG. 35 is a sequence diagram illustrating another example of the process of selecting data to be processed in the remote device management system;

FIG. 36 is a diagram illustrating another example of the processing target selection screen;

FIG. 38 is a diagram illustrating an example of a deletion history notification screen;

FIG. 46 is a diagram illustrating an example of the device information generated by the electronic whiteboard;

FIG. 49 is a diagram illustrating an example of the device information including the personal information identified by the character recognition function;

FIG. 52 is a diagram illustrating an example of the device information including the personal information identified by facial recognition processing;

FIG. 56 is a conceptual diagram illustrating a modification of the user information management table.

Figure 1:
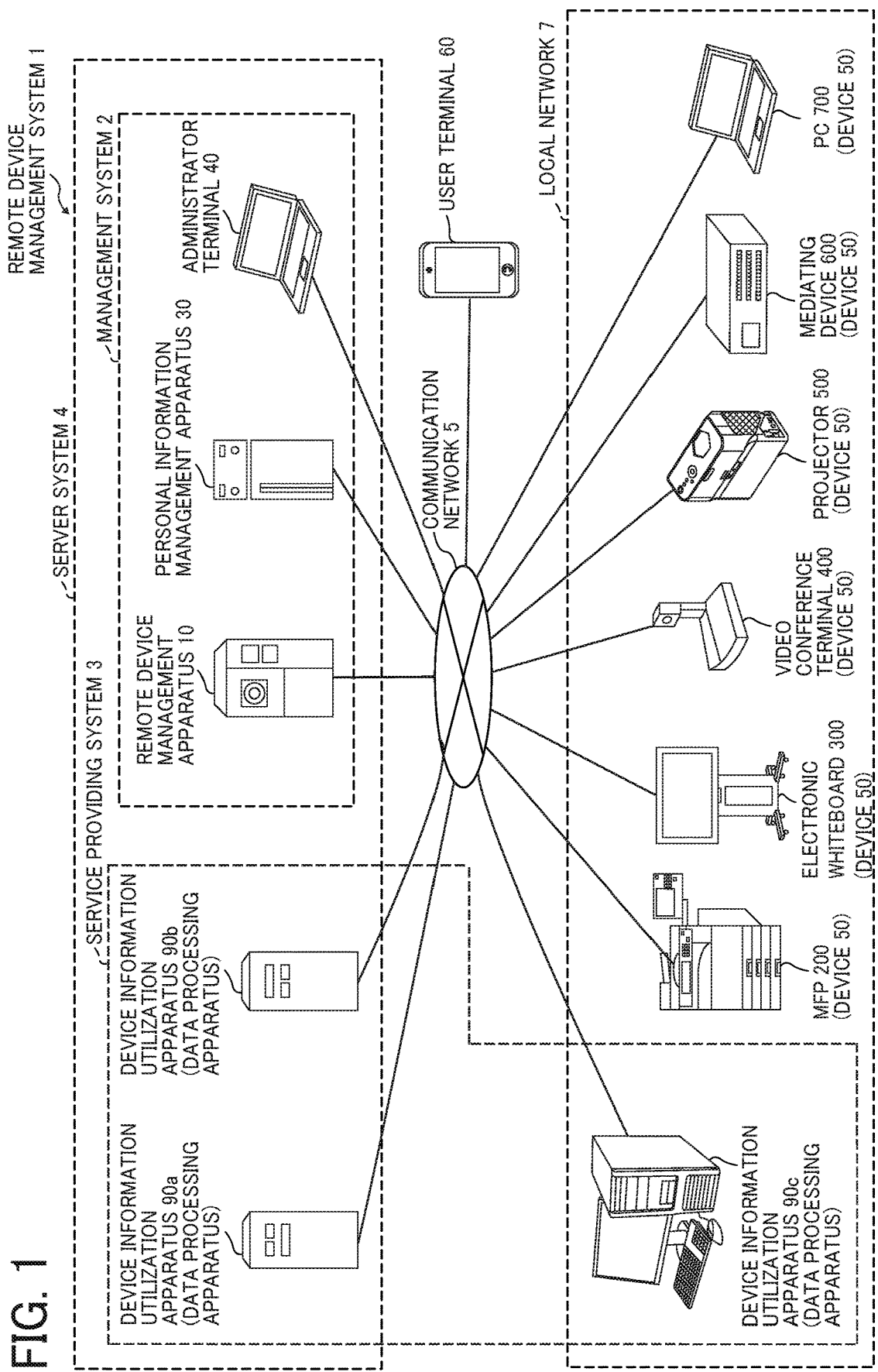
FIG. 1 is a diagram illustrating an example of a system configuration of a remote device management system.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a", "an", and "the" are intended to include the plural forms as well, unless the context clearly indicates otherwise.

Embodiments of the present disclosure are described with reference to the drawings. In the description of the drawings, the same elements are denoted by the same reference numerals, and redundant description is omitted.

FIG. 1 is a diagram illustrating an example of a system configuration of a remote device management system. The remote device management system 1 is a system in which a management system 2 remotely manages a device 50 to be managed, and a service providing system 3 provides a service using device information provided from the device 50. The remote device management system 1 includes the management system 2, the service providing system 3, a user terminal 60, and a local network 7. The local network 7 is connected to the management system 2 through the communication network 5.

The local network 7 is a communication network formed in a network environment such as an office, a conference room, a warehouse, a factory, or a particular production line. The local network 7 is, for example, an in-house local area network (LAN) unconnected to the internet. In the local network 7, a multifunction peripheral (MFP) 200, an electronic whiteboard (interactive whiteboard (IWB)) 300, a video conference terminal 400, a projector (PJ) 500, a mediating device 600 and a personal computer (PC) 700. The MFP 200, the electronic whiteboard 300, the video conference terminal 400, the projector 500, the mediating device 600, and the PC 700 are management target devices of the management system 2. The device 50 used in the following description is a general term for these management target devices. Further, the type of the device 50 is not limited to the examples illustrated in FIG. 1 and, for example, a smartphone, a tablet terminal, a mobile phone, a wearable terminal, a desktop PC, an industrial machine, an imaging device, a medical device, a network home appliance, a 3D printer, or the like may be included.

The management system 2 includes a remote device management apparatus 10, a personal information management apparatus 30, and an administrator terminal 40. The remote device management apparatus 10 is a server computer for managing information on the device 50 existing on the local network 7. The remote device management apparatus 10 is communicably connected to the device 50 to be managed through the communication network 5. As an example of the management, the remote device management apparatus 10 can acquire, from the MFP 200, information on states such as remaining amount of toner and the number of prints. Further, the remote device management apparatus 10 can issue an instruction to execute printing of document data stored in the MFP 200. In addition, the remote device management apparatus 10 can control power to the electronic whiteboard 300, the video conference terminal 400, the projector 500, the mediating device 600, and the PC 700. The remote device management apparatus 10 may be configured as one server computer or a plurality of server computers.

The personal information management apparatus 30 is a server computer that manages a location of personal information handled by the remote device management system 1. The personal information management apparatus 30 manages which apparatus of the remote device management system 1 stores the device information including the personal information. The personal information is, for example, information on a user who uses the device 50. Here, the user includes an administrator of the device 50, such as a contractor who has made a contract for using the device 50, or an individual user who uses the device 50. The device information includes not only the personal information but also information on a corporation or organization to which the administrator or the individual user of the device 50 belongs. "Personal information" used in the following description is an example of confidential information, and "confidential information" is a general term for the personal information and the information on corporations and organizations. The personal information management apparatus 30 is an example of a management apparatus.

The administrator terminal 40 is a terminal such as a notebook PC used by a system administrator of the remote device management system 1. The administrator terminal 40 performs various settings related to the operation of the remote device management apparatus 10 using a software application. The administrator terminal 40 may be, for example, a terminal such as a tablet terminal, a mobile phone, a smartphone, a wearable terminal, or a desktop PC.

The user terminal 60 is a terminal such as a smartphone used by an administrator of the device 50 or an individual user using the device 50. The user terminal 60 provides a service or function using a web browser or an external application installed on the user terminal 60. The service or function executed using the web browser or the external application is, for example, an e-mail system or a chat system such as chatware or a chatbot, specifically, G Suite (registered trademark), Office 365 (registered Trademark), LINE (registered trademark) or Slack (registered trademark). Note that the service or function executed using the web browser or the external application is not limited to the above description, and any service or function that can share various information with the management system 2 may be used. The user terminal 60 may be, for example, a terminal such as the tablet terminal, the mobile phone, the wearable terminal, the notebook PC, or the desktop PC. The user terminal 60 is an example of a communication terminal.

The service providing system 3 includes a device information utilization apparatus 90a, a device information utilization apparatus 90b, and a device information utilization apparatus 90c. The device information utilization apparatus 90a and the device information utilization apparatus 90b are server computers existing in a cloud environment outside the local network 7. The device information utilization apparatus 90a and the device information utilization apparatus 90b provide the service or application using the device information acquired from the device 50. The device information utilization apparatus 90c is a computer that exists in the local network 7, which is an on-premises environment. The device information utilization apparatus 90c functions as a storage device (local storage) that stores data (information) transmitted from the device 50. Hereinafter, the device information utilization apparatuses 90a, 90b, and 90c are collectively referred to as the device information utilization apparatus 90 when distinguishing each device information utilization apparatus is not needed. The device information utilization apparatus 90 is an example of a data processing apparatus.

Further, the management system 2, the device information utilization apparatus 90a, and the device information utilization apparatus 90b configure the server system 4. Each apparatus included in the server system 4 is managed by the same system administrator. For example, the device information utilization apparatus 90a and the device information utilization apparatus 90b are server computers that provide different services provided by the system administrator. In addition, each apparatus included in the server system 4 is installed in a different country or region. The remote device management apparatus 10, the device information utilization apparatus 90a, and the device information utilization apparatus 90b included in the server system 4 are examples of the processing apparatus.

The management system 2 may have a configuration in which the functions of the remote device management apparatus 10 and the personal information management apparatus 30 are executed by a single apparatus. The management system 2 may have a configuration in which the function of the administrator terminal 40 is executed by the remote device management apparatus 10 or the personal information management apparatus 30. Further, FIG. 1 illustrates an example in which the management system 2 remotely manages a plurality of devices 50 located in one local network 7. Alternatively, the management system 2 may be configured to remotely manage the devices 50 located in each of a plurality of the local networks 7. In addition, the management system 2 may be provided in the local network 7 and may be configured to remotely manage the devices 50 existing in the local network 7. Further, FIG. 1 illustrates an example in which three device information utilization apparatuses 90 are used, but the number of device information utilization apparatuses 90 is not limited to three.

Figure 2:
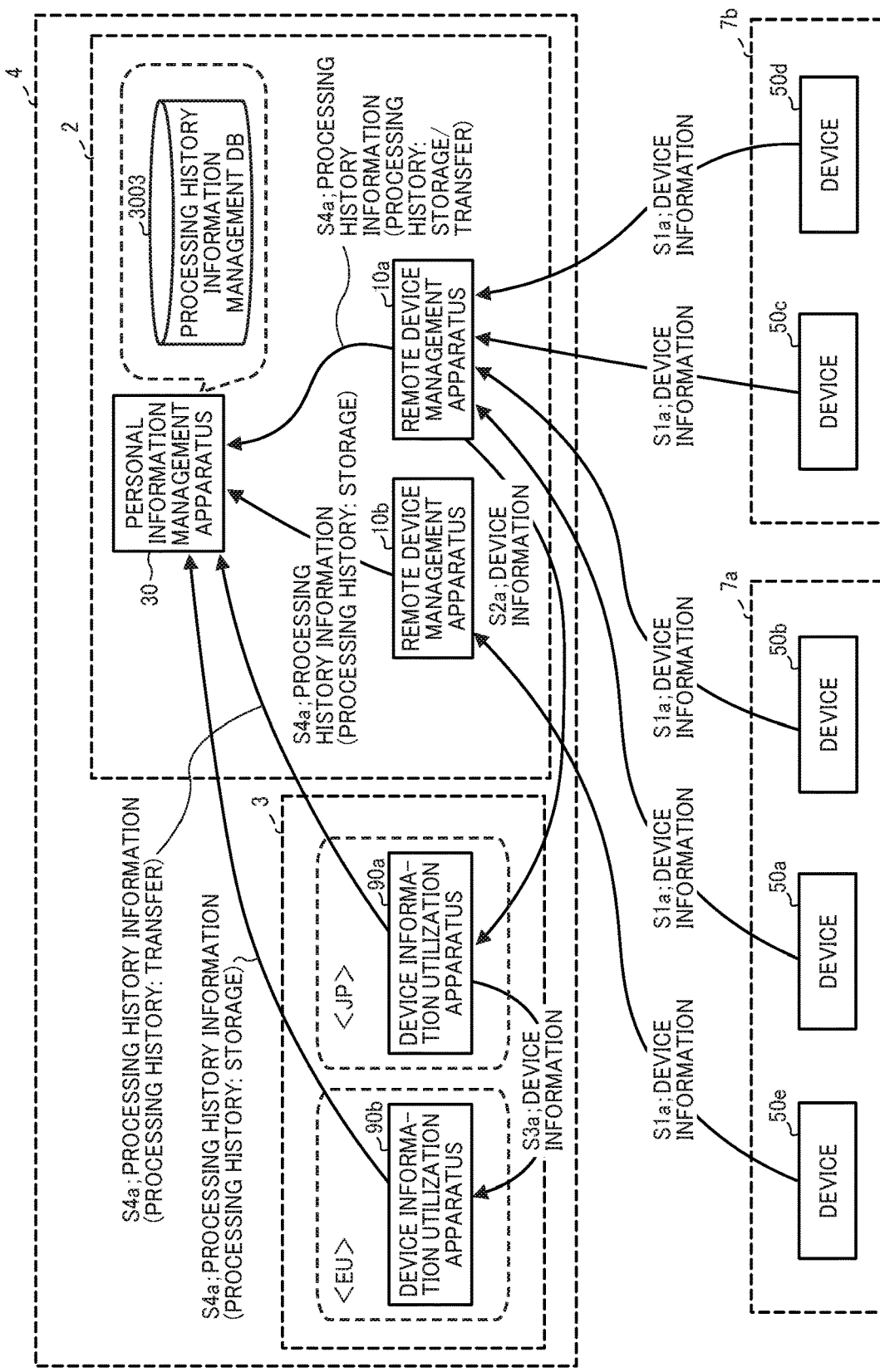
FIG. 2 is a diagram illustrating an example of an outline of the remote device management system.
Figure 3:
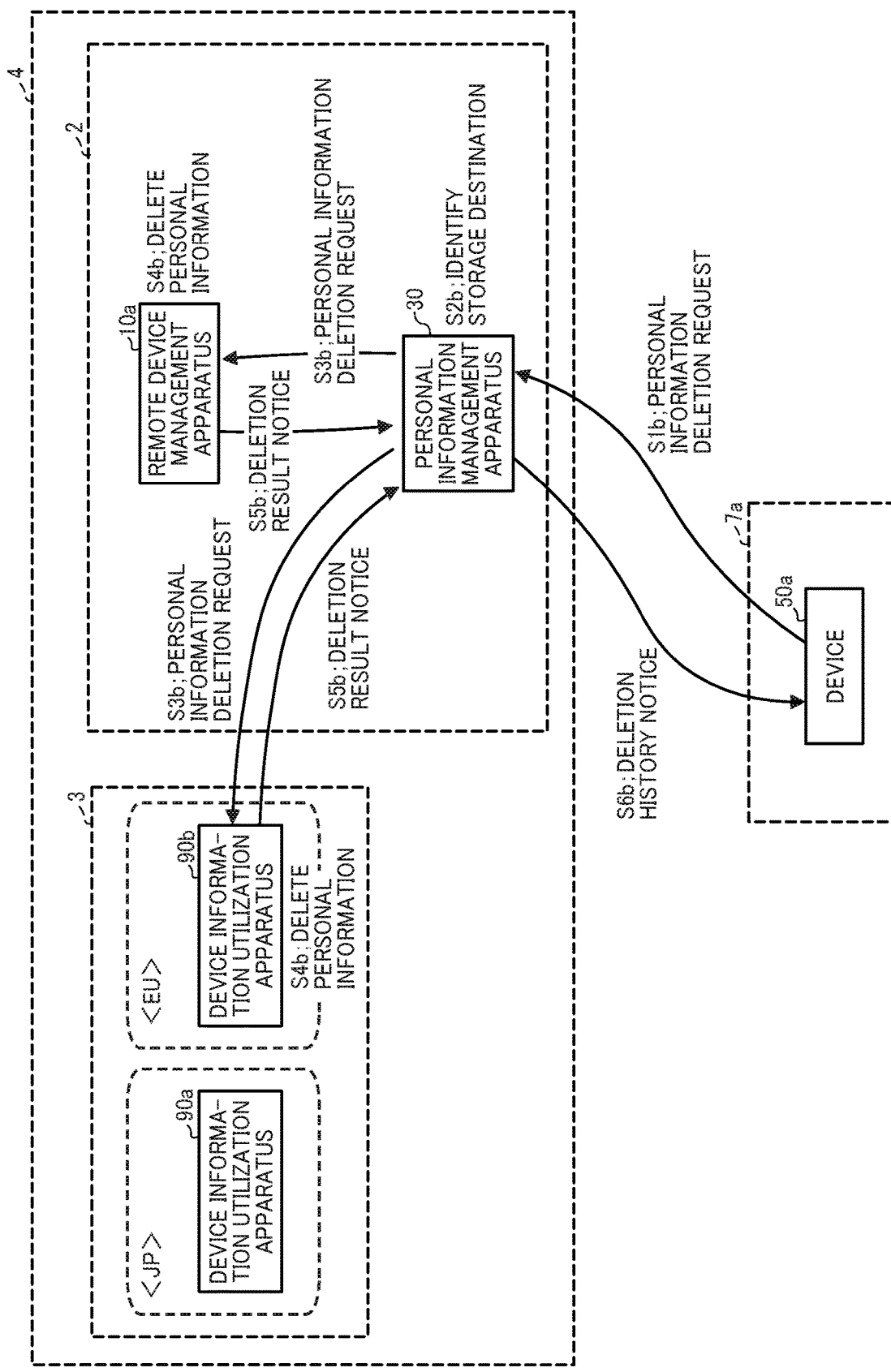
FIG. 3 is a diagram illustrating another example of the outline of the remote device management system.

FIG. 2 and FIG. 3 are diagrams illustrating examples of the outline of the remote device management system and illustrate the remote device management system according to the present embodiment. The details of the functions and the like implemented by the remote device management system 1 are described below with reference to FIG. 2 and FIG. 3.

The remote device management system illustrated in FIGS. 2 and 3 is a system that stores and uses the device information transmitted from the device 50 in a plurality of apparatuses included in the server system 4. The remote device management system illustrated in FIGS. 2 and 3 identifies the personal information stored in any one of the plurality of apparatuses included in the server system 4 in response to a request from the user to delete the personal information.

A description is now given of a process of storing the device information including the personal information generated by the device 50 in the server system 4, with reference to FIG. 2. In step S1a, the devices 50a and 50b located in the local network 7a and the devices 50c and 50d located in the local network 7b transmit the device information generated by each device to the remote device management apparatus 10a. The device 50e located in the local network 7a transmits the device information generated by the device 50e to the remote device management apparatus 10b. In the device information, personal data information for identifying the personal information is added to device event data indicating the content of the device event executed by the device 50. The personal data information is given only to data of an item handled as the personal information among data of a plurality of items included in the device event data.

In step S2a, the remote device management apparatus 10a transmits the device information transmitted from the devices 50a, 50b, 50c, and 50d to the device information utilization apparatus 90a installed in Japan (JP). In step S3a, the device information utilization apparatus 90a transmits the device information transmitted from the remote device management apparatus 10a to the device information utilization apparatus 90b installed in the European Union (EU) area.

In step S4a, each apparatus included in the server system 4 transmits, to the personal information management apparatus 30, processing history information indicating the history of processing executed on the device information. For example, since the remote device management apparatus 10a stored the device information transmitted from the device 50 in its own device and transmitted the device information to the device information utilization apparatus 90a, the processing history information whose processing history is "storage/transfer" is transmitted to the personal information management apparatus 30. In addition, since the remote device management apparatus 10b executed only the process of storing the device information transmitted from the device 50 in its own device, the remote device management apparatus 10b transmits the process history information whose process history is "storage" to the personal information management apparatus 30. Further, since the device information utilization apparatus 90a executed only the process of transmitting the device information transmitted from the remote device management apparatus 10a to the device information utilization apparatus 90b, the processing history information whose processing history is "transfer" is transmitted to the personal information management apparatus 30. Also, since the device information utilization apparatus 90b executed only the process of storing the device information transmitted from the device information utilization apparatus 90a in its own device, the process history information whose process history is "storage" is stored in the personal information management apparatus 30. The personal information management apparatus 30 stores the received processing history information in the processing history information management database (DB) 3003.

The personal information management apparatus 30 can identify to which apparatus included in the server system 4 the device information transmitted from the device 50 to the remote device management apparatus 10 has been transmitted and what processing has been executed, by storing the processing history information transmitted from each apparatus included in the server system 4. The personal information management apparatus 30 can identify in which storage destination the device information is stored based on the processing history information stored in the processing history information management DB 3003, for example.

A description is now given of a process of deleting the device information including the personal information stored in each apparatus included in the server system 4 in the process illustrated in FIG. 2 is described with reference to FIG. 3. In step S1b, the device 50a transmits a personal information deletion request for requesting deletion of personal information to the personal information management apparatus 30 in response to a request from the user. FIG. 3 illustrates an example in which the user requests deletion of the personal information using the device 50a, but the user may use another device 50 or the user terminal 60 or the like. In step S2b, the personal information management apparatus 30 uses the processing history information stored in the processing history information management DB 3003 to identify the storage destination of the device information including the personal information. In this example, the personal information management apparatus 30 identifies as the storage destination of the device information including the personal information, the device that has transmitted the processing history information including "storage" in the processing history among the processing history information received in step S4a. As a result, the personal information management apparatus 30 identifies the remote device management apparatus 10a and the device information utilization apparatus 90b as the storage destinations.

In step S3b, the personal information management apparatus 30 transmits (transfers) a personal information deletion request to the identified storage destination(s), which are the remote device management apparatus 10a and the device information utilization apparatus 90b. In step S4b, the remote device management apparatus 10a and the device information utilization apparatus 90b delete the data to which the personal data information is added from the data included in the stored device information, thereby executing the deletion process of the personal information. In step S5b, the remote device management apparatus 10a and the device information utilization apparatus 90b transmit a deletion result notification indicating the deletion result of the personal information to the personal information management apparatus 30. In step S6b, the personal information management apparatus 30 transmits to the device 50a used by the user, deletion history information indicating the deletion history of the personal information by each apparatus included in the server system 4.

Thereby, the user of the device 50a can confirm that the personal information has been deleted on a display screen of the device 50a on which the deletion history information transmitted from the personal information management apparatus 30 is displayed. Further, in the process illustrated in FIG. 2, the personal information management apparatus 30 can delete the personal information stored in each apparatus included in the server system 4 in response to a request for deletion of the personal information from the user by managing the storage destination of device information including the personal information.

In the case of a method of managing the device information of the device 50 by a conventional management server or the like, for example, use of the device information by multiple devices installed at different locations is not assumed, and the device storing and using the device information is thus not managed collectively. As a result, when the user requests deletion of the personal information, it is difficult to determine which device at which location stores the device information including the personal information, and it is difficult to respond to the request from the user. Furthermore, in the conventional method, it is not possible to determine whether the device information is the personal information, or which data included in the device information is the personal information, and therefore all data must be deleted. When the system administrator is using the device information for a service provided to the customer, even data that is not personal information is deleted, resulting in added inconvenience to the system administrator.

As illustrated in FIGS. 2 and 3, the remote device management system 1 according to the present embodiment uses the personal information management apparatus 30 to manage the processing history of each apparatus included in the server system 4 on the device information. Thereby, when the user requests deletion of the personal information, the remote device management system 1 identifies which apparatus stores the device information including the personal information to be deleted and deletes the personal information. Further, the remote device management system 1 adds the personal data information to an item corresponding to the personal information among items included in the device event data, thereby data corresponding to the personal information among data included in the device information can be identified and deleted. When the user requests deletion of the personal information, the remote device management system 1 can delete just the data of the item corresponding to the personal information among the items included in the device information, and it becomes possible to respond to requests from users and reduce the risk of added inconvenience to the system administrator.

A hardware configuration of each apparatus, device, or terminal included in the remote device management system 1 is described with reference to FIGS. 4 to 8. The hardware configuration of each apparatus, device, or terminal included in the remote device management system 1 may be added or deleted as necessary.

A description is now given of the hardware configuration of the remote device management apparatus 10, the personal information management apparatus 30, the administrator terminal 40, the user terminal 60, the device information utilization apparatus 90, the mediating device 600, and the PC 700 is described with reference to FIG. 4. The remote device management apparatus 10, the personal information management apparatus 30, the administrator terminal 40, the user terminal 60, the device information utilization apparatus 90, the mediating device 600, and the PC 700 have a general computer configuration. Here, an example of hardware configuration of a general computer is described.

Figure 4:
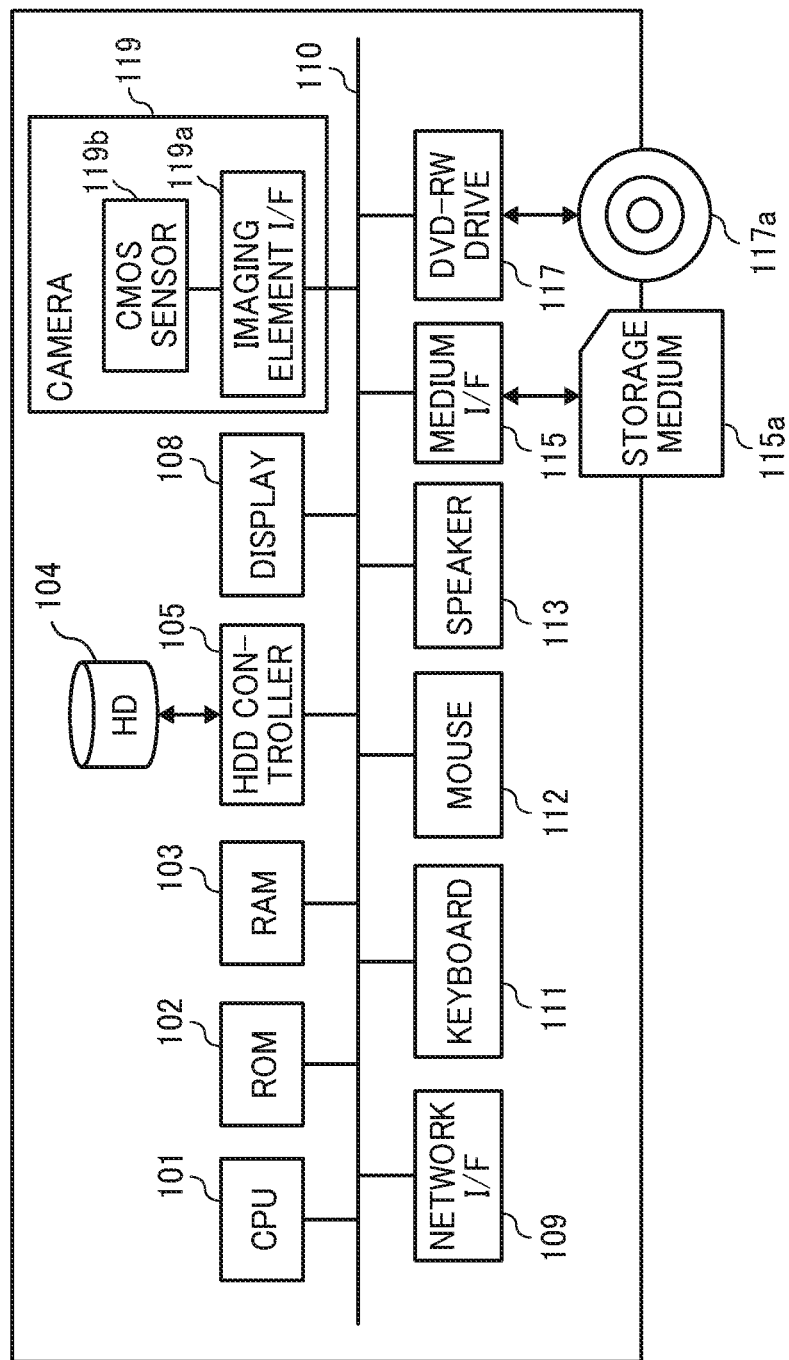
FIG. 4 is a block diagram illustrating an example of a hardware configuration of a computer.

FIG. 4 is a block diagram illustrating an example of a hardware configuration of a computer. As illustrated in FIG. 4, the computer includes a central processing unit (CPU) 101, a read only memory (ROM) 102, a random access memory (RAM) 103, a hard disc (HD) 104, a hard disc drive (HDD) controller 105, a display 108, and a network interface (I/F) 109.

Among these elements, the CPU 101 controls all operations of the computer. The ROM 102 stores a program used for driving the CPU 101, such as an initial program loader (IPL). The RANI 103 is used as a work area of the CPU 101. The HD 104 stores various data such as a control program. The HDD controller 105 controls reading or writing of various data to the HD 104 under the control of the CPU 101. The display 108 is a type of display such as a liquid crystal or an organic electro luminescence (EL) for displaying various information such as a cursor, a menu, a window, a character, and an image. The network I/F 109 is an interface that controls communication of data through the communication network 5. The network I/F 109 is, for example, a network interface card (NIC) compatible with transmission control protocol (TCP)/internet protocol (IP).

Further, the computer includes a keyboard 111, a mouse 112, a speaker 113, a medium I/F 115, a Digital Versatile Disk-Rewritable (DVD-RW) drive 117, and a camera 119.

The keyboard 111 is a type of input device provided with a plurality of keys to input characters, numerals, or various instructions. The mouse 112 is a type of input device for selecting and executing various instructions, selecting a processing target, moving a cursor, and the like. The speaker 113 outputs a sound signal under control of the CPU 101. The medium I/F 115 controls reading or writing (storage) of data from or to a storage medium 115a such as a universal serial bus (USB) memory or a flash memory. The DVD-RW drive 117 controls reading and writing of various data from and to a DVD-RW 117a as an example of a removable recording medium. Note that the present disclosure is not limited to the DVD-RW and may be a digital versatile disk-recordable (DVD-R) or the like. In addition, the DVD-RW drive 117 may be a Blu-ray drive that controls reading or writing of various data from or to a Blu-ray disc (registered trademark). The camera 119 is a type of imaging device and includes an imaging element I/F 119a and a complementary metal oxide semiconductor (CMOS) sensor 119b. The CMOS sensor 119b is a type of imaging device that photographs a subject under the control of the CPU 101 and obtains image data. Note that the camera 119 may include an imaging device such as a charge coupled device (CCD) sensor instead of the CMOS sensor 119b. The imaging element I/F 119a is a circuit that controls driving of the CMOS sensor 119b.

The computer also includes a bus line 110. The bus line 110 is an address bus, a data bus, and the like for electrically connecting each component such as the CPU 101.

Figure 5:
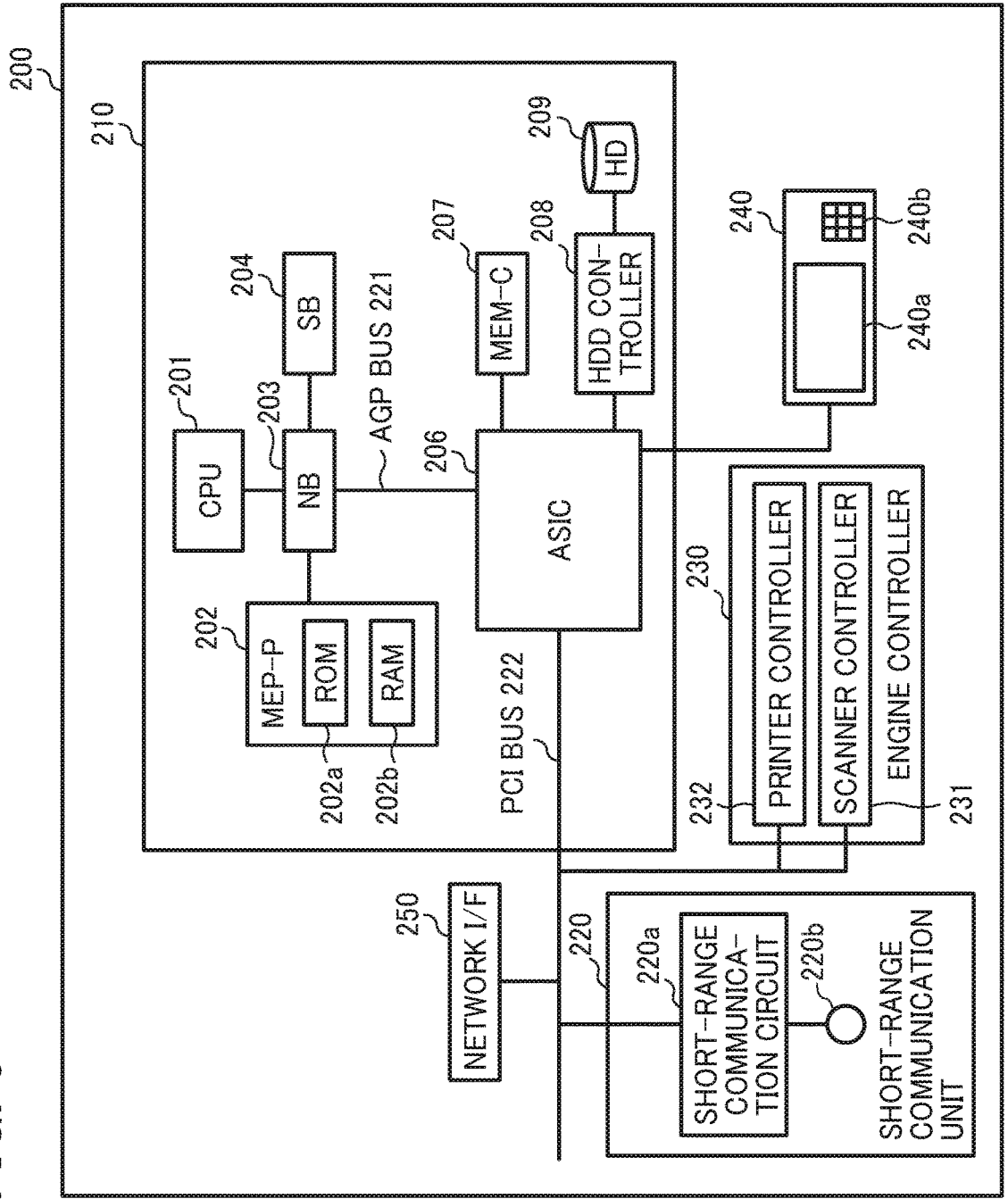
FIG. 5 is a block diagram illustrating an example of a hardware configuration of a multifunction peripheral (MFP)

FIG. 5 is a block diagram illustrating an example of a hardware configuration of the MFP. As illustrated in FIG. 5, the MFP 200 includes a controller 210, a short-range communication unit 220, an engine controller 230, a control panel 240, and a network IN 250.

The controller 210 includes a CPU 201 as a main processor, a system memory (MEM-P) 202, a north bridge (NB) 203, a south bridge (SB) 204, an Application Specific Integrated Circuit (ASIC) 206, a local memory (MEM-C) 207 as a storage unit, an HDD controller 208, and an HD 209 as a storage unit. The NB 203 and the ASIC 206 are connected through an Accelerated Graphics Port (AGP) bus 221.

The CPU 201 is a processor that performs overall control of the MFP 200. The NB 203 is a bridge for connecting the CPU 201, the MEM-P 202, the SB 204, and the AGP bus 221. The NB 203 includes a memory controller that controls reading/writing of the MEM-P 202, a peripheral component interconnect (PCI) master, and an AGP target.

The MEM-P 202 includes a ROM 202a as a memory that stores program and data for implementing various functions of the controller 210. The MEM-P 202 further includes a RAM 202b as a memory that deploys the program and data, or as a drawing memory that stores drawing data for printing.

The SB 204 is a bridge for connecting the NB 203, the PCI bus 222, and peripheral devices. The ASIC 206 is an integrated circuit (IC) dedicated to an image processing use, and connects the AGP bus 221, a PCI bus 222, the HDD controller 208, and the MEM-C 207. The ASIC 206 includes a PCI target, an AGP master, an arbiter (ARB) as a central processor of the ASIC 206, a memory controller for controlling the MEM-C 207, a plurality of direct memory access controllers (DMACs) capable of converting coordinates of image data with a hardware logic, and a PCI unit that transfers data between a scanner controller 231 and a printer controller 232 through the PCI bus 222. The ASIC 206 may be connected to a USB interface or an Institute of Electrical and Electronics Engineers (IEEE) 1394 interface.

The MEM-C 207 is a local memory used as a copy image buffer and a code buffer. The HD 209 is a storage for storing image data, font data used during printing, and forms. The HDD controller 208 controls reading and writing of various data from and to the HD 209 under control of the CPU 201. The AGP bus 221 is a bus interface for a graphics accelerator card, which has been proposed to accelerate graphics processing. Through directly accessing the MEM-P 202 by high-throughput, speed of the graphics accelerator card is improved.

The short-range communication unit 220 is provided with a short-range communication circuit 220a and an antenna 220b for the short-range communication circuit 220a. The short-range communication circuit 220a is a communication circuit for short-range wireless communication such as near field communication (NFC), Bluetooth (registered trademark), millimeter wave wireless communication, Quick Response (QR) code (registered trademark), visible light, environmental sound, or ultrasonic wave.

The engine controller 230 includes a scanner controller 231 and a printer controller 232. The scanner controller 231 and the printer controller 232 each performs various image processing, such as error diffusion or gamma conversion. The control panel 240 includes a panel display 240a and operation panel 240b. The panel display 240a is implemented by, for example, a touch panel that displays current settings or a selection screen and receives a user input. The operation panel 240b includes a numeric keypad that receives set values of various image forming parameters such as image density parameter and a start key that receives an instruction for starting copying. The panel display 240a is a type of display. The controller 210 controls all operations of the MFP 200. For example, the controller 210 controls drawing, communication, or user inputs to the control panel 240.

In response to an instruction to select a specific application through the control panel 240, for example, using a mode switch key, the MFP 200 selectively performs a document box function, a copy function, a print function, and a facsimile function. When the document box function is selected, the MFP 200 operates in a document box mode to store document data. With selection of the copy function, the MFP 200 operates in a copy mode. With selection of the print function, the MFP 200 operates in a print mode. With selection of the facsimile function, the MFP 200 operates in a facsimile mode.

The network I/F 250 is an interface that controls communication of data through the communication network 5. The short-range communication circuit 220a and the network I/F 250 are electrically connected to the ASIC 206 through the PCI bus 222.

Figure 6:
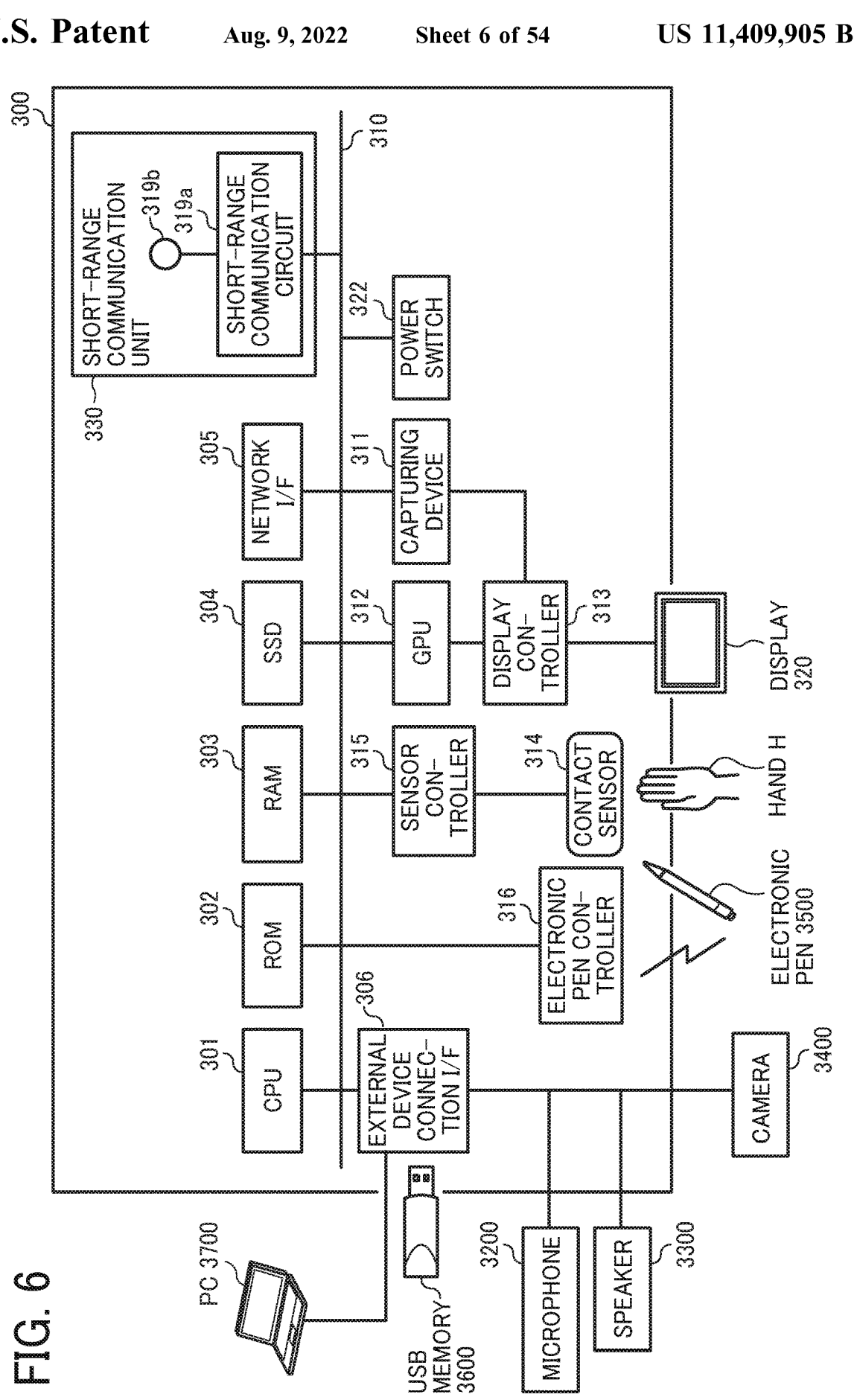
FIG. 6 is a block diagram illustrating an example of a hardware configuration of an electronic whiteboard.

FIG. 6 is a block diagram illustrating an example of a hardware configuration of the electronic whiteboard. As illustrated in FIG. 6, the electronic whiteboard 300 includes a CPU 301, a ROM 302, a RAM 303, a solid state drive (SSD) 304, a network I/F 305, and an external device connection I/F 306.

The CPU 301 controls all operations of the electronic whiteboard 300. The ROM 302 stores a control program such as an IPL to boot the CPU 301. The RAM 303 is used as a work area for the CPU 301. The SSD 304 stores various data such as the control program for the electronic whiteboard. The network I/F 305 controls communication with the communication network 5. The external device connection I/F 306 controls communication with a USB memory 3600, PC 3700, and external devices such as a camera 3400, a speaker 3300, a microphone 3200, etc.

The electronic whiteboard 300 includes a capturing device 311, a graphics processing unit (GPU) 312, a display controller 313, a contact sensor 314, a sensor controller 315, an electronic pen controller 316, a short-range communication unit 330, and a power switch 322.

The capturing device 311 acquires, through the display controller 313, image data displayed on the display 320, which is a type of display or operation unit and stores the acquired image data in the RAM 303 or the like. The GPU 312 is a semiconductor chip dedicated to processing a graphical image. The display controller 313 controls display of an image processed at the capturing device 311 or the GPU 312 for output through the display 320. The contact sensor 314 detects contact with the display 320 by an electronic pen (stylus pen) 3500 or a user's hand H. The sensor controller 315 controls processing of the contact sensor 314. The contact sensor 314 performs input of coordinates and detection of coordinates by an infrared cutoff method. More specifically, the display 320 is provided with two light-receiving elements disposed on both upper side ends of the display 320, and a reflector frame surrounding the sides of the display 320. The light-receiving elements emit a plurality of infrared rays parallel to a surface of the display 320. The light-receiving elements receive light passing in the direction that is the same as an optical path of the emitted infrared rays, which are reflected by the reflector frame. The contact sensor 314 outputs an identifier (ID) of the infrared ray that is blocked by an object (such as the user's hand) after being emitted from the light-receiving elements, to the sensor controller 315. Based on the ID of the infrared ray, the sensor controller 315 detects a specific coordinate that is touched by the object. The electronic pen controller 316 communicates with the electronic pen 3500 to detect contact by the tip or bottom of the electronic pen 3500 with the display 320. The short-range communication unit 330 is provided with a short-range communication circuit 319a and an antenna 319b for the short-range communication circuit 319a. The short-range communication circuit 319a is a communication circuit for short-range wireless communication such as the NFC, Bluetooth (registered trademark), millimeter wave wireless communication, QR code (registered trademark), visible light, environmental sound, or ultrasonic wave. The power switch 3222 controls power to the electronic whiteboard 300.

The electronic whiteboard 300 further includes a bus line 310. The bus line 310 is an address bus, a data bus, or the like for electrically connecting each component such as the CPU 301 illustrated in FIG. 6.

The contact sensor 314 is not limited to the infrared blocking system type described above and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object against the display. In addition to or as an alternative to detecting contact by the tip or bottom of the electronic pen 3500, the electronic pen controller 316 may also detect contact by another part of the electronic pen 3500, such as a part held by a hand of the user.

Figure 7:
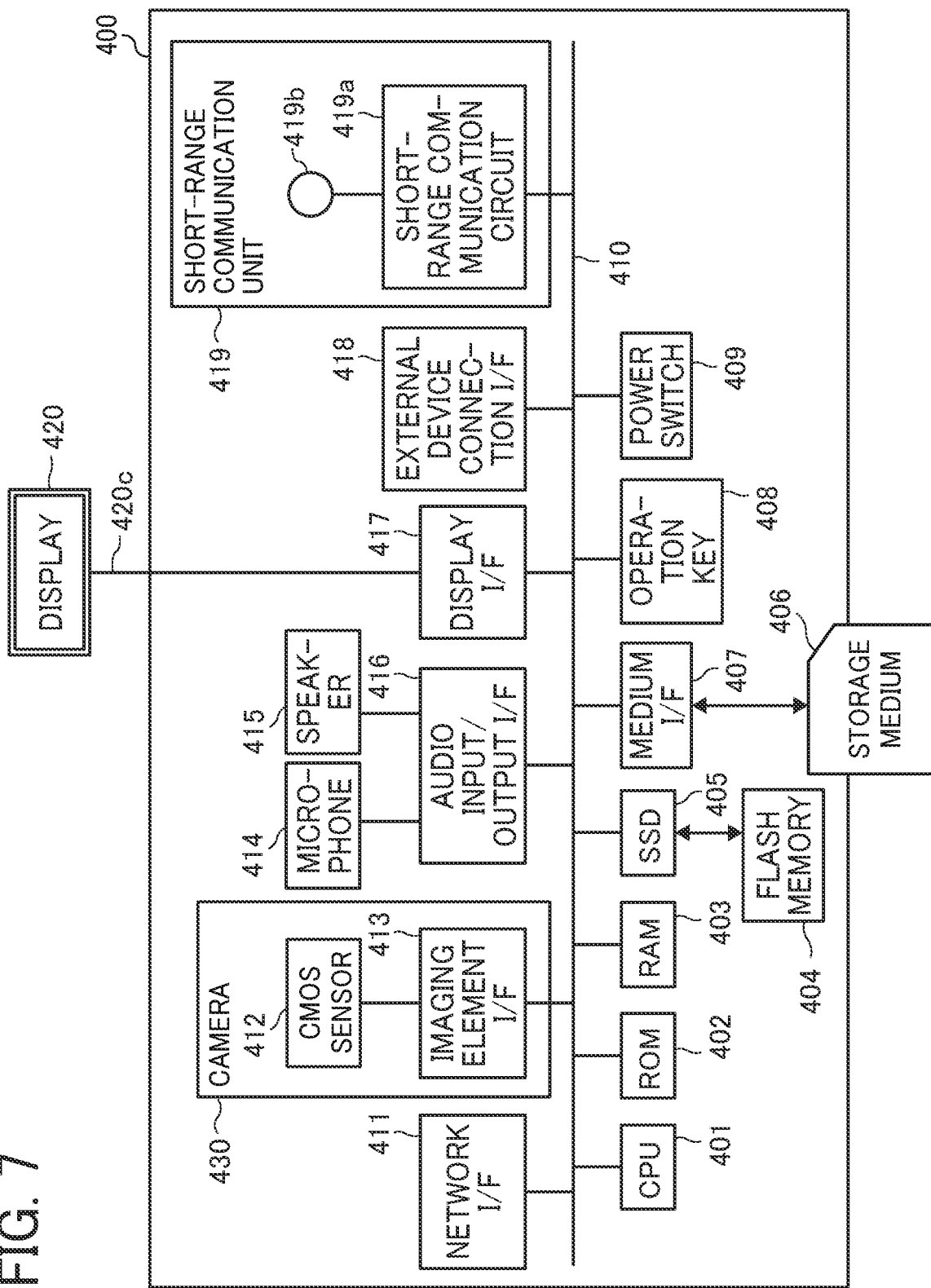
FIG. 7 is a block diagram illustrating an example of a hardware configuration of a video conference terminal.

FIG. 7 is a block diagram illustrating an example of a hardware configuration of the video conference terminal. As illustrated in FIG. 7, the video conference terminal 400 includes a CPU 401, a ROM 402, a RANI 403, a flash memory 404, an SSD 405, a medium I/F 407, an operation key 408, a power switch 409, a bus line 410, a network I/F 411, a camera 430, a microphone 414, a speaker 415, an audio input/output I/F 416, a display I/F 417, an external device connection I/F 418, and a short-range communication unit 419.

The CPU 401 controls all operations of the video conference terminal 400. The ROM 402 stores a control program such as an IPL to boot the CPU 401. The RAM 403 is used as a work area for the CPU 401. The flash memory 404 stores various data such as a communication control program, image data, and audio data. The SSD 405 controls reading or writing of various data with respect to the flash memory 404 under control of the CPU 401. As an alternative to the SSD, an MD may be used. The medium I/F 407 controls reading or writing of data with respect to a storage medium 406 such as the flash memory. The storage medium 406 is removable from the video conference terminal 400. The operation key (keys) 408 is operated by a user to input a user instruction such as a user selection of a communication destination of the video conference terminal 400. The power switch 409 is a switch that receives an instruction to turn on or off the power of the video conference terminal 400.

The network I/F 411 is an interface that controls communication of data between the video conference terminal 400 and an external device through the communication network 5 such as the internet. The camera 430 is a type of imaging device and includes an imaging element I/F 413 and a CMOS sensor 412. The CMOS sensor 412 is an example of a built-in imaging device configured to capture a subject under control of the CPU 401 to obtain image data. Note that the camera 430 may include an imaging device such as a CCD sensor instead of the CMOS sensor 412. The imaging element I/F 413 is a circuit that controls driving of the CMOS sensor 412. The microphone 414 is a built-in circuit that converts sound into an electric signal. The speaker 415 is a built-in circuit that generates sound such as music or voice by converting an electric signal into physical vibration. The audio input/output I/F 416 is a circuit for inputting or outputting an audio signal between the microphone 414 and the speaker 415 under control of the CPU 401. The display I/F 417 is a circuit for transmitting display data to an external display 420 under control of the CPU 401. The display 420 is a type of a display device that displays an image of a subject, an operation icon or the like. The display 420 is configured as a liquid crystal display or an organic electroluminescence (EL) display, for example. The display 420 is connected to the display I/F 417 by a cable 420c. The cable 420c may be an analog red green blue (RGB) (video graphic array (VGA)) signal cable, a component video cable, a high-definition multimedia interface (HDMI) (registered trademark) signal cable, or a digital video interactive (DVI) signal cable.

The external device connection I/F 418 is an interface for connecting various external devices. The external device connection I/F 418 is configured to connect an external device such as an external camera, an external microphone, or an external speaker through a USB cable or the like. When the external camera is connected, the external camera is driven in preference to the built-in CMOS sensor 412 under control of the CPU 401. Similarly, when the external microphone is connected or the external speaker is connected, the external microphone or the external speaker is driven in preference to the built-in microphone 414 or the built-in speaker 415 under control of the CPU 401. The short-range communication unit 419 is provided with a short-range communication circuit 419a and an antenna 419b for the short-range communication circuit 419a. The short-range communication circuit 419a is a communication circuit for short-range wireless communication such as the NFC, Bluetooth (registered trademark), millimeter wave wireless communication, QR code (registered trademark), visible light, environmental sound, or ultrasonic wave.

The bus line 410 is an address bus, a data bus, and the like for electrically connecting each component such as the CPU 401 illustrated in FIG. 7.

Figure 8:
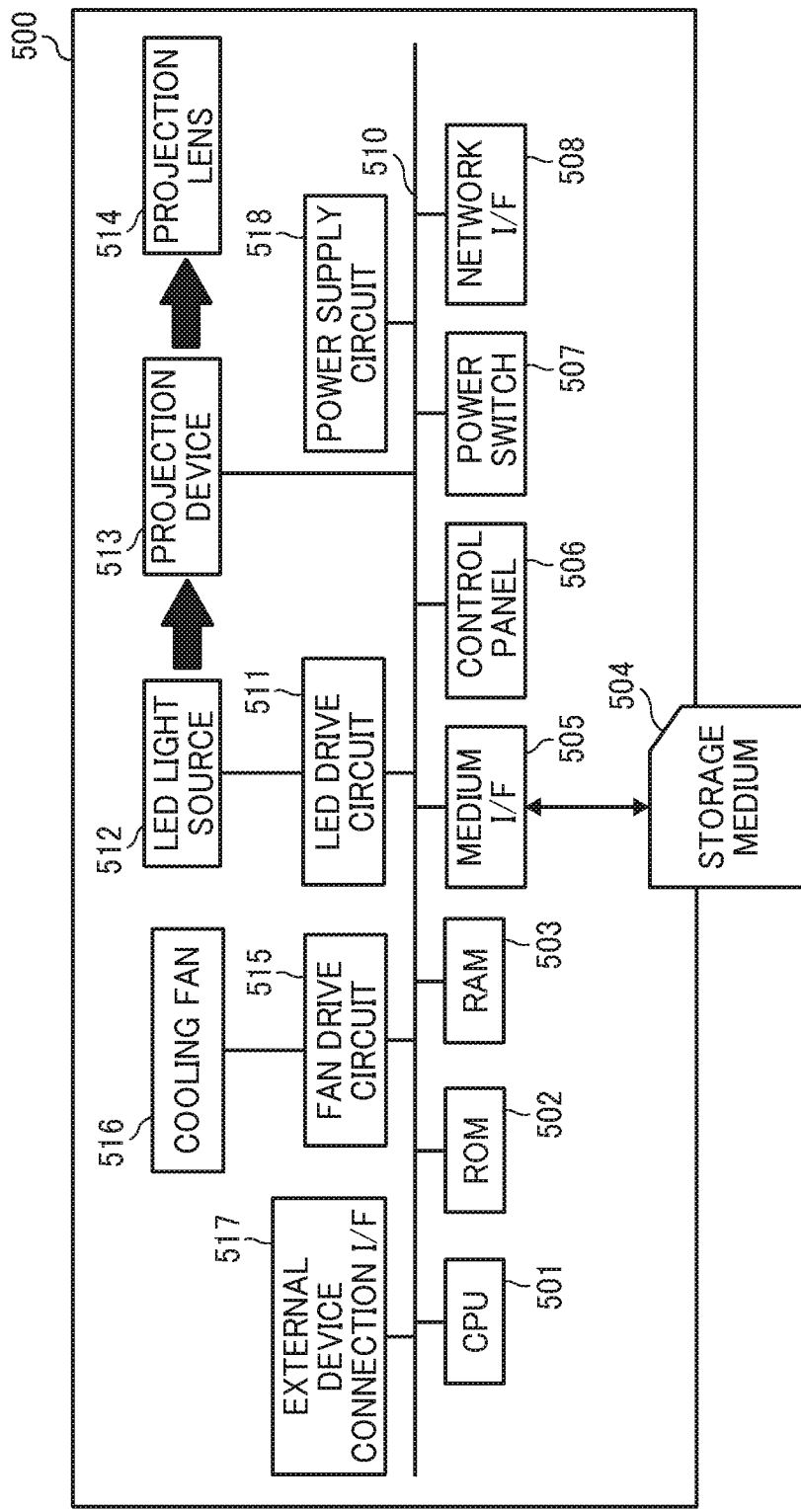
FIG. 8 is a block diagram illustrating an example of a hardware configuration of a projector.

FIG. 8 is a block diagram illustrating an example of a hardware configuration of the projector. As illustrated in FIG. 8, the projector 500 includes a CPU 501, a ROM 502, a RAM 503, a medium I/F 505, a control panel 506, a power switch 507, a network OF 508, a bus line 510, a light emitting diode (LED) drive circuit 511, an LED light source 512, a projection device 513, a projection lens 514, a fan drive circuit 515, a cooling fan 516, an external device connection I/F 517, and a power supply circuit 518.

The CPU 501 controls all operations of the projector 500. The ROM 502 stores a control program to drive the CPU 501. The RAM 503 is used as a work area for the CPU 501. The medium I/F 505 controls reading or writing of data with respect to a storage medium 504 such as the flash memory. The control panel 506 is provided with various keys, buttons, LEDs, and the like, and is used for performing various operations other than controlling the power of the projector 500 by the user. For example, the control panel 506 receives an instruction operation such as an operation for adjusting the size of a projected image, an operation for adjusting a color tone, an operation for adjusting a focus, and an operation for adjusting a keystone, and outputs the received operation content to the CPU 501. The power switch 507 is a switch for switching on or off the power of the projector 500. The network I/F 508 is an interface for performing data communication using the communication network 5 such as the internet. The bus line 510 is an address bus, a data bus, or the like for electrically connecting each component such as the CPU 501 illustrated in FIG. 8.

The LED drive circuit 511 controls turning on and off of the LED light source 512 under the control of the CPU 501. When turned on under the control of the LED drive circuit 511, the LED light source 512 irradiates the projection device 513 with projection light. The projection device 513 transmits the modulated light obtained by modulating the projection light from the LED light source 512 by the spatial light modulation method based on the image data given through the external device connection I/F 517 and the like, through the projection lens 514. The image is projected on the projection surface of the screen. A liquid crystal panel or a digital micromirror device (DMD) is used as the projection device 513, for example. The LED drive circuit 511, the LED light source 512, the projection device 513, and the projection lens 514 function as a projection unit that projects an image on a projection surface based on image data.

The fan drive circuit 515 is connected to the CPU 501 and the cooling fan 516 and drives or stops the cooling fan 516 based on a control signal from the CPU 501. The cooling fan 516 exhausts the air inside the projector 500 by rotating to cool the inside of the projector 500. The external device connection I/F 517 is directly connected to a PC and acquires a control signal and image data from the PC.

When the power is supplied, the CPU 501 starts up according to a control program stored in the ROM 502 in advance, supplies a control signal to the LED drive circuit 511 to turn on the LED light source 512, and supplies a control signal to the fan drive circuit 515 to rotate the cooling fan 516 at a rated speed. Further, when supply of power from the power supply circuit 518 is started, the projection device 513 enters an image displayable state, and power is supplied from the power supply circuit 518 to various other components in the projector 500. When the power switch 507 of the projector 500 is turned off, a power-off signal is sent from the power switch 507 to the CPU 501. When the CPU 501 detects the power-off signal, the CPU 501 supplies a control signal to the LED drive circuit 511 to turn off the LED light source 512. Then the CPU 501 transmits a control signal to the fan drive circuit 515 to stop the cooling fan 516, terminates its own control processing, and finally transmits an instruction to the power supply circuit 518 to stop supplying power.

Note that, in the hardware configuration of each apparatus, device or terminal described above, any recording medium such as an HD or a compact disk-read only memory (CD-ROM) in which a program is stored can be provided domestically or abroad as a program product. The personal information management apparatus 30 implements, for example, the data deletion request method according to the present disclosure by executing the program according to the present disclosure.

A description is now given of a functional configuration of the remote device management system 1. FIG. 9A and FIG. 9B are block diagrams illustrating an example of a functional configuration of the remote device management system. Note that FIG. 9A and FIG. 9B illustrate the terminal, apparatus, and device related to processing or operations described below, among the terminals, apparatuses, and devices illustrated in FIG. 1.

A description is now given of a functional configuration of the remote device management apparatus 10. The functions implemented by the remote device management apparatus 10 illustrated in FIG. 9A include a data exchange unit 11, a device information processing unit 12, a processing history information generation unit 13, a determination unit 14, a setting unit 15, and a storage/reading unit 19. These units are functions that are implemented by or that are caused to function by operating any of the elements illustrated in FIG. 4 in cooperation with the instructions of the CPU 101 of the remote device management apparatus 10 according to the control program expanded from the HD 104 of the remote device management apparatus 10 to the RAM 103 of the remote device management apparatus 10. In addition, the remote device management apparatus 10 includes a storage unit 1000 configured as the HD 104 or the like of the remote device management apparatus 10 illustrated in FIG. 4.

The data exchange unit 11 is implemented by a command from the CPU 101 of the remote device management apparatus 10 and the network I/F 109 of the remote device management apparatus 10 illustrated in FIG. 4, and communicates with another device, apparatus, or terminal through the communication network 5. The data exchange unit 11 is a function for exchanging various data (information) between the other device, apparatus, or terminal. The data exchange unit 11 receives, for example, the device information transmitted from the device 50, and transmits (transfers) the received device information to the device information utilization apparatus 90. In addition, the data exchange unit 91 transmits, for example, the processing history information generated by the processing history information generation unit 13 to the personal information management apparatus 30. Further, the data exchange unit 11 transmits, for example, a personal data definition updated (set) by the setting unit 15 described below to the device 50.

The device information processing unit 12 is a function implemented by a command from the CPU 101 of the remote device management apparatus 10 illustrated in FIG. 4 and performs processing on the device information stored in the device information management DB 1007. The device information processing unit 12 performs a predetermined process on the device information stored in the device information management DB 1007 according to the processing information stored in a processing information management DB 1005 described below (refer to FIGS. 12A and 12D), for example. Here, the predetermined process executed by the device information processing unit 12 is a process of storing or deleting the device information or transferring or moving of the device information to the other processing apparatus. Further, the device information processing unit 12, for example, adds personal data information indicating the personal information, to the data items included in the personal data definition of a personal data definition management table described below (refer to FIG. 11) among the device event data received by the data exchange unit 11.

The processing history information generation unit 13 is implemented by a command from the CPU 101 of the remote device management apparatus 10 illustrated in FIG. 4 and generates the processing history information indicating processing executed by the remote device management apparatus 10 with respect to the device information received by the data exchange unit 11. The processing history information generation unit 13 generates, for example, the processing history information indicating the kind of processing (storage, transfer, move, or the like) on the device information executed by the device information processing unit 12.

The determination unit 14 is a function implemented by a command from the CPU 101 of the remote device management apparatus 10 illustrated in FIG. 4 and makes a determination on a predetermined request.

The setting unit 15 is implemented by a command from the CPU 101 of the remote device management apparatus 10 illustrated in FIG. 4 and sets or updates personal data definition stored in a personal data definition management DB 1003 (refer to FIG. 11) described below.

The storage/reading unit 19 is implemented by a command from the CPU 101 of the remote device management apparatus 10 illustrated in FIG. 4 and has a function of storing various data in the storage unit 1000 and reading various data from the storage unit 1000. The storage unit 1000 stores a user information management DB 1001 (refer to FIG. 10), the personal data definition management DB 1003 (refer to FIG. 11), the processing information management DB 1005 (refer to FIGS. 12A to 12D), and a device information management DB 1007 for storing the device information received by the data exchange unit 11.

FIG. 10 is a conceptual diagram illustrating an example of the user information management table. In the storage unit 1000, the user information management DB 1001 storing the user information management table as illustrated in FIG. 10 is stored. In the user information management table, a customer ID for identifying a customer who is an administrator of the device 50 and a user ID for identifying an individual user who uses the device 50 are stored in association with each other. The customer identified by the customer ID is, for example, a customer company, a local government, an organization, or the like that has contracted to use the device 50.

FIG. 11 is a conceptual diagram illustrating an example of the personal data definition management table. In the storage unit 1000, the personal data definition management DB 1003 storing the personal data definition management table as illustrated in FIG. 11 is stored. The personal data definition management table includes personal data definitions for identifying personal information for each region. The personal data definition includes, among the items included in the device event data generated by the device 50, contents indicating items to be handled as the personal information. Further, as illustrated in FIG. 11, the personal data definition management DB 1003 has a personal data definition management table that differs for each area. Here, the area is, for example, a unit such as an organizational unit such as the EU, a regional community, a country, a region, a municipal government, or the like. Different personal data definitions are applied to the personal data definition management table depending on the region where the device 50 is installed or the region to which the service provided by the management system 2 is applied. The remote device management system 1 treats, as the personal information, data of the item corresponding to the personal data definition illustrated in the personal data definition management table among the data illustrated in the device event data generated by the device 50.

In the example of FIG. 11, in the personal data definition management table whose area is "EU", for example, as the personal data definition, device administrator name, telephone number, address, internet protocol (IP) address, and user ID are included. Here, "user ID; ALL" indicates that all data associated with an unspecified user ID is handled as the personal information. On the other hand, when a specific user ID is indicated instead of "ALL", such as "user ID; AAA0001", data associated with the specific user ID (AAA0001) is treated as the personal information. Further, the personal data definition management table whose area is "JP" includes, for example, items of a device administrator name, a telephone number, an address, and an IP address as the personal data definitions. The area may be defined in units of an organization such as a company. The personal data definition is an example of confidential data definition information indicating a specific item including confidential information among items included in the device event data.

FIGS. 12A and 12D are conceptual diagrams illustrating examples of the processing information management table included in the remote device management apparatus 10. In the storage unit 1000, a processing information management DB 1005 storing a processing information management table as illustrated in FIG. 12A or 12D is stored. The processing information management table includes processing information stored for each remote device management apparatus 10 and indicates the content of processing that the remote device management apparatus 10 executes on the device information. FIG. 12A is an example of the processing information management table included in the remote device management apparatus 10a illustrated in FIG. 2, and FIG. 12D is the processing information management table included in the remote device management apparatus 10b illustrated in FIG. 2. Each processing information management table includes a destination name and destination information indicating a destination to which the remote device management apparatus 10 transmits the device information, and information indicating the content of processing. In the example of FIG. 12A, the content of processing is "storage/transfer", the destination name is "device information utilization apparatus 90a", and the destination information is "remoteA.co.jp". The remote device management apparatus 10a stores the device information in the device information management DB 1007a and transmits the device information to the device information utilization apparatus 90a (remoteA.co.jp). In the example of FIG. 12D, since the content of processing is "storage", the remote device management apparatus 10b stores the device information in the device information management DB 1007b. The processing information included in the processing information management table is set in advance by the system administrator and can be appropriately changed by the system administrator.

A description is now given of a functional configuration of the personal information management apparatus 30. The functions implemented by the personal information management apparatus 30 illustrated in FIG. 9A include a data exchange unit 31, a processing history information management unit 32, a determination unit 33, a generation unit 34, and a storage/reading unit 39. These units are functions that are implemented by or that are caused to function by operating any of the elements illustrated in FIG. 4 in cooperation with the instructions of the CPU 101 of the personal information management apparatus 30 according to the control program expanded from the HD 104 of the personal information management apparatus 30 to the RAM 103 of the personal information management apparatus 30. In addition, the personal information management apparatus 30 includes a storage unit 3000 implemented by the HD 104 or the like of the personal information management apparatus 30 illustrated in FIG. 4.

The data exchange unit 31 is implemented by a command from the CPU 101 of the personal information management apparatus 30 and the network I/F 109 of the personal information management apparatus 30 illustrated in FIG. 4 and exchanges various data (information) with another device, apparatus, or terminal through the communication network 5. The data exchange unit 31 receives (acquires) the processing history information for identifying the processing apparatus in which device information (device event data) is stored, for example, from the remote device management apparatus 10 or the device information utilization apparatus 90. In addition, the data exchange unit 31 receives, for example, a request for deleting data related to the personal information from the device 50 or the user terminal 60. Further, the data exchange unit 31 sends a request to delete data related to the personal information to the processing apparatus (the remote device management apparatus 10 or the device information utilization apparatus 90) identified by the received (acquired) processing history information based on, for example, a request for deleting data relating to the personal information. Further, the data exchange unit 31 transmits, for example, deletion history information indicating a deletion history of data stored in the processing apparatus to the device 50 or the user terminal 60.

The processing history information management unit 32 is implemented by a command from the CPU 101 of the personal information management apparatus 30 illustrated in FIG. 4 and performs processing on the processing history information stored in a processing history information management DB 3003 (refer to FIG. 14) described below. The processing history information management unit 32 updates, for example, the processing history information stored in the processing history information management DB 3003 in response to the processing history information or the deletion result notification transmitted from the remote device management apparatus 10 or the device information using apparatus 90.

The determination unit 33 is a function implemented by a command from the CPU 101 of the personal information management apparatus 30 illustrated in FIG. 4 and makes a determination on a predetermined request.

The generation unit 34 is a function implemented by a command from the CPU 101 of the personal information management apparatus 30 illustrated in FIG. 4 and generates various data (information) to be provided to the device 50. The generation unit 34 generates deletion history information indicating a deletion history of the personal information, for example, in response to a request from a user.

The storage/reading unit 39 is implemented by a command from the CPU 101 of the personal information management apparatus 30 illustrated in FIG. 4 and has a function of storing various data in the storage unit 3000 and reading various data from the storage unit 3000. In the storage unit 3000, a contract information management DB 3001 (refer to FIG. 13A), a user destination information management DB 3002 (refer to FIG. 13B), and a processing history information management DB 3003 (refer to FIG. 14) are stored.

FIG. 13A is a conceptual diagram illustrating an example of the contract information management table. In the storage unit 3000, the contract information management DB 3001 storing the contract information management table as illustrated in FIG. 13A is stored. The contract information management table stores contract information of the administrator for each device 50. The contract information management table includes a device name and a device ID for identifying the device 50, a model number ID for identifying the model and device number of the device 50, and a customer ID for identifying a customer who is an administrator of the device 50. In the example of FIG. 13A, the contract information management table indicates that the device name "MFP200" and the device ID "MP30" have the model number "MP30-1234", "MP30-1241", "MP30-4359" and the customer ID "AAA" of the administrator of the device 50 and the model number are stored in association with each other. Also, in the contract information management table, the device name "IWB 300", the device ID "IWB45", the model number IDs "IWB45-5678" and "IWB45-7896" of the device 50, are stored in association with the customer ID "BBB" of the device administrator. The contract information included in the contract information management table may include a name of manufacturer of the device 50 as information for identifying the device 50.

FIG. 13B is a conceptual diagram illustrating an example of the user destination information management table. In the storage unit 3000, a user destination information management DB 3002 storing the user destination information management table as illustrated in FIG. 13B is stored. In the user destination information management table, user destination information indicating the destination of the user for a predetermined application executed using the device 50 or the user terminal 60 is stored. The predetermined application is, for example, an application (service or function) executed using a web browser or an external application installed in the device 50 or the user terminal 60. The application executed by using the web browser or the external application is, for example, an e-mail system or a chat system. The user destination information management table includes the user ID for identifying an individual user who uses the device 50 and the user destination information. The user destination information is, for example, a mail address, an application ID assigned to each individual user, and the like. In the example of FIG. 13B, the user destination information management table stores, for example, the user ID "AAA0001", "xxx.co.jp" as the user destination information, and the ID of the application A (appA) "0101xx" is associated therewith.

FIG. 14 is a conceptual diagram illustrating an example of a processing history information management table. In the storage unit 3000, a processing history information management DB 3003 storing the processing history information management table as illustrated in FIG. 14 is stored. The processing history information management table stores the processing history information indicating the processing history of the device information executed by the remote device management apparatus 10 and the device information utilization apparatus 90. The processing history information management table includes, as the processing history information, data identification information for identifying the device information (device event data) and processing content identification information for identifying the processing content for the device information (device event data). The data identification information includes a device name and a device ID for identifying the device 50 on which the device event related to the device information to be processed has been executed, the model number ID for identifying the model number of the device 50 on which the device event related to the device information to be processed has been executed, and a device information ID for identifying the device information to be processed. The processing content identification information includes processing server information indicating the apparatus that has performed the process on the device information, transmission destination information indicating information on the device to which the device information is transmitted, the processing history information indicating the content of the executed process, and the processing time at which the processing was executed by each device. Further, the processing server information and the transmission destination information include a server name and destination information indicating the corresponding apparatus, and region information indicating a region to which the corresponding apparatus belongs. The processing history information indicates the type of processing such as storage, transfer, deletion, and move. The personal information management apparatus 30 can identify the device in which the device information identified by the associated data identification information is stored, based on the processing content identification information indicated in the processing history information management table. The processing history information is an example of apparatus identification information for identifying the processing apparatus in which device information is stored. Note that the data identification information may include the manufacturer name of the device 50 as information for identifying the device 50. Further, the processing content identification information may include, as the processing history information, the content of a service or the like in which device information is used by the corresponding device.

A description is now given of a functional configuration of the administrator terminal 40. The functions implemented by the administrator terminal 40 illustrated in FIG. 9A include a data exchange unit 41, an acceptance unit 42, and a display control unit 43. These units are functions that are implemented by or that are caused to function by operating any of the elements illustrated in FIG. 4 in cooperation with the instructions of the CPU 101 of the administrator terminal 40 according to the control program expanded from the HD 104 of the administrator terminal 40 to the RAM 103 of the administrator terminal 40.

The data exchange unit 41 is implemented by a command from the CPU 101 of the administrator terminal 40 and the network I/F 109 of the administrator terminal 40 illustrated in FIG. 4 and exchanges various data (information) with the another device, apparatus, or terminal. The data exchange unit 41 transmits, for example, a personal data definition update request to the personal information management apparatus 30.

The acceptance unit 42 is implemented by a command from the CPU 101 of the administrator terminal 40 illustrated in FIG. 4 and has a function of accepting input to an input device such as the keyboard 111 of the administrator terminal 40 illustrated in FIG. 4. The acceptance unit 42 accepts a request for updating personal data definition, for example, by an input operation on a personal data definition setting screen 4100 (refer to FIG. 40) displayed on the display 108 of the administrator terminal 40.

The display control unit 43 is implemented by a command from the CPU 101 of the administrator terminal 40 illustrated in FIG. 4 and has a function of displaying various screen information on the display 108 of the administrator terminal 40 illustrated in FIG. 4. The display control unit 43 causes the display 108 of the administrator terminal 40 to display, for example, the personal data definition setting screen 4100 (refer to FIG. 40) for receiving an input operation by the user.

A description is now given of a functional configuration of the device 50. The functions implemented by the device 50 illustrated in FIG. 9B include a data exchange unit 51, a device event execution unit 52, a device information generation unit 53, a device information processing unit 54, a determination unit 55, an acceptance unit 56, a display control unit 57, and a storage/reading unit 59. These units are functions that are implemented by or that are caused to function by operating any of the elements illustrated in FIG. 4 in cooperation with the instructions of the CPU (CPU 101, CPU 201, CPU 301, CPU 401, or CPU 501) according to the control program expanded to the RAM (RAM 103, RAM 202b, RAM 303, or RAM 403). Also, the device 50 includes a storage unit 5000 implemented by the HD 104 illustrated in FIG. 4, the HD 209 illustrated in FIG. 5, the SSD 304 illustrated in FIG. 6, the SSD 405 or the storage medium 406 illustrated in FIG. 7, or the storage medium 504 illustrated in FIG. 8.

The data exchange unit 51 is implemented by a command from the CPU (CPU 101, CPU 201, CPU 301, CPU 401, or CPU 501) illustrated in FIGS. 4 to 8 and a network I/F (network I/F 109, network I/F 250, network I/F 305, network I/F 411 or network I/F 508) illustrated in FIGS. 4 to 8 and is a function for exchanging various data (information) with other devices, apparatuses, or terminals. The data exchange unit 51 transmits the device information generated by the device information generation unit 53 to the remote device management apparatus 10, for example. The data exchange unit 51 transmits, for example, the personal information deletion request for requesting deletion of the personal information to the personal information management apparatus 30. Further, the data exchange unit 51 transmits, for example, a deletion history inquiry request requesting an inquiry about the deletion history of the personal information to the personal information management apparatus 30. In addition, the data exchange unit 51 receives, for example, deletion history information indicating a deletion history of the personal information from the personal information management apparatus 30. Further, the data exchange unit 51 receives, for example, data identification information for identifying the device information and the processing content identification information for identifying the content of processing for the device information from the personal information management apparatus 30. In addition, the data exchange unit 51 transmits, to the personal information management apparatus 30, for example, a request to delete the device information selected using a processing target selection screen 6000a or 6000b (refer to FIG. 33 or FIG. 36) described below.

The device event execution unit 52 is implemented by a command from the CPU (CPU 101, CPU 201, CPU 301, CPU 401, or CPU 501) illustrated in FIGS. 4 to 8 and executes a device event specific to the device 50. The device event is a process or operation that occurs to execute a function or service of the device 50. In addition, the device event execution unit 52 acquires, for example, device event data indicating the content of the device event that is the execution result of the device event. For example, when the device 50 is the MFP 200, the device event execution unit 52 executes printing by the printer controller 232 illustrated in FIG. 5 or scanning by the scanner controller 231 illustrated in FIG. 5. For example, when the device 50 is the electronic whiteboard 300, the device event execution unit 52 executes a process of generating image data of an image drawn on the display 320 illustrated in FIG. 6. Further, for example, when the device 50 is the video conference terminal 400, the device event execution unit 52 performs a video conference (remote conference) using image data captured by the camera 430 illustrated in FIG. 7. Further, for example, when the device 50 is the projector 500, the device event execution unit 52 executes a projection process of an image using the projection device 513 or the like illustrated in FIG. 8.

The device information generation unit 53 is implemented by a command from the CPU (CPU 101, CPU 201, CPU 301, CPU 401, or CPU 501) illustrated in FIGS. 4 to 8 and generates the device information in which information indicating the presence or absence of the personal information is added to device event data indicating the content of the device event executed by the device event execution unit 52. The device information generation unit 53, for example, adds the personal data information for identifying the personal information for items corresponding to the personal data definitions stored in personal data definition management DB 5001 (refer to FIG. 11), among the items included in the device event data. The device information generation unit 53 generates the device information including, for example, device event data and user information for identifying a user of the device 50.

The device information processing unit 54 is implemented by a command from the CPU (CPU 101, CPU 201, CPU 301, CPU 401, or CPU 501) illustrated in FIGS. 4 to 8 and performs processing on the device information stored in the device information management DB 5003. The device information processing unit 54 deletes the device information stored in the device information management DB 5003, for example, in response to a request for deleting the personal information accepted by the acceptance unit 56.

The determination unit 55 is a function implemented by a command from the CPU (CPU 101, CPU 201, CPU 301, CPU 401, or CPU 501) illustrated in FIGS. 4 to 8 and makes a determination on a predetermined request. The determination unit 55 identifies, for example, the user information for identifying the user of the device 50 based on input accepted by the acceptance unit 56.

The acceptance unit 56 is implemented by a command from the CPU (CPU 101, CPU 201, CPU 301, CPU 401, or CPU 501) illustrated in FIGS. 4 to 8 and receives input operation on the input device (such as the keyboard 111, the operation panel 240b, the display 320, the operation key 408, or the control panel 506. The acceptance unit 56 accepts, for example, a predetermined input operation for causing the device event execution unit 52 to execute the device event. The acceptance unit 56 accepts, for example, a selection of the device information identified by the data identification information, using the processing target selection screen 6000*a* or 6000*b* (refer to FIG. 33 or FIG. 36) described below.

The display control unit 57 is implemented by a command from the CPU (CPU 101, CPU 201, CPU 301, CPU 401, or CPU 501) illustrated in FIGS. 4 to 8 and displays various screen information on the display of the device 50 (the display 108, the panel display 240*a*, the display 320 or the display 420). The display control unit 57 displays, for example, the processing target selection screen 6000*a* or 6000*b* (refer to FIG. 33 or FIG. 36) and a deletion history notification screen 6500 (refer to FIG. 38) described below on the display.

The storage/reading unit 59 is implemented by a command from the CPU (CPU 101, CPU 201, CPU 301, CPU 401, or CPU 501) illustrated in FIGS. 4 to 8, stores various data in the storage unit 5000, and reads various data from the storage unit 5000. In the storage unit 5000, a personal data definition management DB 5001 storing the personal data definition management table illustrated in FIG. 11 and a device information management DB 5003 storing the device information generated by the device information generation unit 53 are stored. The storage unit 5000 stores destination information 5005 indicating the destination of the remote device management apparatus 10 and the destination of the personal information management apparatus 30. The destination information 5005 is, for example, the IP address of the remote device management apparatus 10 and the IP address of the personal information management apparatus 30.

A description is now given of a functional configuration of the user terminal 60. The functions implemented by the user terminal 60 illustrated in FIG. 9B include a data exchange unit 61, an acceptance unit 62, and a display control unit 63. These units are functions that are implemented by or that are caused to function by operating any of the elements illustrated in FIG. 4 in cooperation with the instructions of the CPU 101 of the user terminal 60 according to the control program expanded from the HD 104 of the user terminal 60 to the RANI 103 of the user terminal 60.

The data exchange unit 61 is implemented by a command from the CPU 101 of the user terminal 60 and the network I/F 109 of the user terminal 60 illustrated in FIG. 4 and exchanges various data (information) with another device, apparatus, or terminal. The data exchange unit 61 transmits, for example, the personal information deletion request for requesting deletion of the personal information to the personal information management apparatus 30. Further, the data exchange unit 61 transmits, for example, a deletion history inquiry request inquiring about the deletion history of the personal information to the personal information management apparatus 30. In addition, the data exchange unit 51 receives, for example, deletion history information indicating a deletion history of the personal information from the personal information management apparatus 30. Also, the data exchange unit 51 receives, for example, the data identification information for identifying the device information and the processing content identification information for identifying the processing content for the device information from the personal information management apparatus 30. In addition, the data exchange unit 51 transmits, to the personal information management apparatus 30, for example, a request to delete device information selected using the processing target selection screen 6000*a* or 6000*b* (refer to FIG. 33 or FIG. 36) described below.

The acceptance unit 62 is implemented by a command from the CPU 101 of the user terminal 60 illustrated in FIG. 4 and has a function of accepting input to an input device such as the keyboard 111 of the user terminal 60 illustrated in FIG. 4. The acceptance unit 62 accepts the selection of the device information identified by the data identification information, for example, using the processing target selection screen 6000*a* or 6000*b* (refer to FIG. 33 or FIG. 36) displayed on the display 108 of the user terminal 60.

The display control unit 63 is implemented by a command from the CPU 101 of the user terminal 60 illustrated in FIG. 4 and has a function of displaying various screen information on the display 108 of the user terminal 60 illustrated in FIG. 4. The display control unit 63 displays the processing target selection screen 6000*a* or 6000*b* (refer to FIG. 33 or 36) relating to image data generated by HyperText Markup Language (HTML) or the like using a web browser or the like, on the display 108 of the user terminal 60.

A description is now given of a functional configuration of the device information utilization apparatus 90. The functions implemented by the device information utilization apparatus 90 illustrated in FIG. 9B include a data exchange unit 91, a device information processing unit 92, a processing history information generation unit 93, a determination unit 94, and a storage/reading unit 99. These units are functions that are implemented by or that are caused to function by operating any of the elements illustrated in FIG. 4 in cooperation with the instructions of the CPU 101 according to the control program expanded from the HD 104 to the RAM 103. The device information utilization apparatus 90 further includes a storage unit 9000 implemented by, for example, the HD 104 illustrated in FIG. 4.

The data exchange unit 91 is implemented by a command from the CPU 101 of the device information utilization apparatus 90 and the network I/F 109 of the device information utilization apparatus 90 illustrated in FIG. 4 and exchanges various data (information) with the another device, apparatus, or terminal. The data exchange unit 91 receives, for example, the device information transmitted from the other processing apparatus and transmits (transfers) the received device information to the other processing apparatus. In addition, the data exchange unit 91 transmits, for example, the processing history information generated by the processing history information generation unit 93 to the personal information management apparatus 30.

The device information processing unit 92 is implemented by a command from the CPU 101 of the device information utilization apparatus 90 illustrated in FIG. 4 and performs processing on the device information stored in the device information management DB 9003. The device information processing unit 92 performs a predetermined process on the device information stored in the device information management DB 9003 according to the processing information stored in a processing information management DB 9001 described below (refer to FIGS. 12B and 12C), for example. Here, the predetermined process executed by the device information processing unit 92 is a process of storing the device information or transferring or moving the device information to the other device information utilization apparatus 90.

The processing history information generation unit 93 is implemented by a command from the CPU 101 of the device information utilization apparatus 90 illustrated in FIG. 4 and generates the processing history information indicating processing executed by the device information utilization apparatus 90 with respect to the device information received by the data exchange unit 91. The processing history information generation unit 93 generates, for example, the processing history information indicating the type of processing (storage, transfer, move, or the like) on the device information executed by the device information processing unit 92.

The determination unit 94 is implemented by a command from the CPU 101 of the device information utilization apparatus 90 illustrated in FIG. 4 and makes a determination on a predetermined request.

The storage/reading unit 99 is implemented by a command from the CPU 101 of the device information utilization apparatus 90 illustrated in FIG. 4 and has a function of storing various data in the storage unit 9000 and reading various data from the storage unit 9000. The storage unit 9000 stores a processing information management DB 9001 (refer to FIGS. 12A to 12D), and a device information management DB 9003 for storing the device information received by the data exchange unit 91.

FIGS. 12B and 12C are conceptual diagrams illustrating examples of the processing information management table included in the device information utilization apparatus 90. In the storage unit 9000, a processing information management DB 9001 storing the processing information management table as illustrated in FIG. 12B or 12C is stored. The processing information management table includes processing information stored for each device information utilization apparatus 90 and indicates content of a process executed by the device information utilization apparatus 90 on the device information. FIG. 12B is an example of the processing information management table of the device information utilization apparatus 90a illustrated in FIG. 1, and FIG. 12C is an example of the processing information management table of the device information utilization apparatus 90b illustrated in FIG. 1. Each processing information management table includes a destination name and destination information indicating a destination to which the device information utilization apparatus 90 transmits the device information, and information indicating the content of processing. In the example of FIG. 12B, the content of processing is "transfer", the destination name is "device information utilization apparatus 90b", and the destination information is "remoteB.co.eu". The device information utilization apparatus 90a transmits the device information to the device information utilization apparatus 90b (remoteB.co.eu). In this example, the device information utilization apparatus 90a does not store the device information in its own device (device information management DB 9003a) because "storage" is not indicated in the processing content. In the example of FIG. 12C, since the content of processing is "storage", the device information utilization apparatus 90b stores the device information in the device information management DB 9003b. The processing information included in the processing information management table is set in advance by the system administrator and can be appropriately changed by the system administrator.

Figure 15:
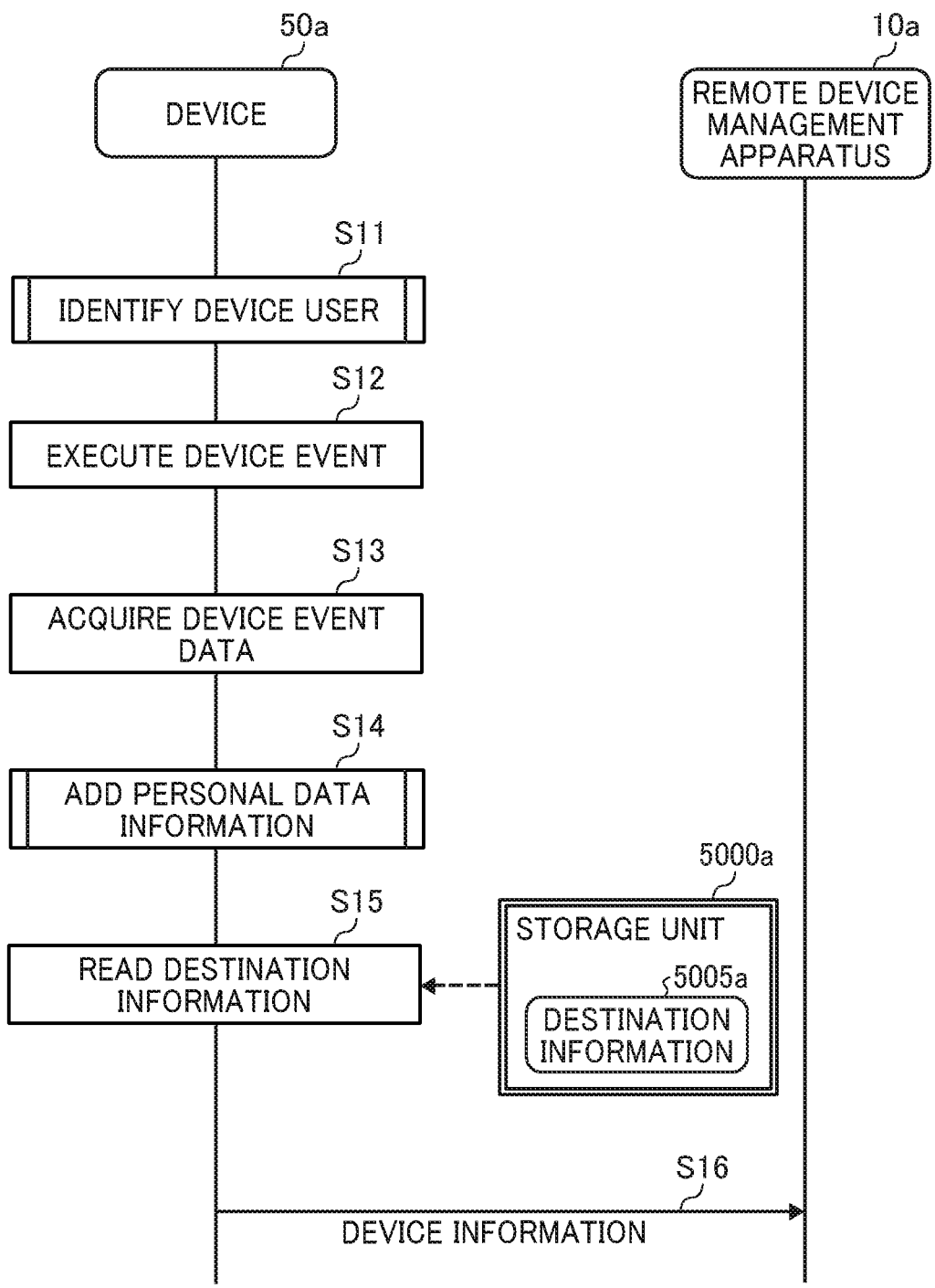
FIG. 15 is a sequence diagram illustrating an example of a device information acquisition process in the remote device management system.

A description is given now of processes executed by the remote device management system according to the present embodiment with reference to FIG. 15 to FIG. 55. First, a process executed by the remote device management apparatus 10a to acquire the device information transmitted from the device 50a is described with reference to FIG. 15 to FIG. 18. FIG. 15 is a sequence diagram illustrating an example of a device information acquisition process in the remote device management system. In the example illustrated in FIG. 15, the device 50a is the MFP 200, but the type of the device is not limited to the MFP 200.

In step S11, the device 50a identifies a user who uses the device 50a. Although details of the process of identifying the user is described below (refer to FIGS. 41 to 44), for example, the device 50a identifies the user of the device 50a by accepting the input of the user information (user ID and password) to the operation panel 240b illustrated in FIG. 5 by the acceptance unit 56.

In step S12, the device event execution unit 52a of the device 50a executes a device event according to an input operation or the like on the device 50a. The device event is a process or operation to execute a function or service of the device 50a. In this example, the MFP 200 as the device 50a executes printing by the printer controller 232 illustrated in FIG. 5 or scanning by the scanner controller 231 illustrated in FIG. 5 by the device event execution unit 52a.

In step S13, the device event execution unit 52a of the device 50a acquires device event data indicating the content of the executed device event. The device event data is data indicating a result of the device event executed by the device event execution unit 52a.

FIG. 16 is a diagram illustrating an example of the device event data. The device event data illustrated in FIG. 16 is data generated when the copy and print processes are executed by the MFP 200 (device 50a). The device event data includes device specific information, which is information unique to the device 50a, and event history information indicating the execution result of the event executed in the device 50a. The device specific information includes a device ID, a model number ID, a device administrator name, a telephone number, an address, a device software version, and an IP address. The device ID and the model number ID indicate the information for identifying the device 50a and the model number on which the device event was executed, and the device administrator name indicates the name of an administrator of the device 50a. The telephone number and the address indicate information on the administrator of the device 50 or the organization, company, and the like to which the administrator of the device 50 belongs. The device software version indicates the version of the software installed on the device 50a, and the IP address indicates the IP address of the device 50a. The event history information includes toner information, a user name, and a counter. The toner information indicates a remaining amount of toner in the MFP 200 (for example, a small amount of cyan), and the user name is the name of the individual user who executed the device event (for example, the user name "Ricoh Hanako" having the user ID "AAA0001"), and the counter indicates the execution result of the device event (for example, 100 copies, 100 prints). Each item included in the event history information is associated with event occurrence time information indicating the time at which the device event occurred. Note that the items included in the device specific information may differ depending on the type of the device 50a, and the items included in the event history information may differ depending on the type of the device 50a and the content of the device event executed by the device 50a.

Figure 17:
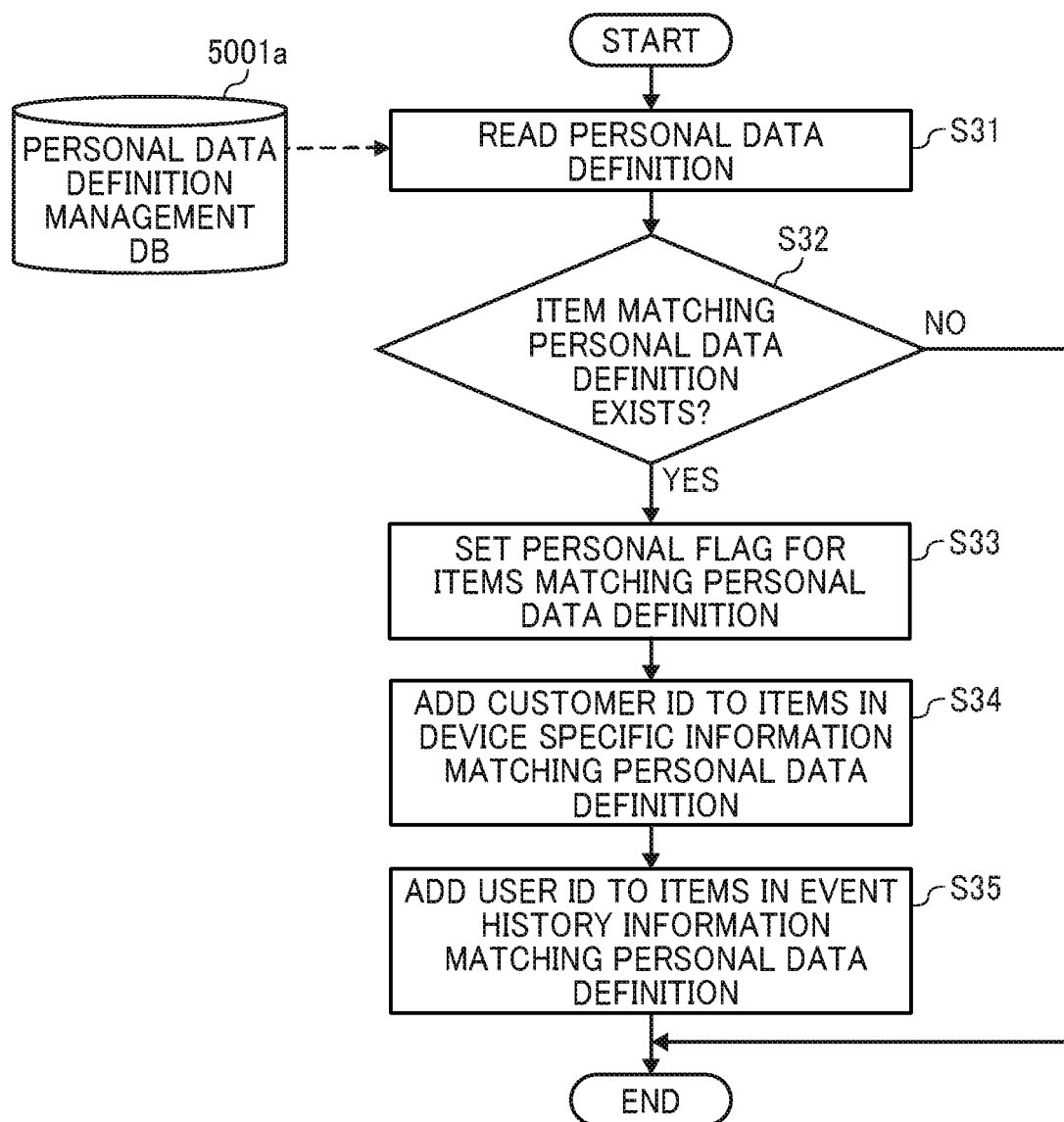
FIG. 17 is a flowchart illustrating an example of a process of providing personal data information.

In step S14, when the device event data is acquired in step S13, the device 50a executes a process of adding the personal data information for identifying the personal information included in the acquired device event data. A detailed description is now given of the process of adding the personal data information in the device 50a with reference to FIG. 17. FIG. 17 is a flowchart illustrating an example of a process of providing the personal data information.

In step S31, the storage/reading unit 59a of the device 50a reads a personal data definition stored in the personal data definition management table by searching the personal data definition management DB 5001a. When the personal data definition management table exists for each area as illustrated in FIG. 11, the storage/reading unit 19a reads the personal data definition included in the personal data definition management table corresponding to an area set in advance according to the use purpose, installation location, and the like of the device 50a. In the following description, for example, the storage/reading unit 19a reads the personal data definition included in the personal data definition management table corresponding to the area "EU".

In step S32, when the device event data acquired in step S13 includes an item that matches the personal data definition read in step S31, the determination unit 55a of the device 50a shifts the processing to step S33. On the other hand, when there is no item in the device event data acquired in step S13 that matches the personal data definition read in step S31, the determination unit 55a ends the process.

In step S33, the device information generation unit 53a of the device 50a sets a personal flag t on the item that matches the personal data definition included in the device event data. The personal flag is a flag for identifying the personal information among information included in the device event data.

In step S34, the device information generation unit 53a of the device 50a adds the customer ID for identifying the administrator of the device 50a to each item of the device specific information that is information unique to the device 50a among the items that match the personal data definition included in the device event data.

In step S35, the device information generation unit 53a of the device 50a adds the user ID for identifying the individual user who has executed the device event in step S12, to the items that match the personal data definition included in the device event data, among each item of the event history information indicating the result of the event executed in the device 50a. Accordingly, the device information generation unit 53a of the device 50a generates device information in which the personal data information is added to the device event data. FIG. 18 is a diagram illustrating an example of the device information generated in the process of FIG. 17. In the device information illustrated in FIG. 18, the personal data information is added to items corresponding to the personal data definition for the area "EU" illustrated in FIG. 11. The personal data information is information for identifying items including the personal information among the items included in the device event data. The personal data information includes the personal flag for identifying the personal information and the user information for identifying the user who has executed the device event. Personal data information is an example of confidential data information. The user information is an example of user identification information.

Among the items included in the device event data illustrated in FIG. 16, the personal information can be identified on the device information illustrated in FIG. 18, by setting the personal flag to the item corresponding to the personal data definition in step S33. The administrator of the device 50a on which the device event has been executed can be identified on the device information illustrated in FIG. 18, by adding the customer ID (for example, MP30-1234; AAA) as the user information to the device specific information item corresponding to the personal data definition in step S34. In addition, the individual user who has executed the device event using the device 50a can be identified on the device information illustrated in FIG. 18, by adding the user ID (for example, MP30-1234; AAA0001) as the user information to the item of event history information corresponding to the personal data definition in step S35. Thereby, the device 50a can identify the data corresponding to the personal information among the device event data and delete just the data to with the personal data information added, by adding the personal data information to the items corresponding to the personal information for the device event data indicating the content of the executed device event. The device 50a can identify and delete data relating to the user requesting deletion of the personal data by generating the device information including the user information indicating the user whose generated device information is treated as personal information.

Returning to FIG. 15, the description of the device information acquisition process in the remote device management system 1 is continued. In step S15, the storage/reading unit 59a of the device 50a reads the destination information 5005a of the remote device management apparatus 10a stored in the storage unit 5000a. Then, in step S16, the data exchange unit 51a of the device 50a transmits the device information generated in the processing of FIG. 17 to the remote device management apparatus 10a indicated by the destination information 5005a read in step S15.

Note that the process of adding the personal data information illustrated in FIG. 17 may be executed by the remote device management apparatus 10a. In this case, the data exchange unit 51a of the device 50a transmits the device event data acquired by the device event execution unit 52a to the remote device management apparatus 10a. The device information processing unit 12a of the remote device management apparatus 10a generates the device information with the personal data information added based on the device event data received by the data exchange unit 11a and the personal data definition stored in the personal data definition management DB 1003a. The process of generating the device information in the device information processing unit 12a is the same as the process illustrated in FIG. 17.

Figure 19:
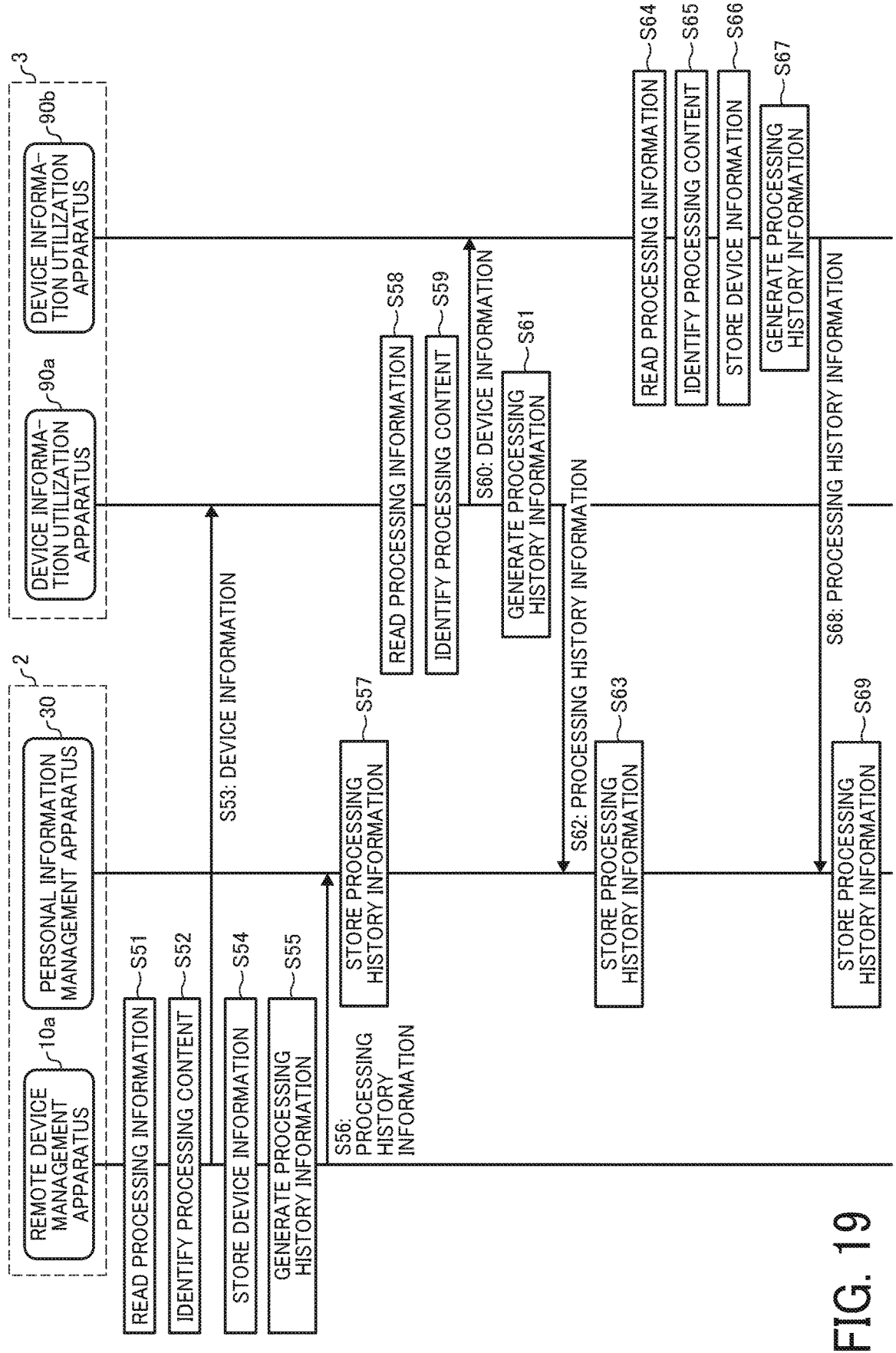
FIG. 19 is a sequence diagram illustrating an example of a device information storage process in the remote device management system.
Figure 20:
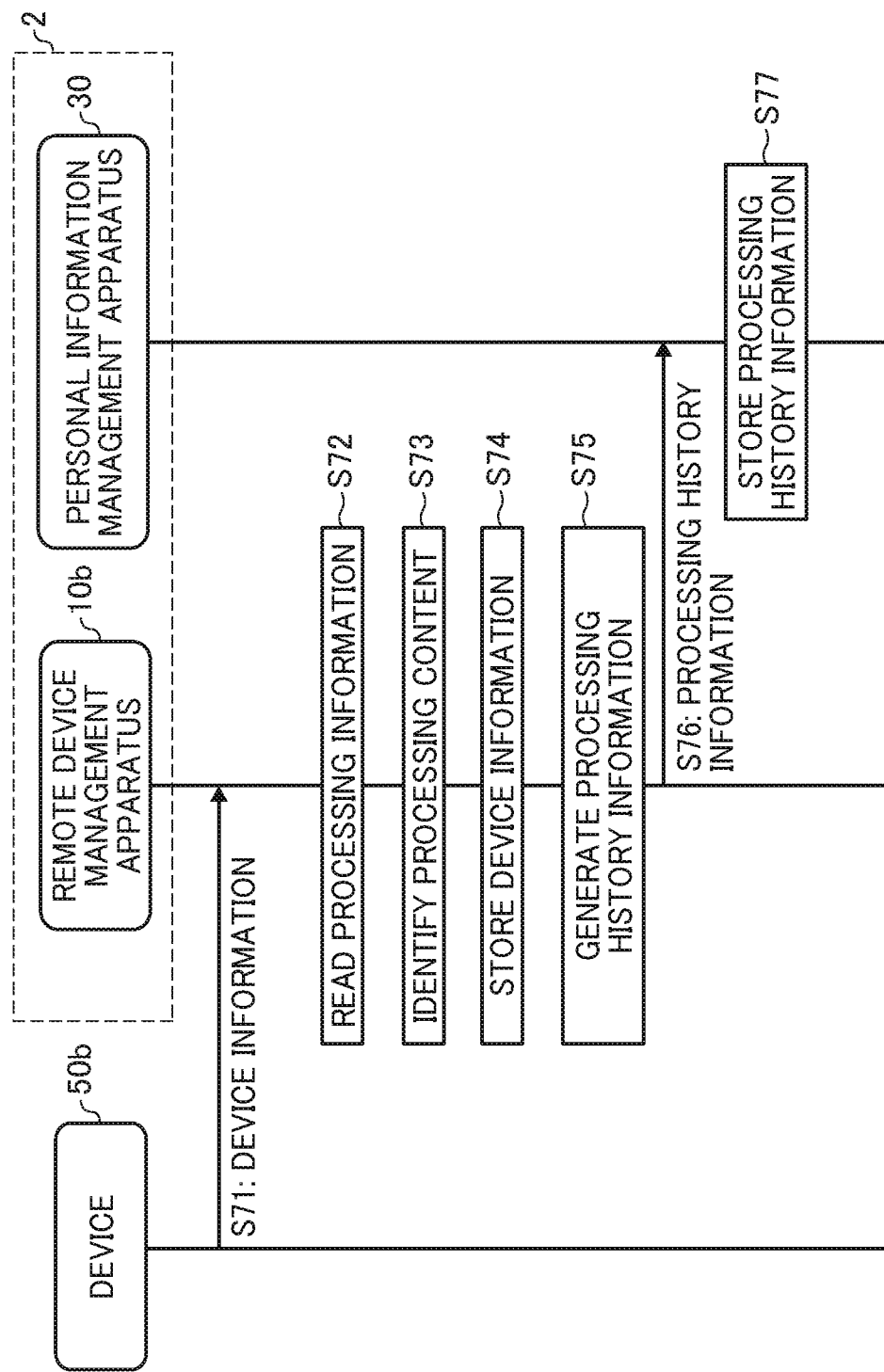
FIG. 20 is a sequence diagram illustrating another example of the device information storage process in the remote device management system.

A description is now given of a process to store the device information generated by the device 50a in the processing illustrated in FIG. 15 to FIG. 18 in the remote device management apparatus 10 and the device information utilization apparatus 90 using FIG. 19 to FIG. 21. FIG. 19 is a sequence diagram illustrating an example of a device information storage process in the remote device management system. FIG. 19 illustrates an example in which the remote device management apparatus 10a, the device information utilization apparatus 90a, and the device information utilization apparatus 90b execute processing on the device information generated by the device 50a.

In step S51, the storage/reading unit 19a of the remote device management apparatus 10a reads the processing information stored in the processing information management DB 1005a (refer to FIG. 12A). In step S52, the determination unit 14a of the remote device management apparatus 10a identifies the content of processing on the device information received in step S16 based on the content of processing information read in step S51. In the example of FIG. 12A, the content of processing stored in the processing information is "storage/transfer" and the transmission destination is "device information utilization apparatus 90a". The determination unit 14a identifies processing of "storing the device information in the own device and transferring the device information to the device information utilization apparatus 90a".

In step S53, the data exchange unit 11a of the remote device management apparatus 10a transmits (transfers) the device information received in step S16 to the device information utilization apparatus 90a based on the processing identified in step S52. Thereby, the data exchange unit 91a of the device information utilization apparatus 90a receives the device information transmitted (transferred) from the remote device management apparatus 10a. In step S54, the storage/reading unit 19a of the remote device management apparatus 10a stores the device information received in step S16 in the device information management DB 1007a. Note that the order of the processing in step S53 and the processing in step S54 may be reversed or may be performed in parallel.

In step S55, the processing history information generation unit 13a of the remote device management apparatus 10a generates the processing history information indicating the history of processing performed on the device information. In this example, the processing history information generation unit 13a generates, as the processing history, the processing history information indicating the history of "stored in the remote device management apparatus 10a and transferred to the device information utilization apparatus 90a". The processing history information generated by the processing history information generation unit 13a in step S55 includes the data identification information for identifying the device information (device event data) on which the process has been executed, and the processing content identification information for identifying the processing content on the device information (device event data) as illustrated in FIG. 14. Further, the processing history information indicates, for example, a history of transmitting the device information to another processing apparatus. Further, the processing history information indicates, for example, a history in which the device information is stored in the processing apparatus. The processing history information is an example of apparatus identification information for identifying the processing apparatus in which the device information is stored.

In step S56, the data exchange unit 11a of the remote device management apparatus 10a transmits the processing history information generated in step S55 to the personal information management apparatus 30. Thereby, the data exchange unit 31 of the personal information management apparatus 30 receives the processing history information transmitted from the remote device management apparatus 10a. In step S57, the processing history information management unit 32 of the personal information management apparatus 30 stores the processing history information received in step S56 in the processing history information management DB 3003 (refer to FIG. 14).

In step S58, the storage/reading unit 99a of the device information utilization apparatus 90a reads the processing information stored in the processing information management DB 9001a (refer to FIG. 12B). In step S59, the determination unit 94a of the device information utilization apparatus 90a identifies the content of processing on the device information received in step S53 based on the content of processing information read in step S58. In the example of FIG. 12B, since the content of processing included in the processing information is "transfer" and the transmission destination is "the device information utilization apparatus 90b", the determination unit 94a determines the processing of "transfer the device information to the device information utilization apparatus 90b".

In step S60, the data exchange unit 91a of the device information utilization apparatus 90a transmits (transfers) the device information received in step S53 to the device information utilization apparatus 90b. The data exchange unit 91b of the device information utilization apparatus 90b receives the device information transmitted (transferred) from the device information utilization apparatus 90a.

In step S61, the processing history information generation unit 93a of the device information utilization apparatus 90a generates the processing history information indicating the history of the processing executed on the device information. In this example, the processing history information generation unit 93a generates the processing history information indicating the history of "transfer to the device information utilization apparatus 90b" as the processing history information.

In step S62, the data exchange unit 91a of the device information utilization apparatus 90a transmits the processing history information generated in step S61 to the personal information management apparatus 30. The data exchange unit 31 of the personal information management apparatus 30 receives the processing history information transmitted from the device information utilization apparatus 90a. In step S63, the processing history information management unit 32 of the personal information management apparatus 30 stores the processing history information received in step S62 in the processing history information management DB 3003 (refer to FIG. 14).

In step S64, the storage/reading unit 99b of the device information utilization apparatus 90b reads the processing information stored in the processing information management DB 9001b (refer to FIG. 12C). In step S65, the determination unit 94b of the device information utilization apparatus 90b identifies the content of processing on the device information received in step S60 based on the content of processing information read in step S64. In the example of FIG. 12C, since the content of processing included in the process information is "storage", the determination unit 94b determines the processing of "storing device information in its own device".

In step S66, the storage/reading unit 99b of the device information utilization apparatus 90b stores the device information received in step S60 in the device information management DB 9003b. In step S67, the processing history information generation unit 93b of the device information utilization apparatus 90b generates the processing history information indicating the history of the processing executed on the device information. In this example, the processing history information generation unit 93b generates the processing history information indicating the history of "stored in the device information utilization apparatus 90b" as the processing history.

In step S68, the data exchange unit 91b of the device information utilization apparatus 90b transmits the processing history information generated in step S67 to the personal information management apparatus 30. The data exchange unit 31 of the personal information management apparatus 30 receives the processing history information transmitted from the device information utilization apparatus 90b. In step S69, the processing history information management unit 32 of the personal information management apparatus 30 stores the processing history information received in step S68 in the processing history information management DB 3003 (refer to FIG. 14). An example of the processing history information stored in the personal information management apparatus 30 by the processing of FIG. 19 is illustrated in FIG. 21A. The processing history information illustrated in FIG. 21A is the processing history information received by the personal information management apparatus 30 in steps S56, S62, and S68. Thereby, the personal information management apparatus 30 can identify the content of processing executed by each apparatus with respect to the device information generated by the device 50a and in which apparatus the device information is stored by storing the processing history information in the processing history information management DB 3003.

Referring to FIG. 20, another example of the storage processing of the device information illustrated in FIG. 19 is described. FIG. 20 is a sequence diagram illustrating another example of the device information storage process in the remote device management system. FIG. 20 illustrates an example in which the device 50*b* is the electronic whiteboard 300 and the remote device management apparatus 10*b* executes processing on the device information generated by the device 50*b*.

In step S71, the data exchange unit 51*b* of the device 50*b* transmits the device information generated by the device information generation unit 53*b* to the remote device management apparatus 10*b*. The content of the device information generation process by the device information generation unit 53*b* is the same as the process illustrated in FIGS. 15 and 17, and thus the description is omitted. The data exchange unit 11*b* of the remote device management apparatus 10*b* receives the device information transmitted from the device 50*b*.

In step S72, the storage/reading unit 19*b* of the remote device management apparatus 10*b* reads the processing information stored in the processing information management DB 1005*b* (FIG. 12D). In step S73, the determination unit 14*b* of the remote device management apparatus 10*b* identifies the content of processing for the device information received in step S71 based on the content of processing information read in step S72. In the example of FIG. 12D, since the content of processing included in the processing information is "storage", the determination unit 14*b* determines processing of "storing device information in its own device".

In step S74, the storage/reading unit 19*b* of the remote device management apparatus 10*b* causes the device information management DB 1007*b* to store the device information received in step S71. In step S75, the processing history information generation unit 13*b* of the remote device management apparatus 10*b* generates the processing history information indicating the history of processing executed on the device information. In this example, the processing history information generation unit 13*a* generates the processing history information indicating the history of "stored in the remote device management apparatus 10*b*" as the processing history.

In step S76, the data exchange unit 11*b* of the remote device management apparatus 10*b* transmits the processing history information generated in step S75 to the personal information management apparatus 30. The data exchange unit 31 of the personal information management apparatus 30 receives the processing history information transmitted from the remote device management apparatus 10*b*. In step S77, the processing history information management unit 32 of the personal information management apparatus 30 stores the processing history information received in step S76 in the processing history information management DB 3003 (refer to FIG. 14). An example of the processing history information stored in the personal information management apparatus 30 by the processing of FIG. 20 is illustrated in FIG. 21B. The processing history information illustrated in FIG. 21B is the processing history information received by the personal information management apparatus 30 in step S76. The personal information management apparatus 30 can identify the content of processing executed by the remote device management apparatus 10*b* on the device information generated by the device 50*b* and in which device the device information is stored, by storing the processing history information in the processing history information management DB 3003.

Figure 22:
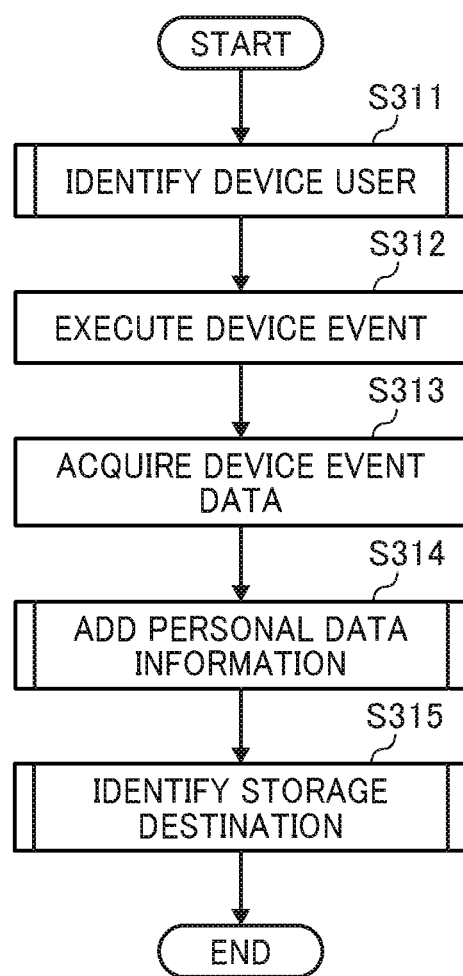
FIG. 22 is a sequence diagram illustrating another example of the device information storage process in the remote device management system.
Figure 23:
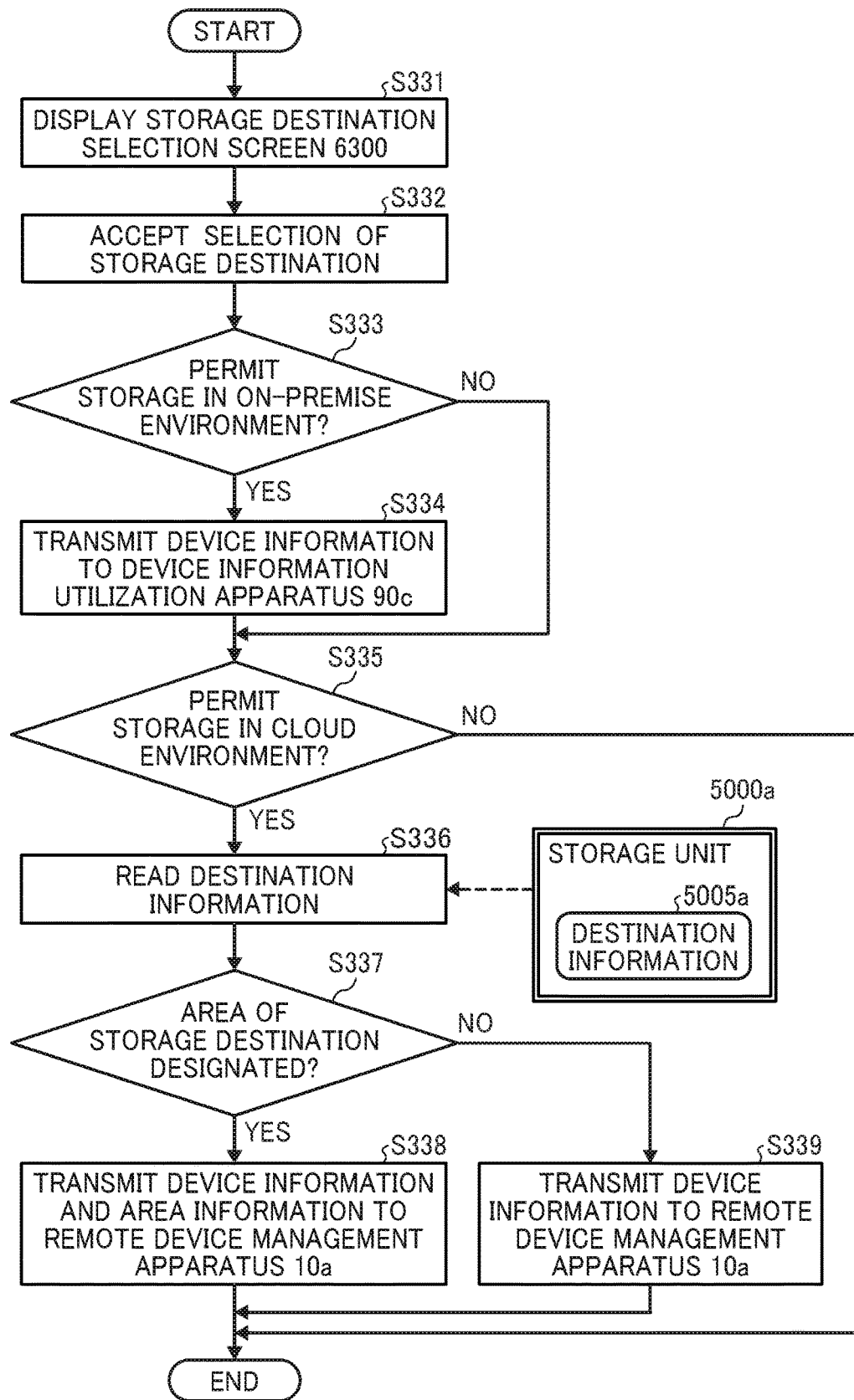
FIG. 23 is a flowchart illustrating an example of a process of identification of a storage destination of the device information.
Figure 24:
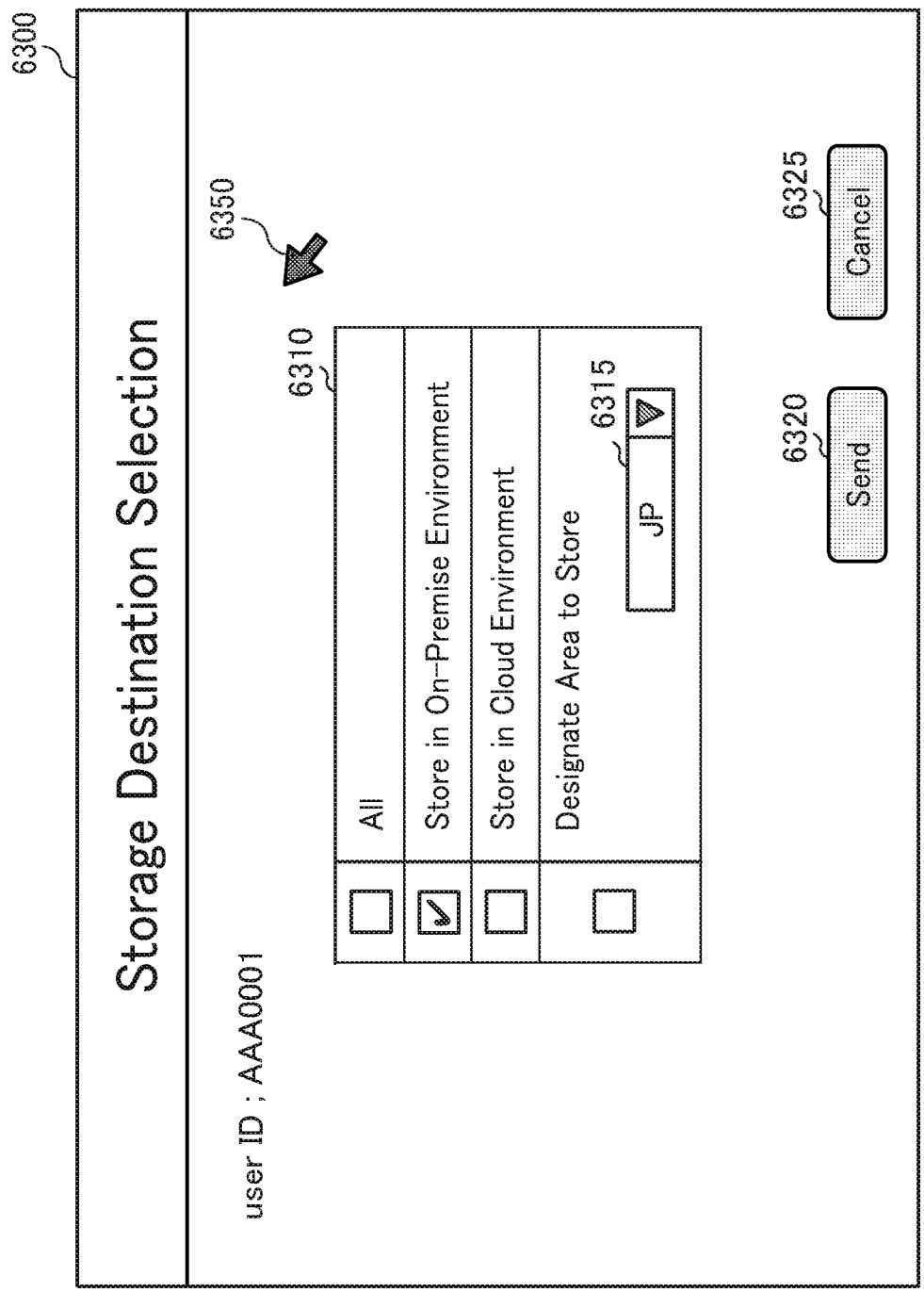
FIG. 24 is a diagram illustrating an example of a storage destination selection screen.

A description is now given of a process of selecting a storage destination of the device information in the device 50*a* with reference to FIG. 22 to FIG. 24. FIG. 22 is a flowchart illustrating another example of the device information storage process in the remote device management system. Note that the processing illustrated in steps S311 to S314 in FIG. 22 is the same as the processing in steps S11 to S14 in FIG. 15, and a description thereof is omitted. The device 50*a* generates the device information as illustrated in FIG. 18 by executing the processing of steps S311 to S314.

In step S315, the device 50*a* performs a process of identifying the storage destination of the device information generated by the processing of step S314. Details of a process of identification of the storage destination are described with reference to FIG. 23. FIG. 23 is a flowchart illustrating an example of the process of identification of the storage destination of the device information.

In step S331, the display control unit 57*a* of the device 50*a* displays a storage destination selection screen 6300 on a display (for example, the panel display 240*a* illustrated in FIG. 5). FIG. 24 is a diagram illustrating an example of the storage destination selection screen. The storage destination selection screen 6300 illustrated in FIG. 24 is a display screen for allowing a user to select the storage destination of the device information. The storage destination selection screen 6300 includes a storage destination selection area 6310 for selecting the storage destination of the device information, a "Send" button 6320 to be pressed when transmitting (storing) the device information to the storage destination selected in the storage destination selection area 6310, a "Cancel" button 6325 to be pressed when canceling the storage destination selection process and a pointer 6350 for performing an input operation. The storage destination selection area 6310 includes selectable options such as "All", "Store in On-Premises Environment", "Store in Cloud Environment", and "Designate Area to Store". When the "All" included in the storage destination selection area is selected, the device information is transmitted based on the settings of the processing information (refer to FIG. 12A to FIG. 12D) stored for each apparatus included in the server system 4. When "Store in On-Premises Environment" included in the storage destination selection area 6310 is selected, the determination unit 55*a* of the device 50*a* permits transmission of the device information to an apparatus in the local network 7. When "Store in Cloud Environment" included in the storage destination selection area 6310 is selected, transmission of the device information to the apparatus included in the server system 4 existing in the cloud environment is permitted.

In addition, the storage destination selection area 6310 includes an input area 6315 in which a storage destination area can be selected or input when the item "Designate Area to Store" is selected. In this case, when "Designate Area to Store" included in storage destination selection area 6310 is selected and an area is input (selected) in the input area 6315, the transmission of device information to the area input (selected) in the input area 6315 is permitted.

In step S332, when the user selects the storage destination using the storage destination selection area 6310 included in the storage destination selection screen 6300, and selects a "Send" button 6320, the acceptance unit 56*a* accepts a selection of the storage destination whose check box on the left side of the storage destination selection area 6310 is selected.

In step S333, the determination unit 55a of the device 50a determines whether storage of the device information in the on premises environment is permitted based on selection information accepted by the acceptance unit 56a. When the acceptance unit 56a accepts the selection of "All" or "Store in On-Premises Environment" in the storage destination selection area 6310, the determination unit 55a permits storage of the device information in the on-premises environment. When permitting storage of the device information in the on-premises environment, the determination unit 55a advances the process to step S334. On the other hand, when "All" and "Store in On-Premises Environment" in the storage destination selection area 6310 are not selected, determination unit 55a does not permit storage in the on-premises environment. When the storage of the device information in the on-premises environment is not permitted, the determination unit 55a advances the process to step S335.

In step S334, the data exchange unit 51a of the device 50a transmits the device information to the device information utilization apparatus 90c existing in the local network 7, which is an on-premises environment. In this case, the determination unit 55a of the device 50a searches for an apparatus having a private IP address, for example, an apparatus in the local network 7. Then, the data exchange unit 51a transmits the device information to the apparatus indicated by the retrieved private IP address (for example, the device information utilization apparatus 90c). The data exchange unit 91c of the device information utilization apparatus 90c receives the device information transmitted from the device 50a. Then, the storage/reading unit 99c of the device information utilization apparatus 90c causes the device information management DB 9003c to store the device information.

In step S335, the determination unit 55a of the device 50a determines whether storage of the device information in the cloud environment is permitted based on the selection information accepted by the acceptance unit 56a. When the acceptance unit 56a accepts the selection "All" or "Store in the Cloud Environment" in the storage destination selection area 6310, the determination unit 55a allows the device information to be stored in the cloud environment. When permitting storage of the device information in the cloud environment, the determination unit 55a advances the process to step S336. On the other hand, when "All" and "Store in Cloud Environment" in storage destination selection area 6310 are not selected, determination unit 55a does not permit storage in the cloud environment. When the storage of the device information in the cloud environment is not permitted, the determination unit 55a ends the process. In this case, the device 50a does not transmit the device information to the apparatus existing in the cloud environment.

In step S336, the storage/reading unit 59a of the device 50a reads the destination information 5005a of the remote device management apparatus 10a stored in the storage unit 5000a.

In step S337, the determination unit 55a of the device 50a determines whether or not there is a designation of an area to which the storage destination for storing the device information belongs based on the selection information accepted by the acceptance unit 56a. When the selection of "Designate Area to Store" in the storage destination selection area 6310 is accepted by the acceptance unit 56a, the determination unit 55a determines that the area to which the storage destination belongs is designated and advances the process to step S338. In step S338, the data exchange unit 51a of the device 50a transmits the device information and the area information indicating the area designated in the selection of "Designate Area to Store" 6315 to the remote device management apparatus 10a indicated by the destination information 5005a read in step S336. Thereby, the data exchange unit 11a of the remote device management apparatus 10a receives the device information and the area information. Then, the remote device management apparatus 10a executes the process illustrated in FIG. 19 or FIG. 20 to store the device information in each apparatus (in the server system 4) existing in the cloud environment. The device information transmitted from the device 50a is stored only in an apparatus belonging to the area indicated by the area information received by the data exchange unit 11a. Since the remote device management system 1 can store the device information only in the limited area selected by the user, risks associated with the leakage of personal information included in the device information can be reduced.

On the other hand, in step S337, when the "Designate Area to Store" in the storage destination selection area 6310 is not selected, the determination unit 55a determines that there is no designation of the area to which the storage destination belongs and proceeds to step S339. In step S339, the data exchange unit 51a of the device 50a transmits the device information to the remote device management apparatus 10a indicated by the destination information 5005a read in step S336. Thereby, the data exchange unit 11a of the remote device management apparatus 10a receives the device information. Then, the remote device management apparatus 10a executes the process illustrated in FIG. 19 or FIG. 20 to store the device information in each apparatus (in the server system 4) existing in the cloud environment.

The device 50 stores the device information only in the storage destination selected by the user using the storage destination selection screen 6300. As a result, the storage destination of the device information can be limited to the storage destination belonging to the environment selected by the user, and the risk of data leakage can be reduced.

Figure 25:
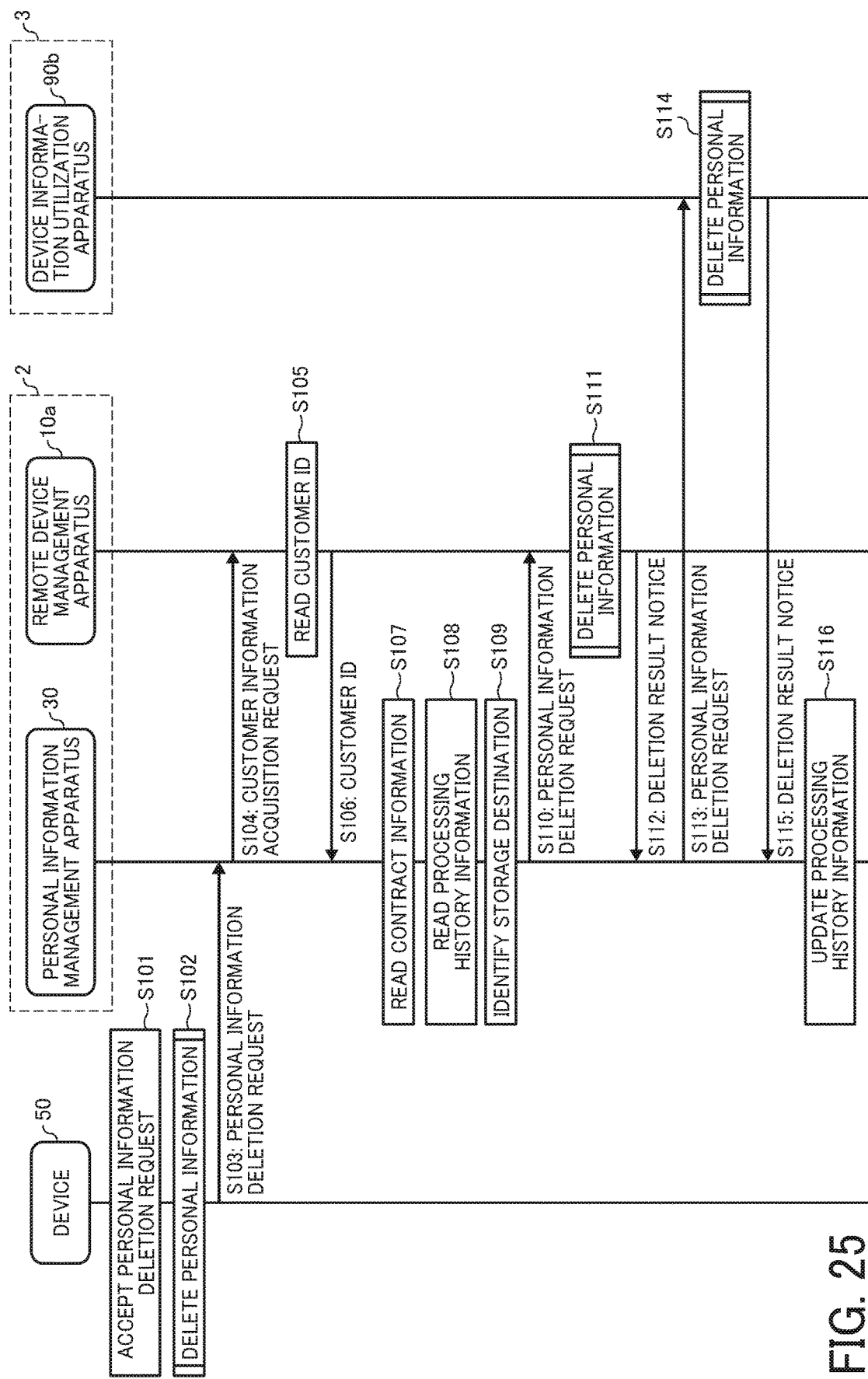
FIG. 25 is a sequence diagram illustrating an example of a process for deleting personal information in the remote device management system.

A description is now given of a process of deleting the personal information included in the device information stored in the remote device management apparatus 10 and the device information utilization apparatus 90 with reference to FIG. 25 to FIG. 36. A process for receiving a request for deleting the personal information from an individual user who uses the device 50 is described with reference to FIG. 25 to FIG. 28. FIG. 25 is a sequence diagram illustrating an example of a process for deleting the personal information in the remote device management system.

Figure 26:
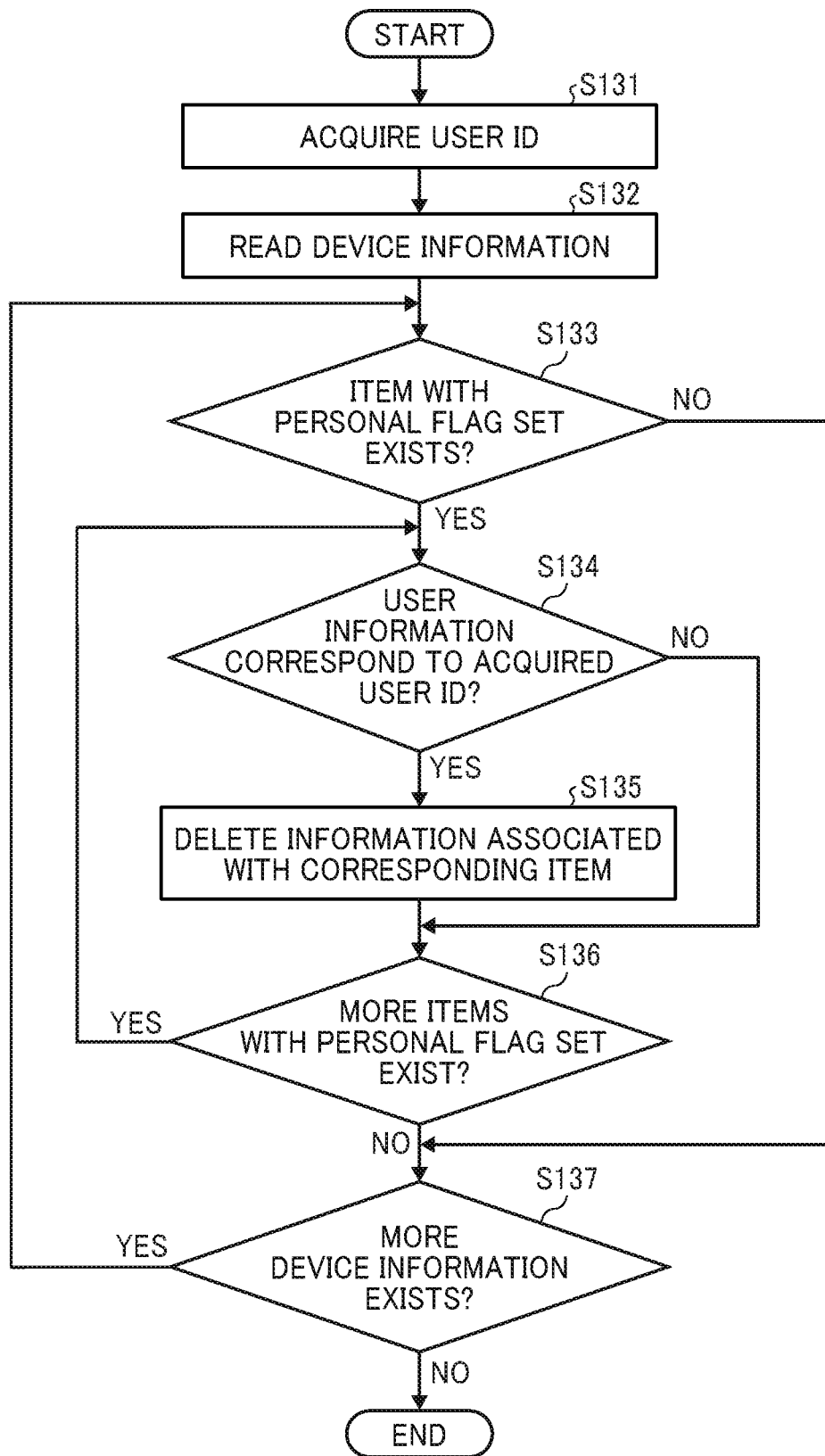
FIG. 26 is a flowchart illustrating an example of a process for deleting the personal information in response to a request from an individual user.

In step S101, the acceptance unit 56 of the device 50 accepts a request for deleting personal information of the individual user who has performed the input operation through the input screen. The personal information deletion request includes the user ID of the individual user who performed the input operation. In this example, the personal information deletion request includes the user ID "AAA0001". In step S102, when the request for deleting the personal information is accepted by the acceptance unit 56, the device 50 deletes the personal information included in the device information stored in the device information management DB 5003. A process of deleting the personal information stored in the device 50 in response to the deletion request from the individual user is described with reference to FIG. 26. FIG. 26 is a flowchart illustrating an example of the process for deleting the personal information in response to the request from the individual user.

In step S131, the device information processing unit 54 acquires the user ID included in the request for deleting personal information accepted by the acceptance unit 56. In step S132, the storage/reading unit 59 reads the device information stored in the device information management DB 5003. In step S133, when there is an item with a personal flag set among the items included in the device information read in step S132, the determination unit 55 advances the process to step S134. On the other hand, when there is no item with the personal flag set among the items included in the device information read in step S132, the determination unit 55 advances the process to step S137.

In step S134, when there is an item to which user information corresponding to the user ID acquired in step S131 is included among the items included in the device information read in step S132, the determination unit 55 advances the process to step S135. On the other hand, when there is no item to which the user information corresponding to the user ID acquired in step S131 is included among the items included in the device information read in step S132, the determination unit 55 advances the process to step S136.

In step S135, the device information processing unit 54 deletes the data associated with the corresponding item as a result of the processing in steps S133 and S134. Specifically, for example, the device information processing unit 54 deletes the data associated with the user information corresponding to the user ID (user name and counter) from the device information illustrated in FIG. 18.

In step S136, when there is another item with the personal flag set, the determination unit 55 repeats the processing from step S134. On the other hand, when there is no other item with the personal flag set, the determination unit 55 advances the process to step S137.

In step S137, the determination unit 55 ends the process when there is no other device information by searching the device information management DB 5003 by the storage/reading unit 59. On the other hand, the determination unit 55 searches the device information management DB 5003 by the storage/reading unit 59, and if there is additional device information, repeats the processing from step S133. FIG. 27 is a diagram illustrating an example of the device information from which the personal information has been deleted. In the device information illustrated in FIG. 27, the data associated with the user information corresponding to the user ID has been deleted by the process of step S135. Compared with the device information illustrated in FIG. 18, the device information illustrated in FIG. 27 has the data of items "user name" and "counter" included in the event history information deleted. The data to be deleted is the data of the device event, the event occurrence time, and the personal data information including the personal flag and the user information. The deleted data in the device information illustrated in FIG. 27 is replaced with asterisks (********). Accordingly, the device information processing unit 54 can delete just the data of the item associated with the user ID of the individual user who has requested the deletion of the personal information, from the device information stored in the device information management DB 5003. The data deleted by the device information processing unit 54 is not limited to the data described above. For example, data in which the personal flag is not deleted, or the personal flag is not set, may be deleted.

Returning to FIG. 25, the description of the processing for deleting personal information in the remote device management system 1 is continued. In step S103, the data exchange unit 51 of the device 50 transmits the personal information deletion request requesting deletion of the personal information to the personal information management apparatus 30. Specifically, the storage/reading unit 59 of the device 50 reads the destination information 5005 indicating the destination of the personal information management apparatus 30 by searching the storage unit 5000. Then, the data exchange unit 51 transmits the personal information deletion request to the personal information management apparatus 30 indicated by the destination information 5005 read by the storage/reading unit 59. The personal information deletion request includes the user ID for identifying the individual user who has performed the input operation accepted by the acceptance unit 56 in step S101. In this example, the personal information deletion request includes the user ID "AAA0001". The data exchange unit 31 of the personal information management apparatus 30 receives the personal information deletion request transmitted from the device 50.

In step S104, when the personal information deletion request is received in step S103, the data exchange unit 31 of the personal information management apparatus 30 transmits a customer information acquisition request to the remote device management apparatus 10a. Here, the customer information acquisition request includes the same user ID as the user ID included in the personal information deletion request received in step S103. The data exchange unit 11a of the remote device management apparatus 10a receives the customer information acquisition request transmitted from the personal information management apparatus 30.

In step S105, the storage/reading unit 19a of the remote device management apparatus 10a searches the user information management DB 1001a (refer to FIG. 10) using the user ID included in the customer information acquisition request received in step S104 as a search key, and reads the customer ID associated with the user ID. In this example, the storage/reading unit 19a reads the customer ID "AAA" associated with the user ID "AAA0001".

In step S106, the data exchange unit 11a of the remote device management apparatus 10a transmits the customer ID read in step S105 to the personal information management apparatus 30. The data exchange unit 31 of the personal information management apparatus 30 receives the customer ID transmitted from the remote device management apparatus 10a.

In step S107, the storage/reading unit 39 of the personal information management apparatus 30 searches the contract information management DB 3001 (refer to FIG. 13A) using the customer ID received in step S106 as a search key and reads associated contract information. In this example, the storage/reading unit 39 reads the contract information associated with the customer ID "AAA".

In step S108, the storage/reading unit 39 of the personal information management apparatus 30 searches the processing history information management DB 3003 (refer to FIG. 14) using the model number ID included in the contract information read in step S107 as a search key and reads the processing history information associated with the model number ID. In this example, the storage/reading unit 39 reads the processing history information associated with the model number ID "MP30-1234".

In step S109, the determination unit 33 of the personal information management apparatus 30 identifies the storage destination of the device information based on the processing history information read in step S108. Specifically, the determination unit 33 identifies the storage destination of the device information including the personal information based on the processing server information, the transmission destination information, and the information indicating the processing history included in the processing history information. In the processing history information illustrated in FIG. 14, the determination unit 33 identifies the remote device management apparatus 10a corresponding to "manageA.co.jp" and the device information utilization apparatus 90b corresponding to "remoteB.co.eu" as the storage destinations of the device information.

In step S110, the data exchange unit 31 of the personal information management apparatus 30 transmits the personal information deletion request to the remote device management apparatus 10a identified as the storage destination in step S109. The personal information deletion request includes the same user ID as the user ID included in the personal information deletion request received in step S103. The data exchange unit 11a of the remote device management apparatus 10a receives the personal information deletion request transmitted from the personal information management apparatus 30.

In step S111, when the personal information deletion request is received in step S110, the remote device management apparatus 10a deletes the personal information included in the device information stored in the device information management DB 1007a. Here, similarly to the case of the device 50, a process of deleting personal information stored in the remote device management apparatus 10a in response to the request from the individual user is described with reference to FIG. 26.

In step S131, the device information processing unit 12a acquires the user ID included in the personal information deletion request received by the data exchange unit 11a. In step S132, the storage/reading unit 19a reads the device information stored in the device information management DB 1007. In step S133, when there is an item with personal flag set among the items included in the device information read in step S132, the determination unit 14a advances the process to step S134. On the other hand, when there is no item with personal flag set among the items included in the device information read in step S132, the determination unit 14a advances the process to step S137.

In step S134, when there is an item to which the user information corresponding to the user ID acquired in step S131 is added among the items included in the device information read in step S132, the determination unit 14a advances the process to step S135. On the other hand, when there is no item to which the user information corresponding to the user ID acquired in step S131 is present among the items included in the device information read in step S132, the determination unit 14a advances the process to step S136.

In step S135, the device information processing unit 12a deletes the data associated with the corresponding item as a result of the processing in steps S133 and S134. In step S136, when there is another item with the personal flag set, the determination unit 14a repeats the processing from step S134. On the other hand, when there is no other item with the personal flag set, the determination unit 14a advances the process to step S137. In step S137, the determination unit 14a ends the process when there is no other device information by searching the device information management DB 1007a by the storage/reading unit 19a. On the other hand, the determination unit 14a searches the device information management DB 1007a with the storage/reading unit 19a and repeats the processing from step S133 when there is additional device information. The device information from which the personal information has been deleted by the device information processing unit 12a is the same as the device information illustrated in FIG. 27, and the description is omitted. As a result, the device information processing unit 12a can delete just the data of the item associated with the user ID of the individual user who has requested the deletion of the personal information, from the device information stored in the device information management DB 1007a.

Returning to FIG. 25, the description of the processing for deleting personal information in the remote device management system 1 is continued. In step S112, the data exchange unit 11a of the remote device management apparatus 10a transmits the deletion result notification indicating that the personal information has been deleted to the personal information management apparatus 30. The deletion result notification includes the device information ID and the model number ID of the device information whose personal information has been deleted by the device information processing unit 12a, the destination information of the remote device management apparatus 10a that has been deleted, the processing history information indicating that the personal information has been deleted, and the processing time at which the deletion processing was executed. The data exchange unit 31 of the personal information management apparatus 30 receives the deletion result notification transmitted from the remote device management apparatus 10a.

In step S113, the data exchange unit 31 of the personal information management apparatus 30 transmits the personal information deletion request to the device information utilization apparatus 90b identified as the storage destination in step S109. The personal information deletion request includes the same user ID as the user ID included in the personal information deletion request received in step S103. The data exchange unit 91b of the device information utilization apparatus 90b receives the personal information deletion request transmitted from the personal information management apparatus 30.

In step S114, when the personal information deletion request is received in step S113, the device information utilization apparatus 90b deletes the personal information included in the device information stored in the device information management DB 9003b. A description is now given of a process of deleting personal information stored in the device information utilization apparatus 90b in response to the request from the individual user similar to the case of the device 50 and the remote device management apparatus 10a, with reference to FIG. 26.

In step S131, the device information processing unit 92b acquires the user ID included in the personal information deletion request received by the data exchange unit 11b. In step S132, the storage/reading unit 99b reads the device information stored in the device information management DB 9003b. In step S133, when there is an item with personal flag set among the items included in the device information read in step S132, the determination unit 94b advances the process to step S134. On the other hand, when there is no item with personal flag set among the items included in the device information read in step S132, the determination unit 94b advances the process to step S137.

In step S134, when there is an item to which the user information corresponding to the user ID acquired in step S131 is added among the items included in the device information read in step S132, the determination unit 94b advances the process to step S135. On the other hand, when there is no item to which the user information corresponding to the user ID acquired in step S131 is present among the items included in the device information read in step S132, the determination unit 94b advances the process to step S136.

In step S135, the device information processing unit 92b deletes the data associated with the corresponding item as a result of the processing in steps S133 and S134. In step S136, when there is another item with the personal flag set, the determination unit 94b repeats the processing from step S134. On the other hand, when there is no other item with the personal flag set, the determination unit 94b advances the process to step S137. In step S137, the determination unit 94b ends the process when there is no other device information by searching the device information management DB 9003b by the storage/reading unit 99b. On the other hand, the determination unit 94b searches the device information management DB 9003b with the storage/reading unit 99b and repeats the processing from step S133 when there is additional device information. The device information from which the personal information has been deleted by the device information processing unit 92b is the same as the device information illustrated in FIG. 27, and the description is omitted. As a result, the device information processing unit 92b can delete just the data of the item associated with the user ID of the individual user who has requested the deletion of the personal information, from the device information stored in the device information management DB 9003b. In addition, the personal information management apparatus 30 can transmit the request for deleting personal information to the specific device information utilization apparatus 90 in response to the request from the user to delete the personal information, and delete the personal information stored in the specific device information utilization apparatus 90, by storing the processing history information in the processing history information management DB 3003.

Returning to FIG. 25, the description of the processing for deleting personal information in the remote device management system 1 is continued. In step S115, the data exchange unit 91b of the device information utilization apparatus 90b transmits the deletion result notification indicating that the personal information has been deleted to the personal information management apparatus 30. The deletion result notification includes the device information ID and the model number ID of the device information whose personal information has been deleted by the device information processing unit 92b, the destination information of the device information utilization apparatus 90b that has been deleted, the processing history information indicating that the personal information has been deleted, and the processing time at which the deletion processing was executed. The data exchange unit 31 of the personal information management apparatus 30 receives the deletion result notification transmitted from the device information utilization apparatus 90b.

In step S116, the processing history information management unit 32 of the personal information management apparatus 30 updates the processing history information stored in the processing history information management DB 3003 based on the deletion result notification received in step S112 and step S115. FIG. 28 illustrates an example of the processing history information updated by the processing history information management unit 32. The processing history information illustrated in FIG. 28 reflects the deletion result notification received by the personal information management apparatus 30 in steps S112 and S115. The processing history information illustrated in FIG. 28 includes the processing server information (manageA.co.jp (remote device management apparatus 10a) and remoteB-.co.eu (the device information utilization apparatus 90b)) indicating the apparatus from which the personal information was deleted in association with the item with the processing history "Deletion". Accordingly, the personal information management apparatus 30 can identify whether or not the personal information has been deleted in response to the personal information deletion request from the individual user and from which device the personal information has been deleted, by storing the deletion history of personal information in the processing history information management DB 3003. Note that the order of the processing of steps S110 to S112 and the processing of steps S113 to S115 illustrated in FIG. 25 may be reversed or may be performed in parallel. FIG. 25 illustrates an example of the processing of deleting the personal information and the same processing is executed when a move or transfer of the personal information is performed. Here, moving the personal information is a process of deleting data relating to the personal information and transmitting the deleted data to another apparatus. The transfer of the personal information is a process of transmitting (transferring) the data related to the personal information stored in the transfer source to the transfer destination while keeping the data stored in the transfer source. In this case, in step S103, the data exchange unit 31 of the personal information management apparatus 30 receives a personal information transfer request or a personal information move request for requesting a transfer or a move of personal information transmitted from the device 50.

Figure 29:
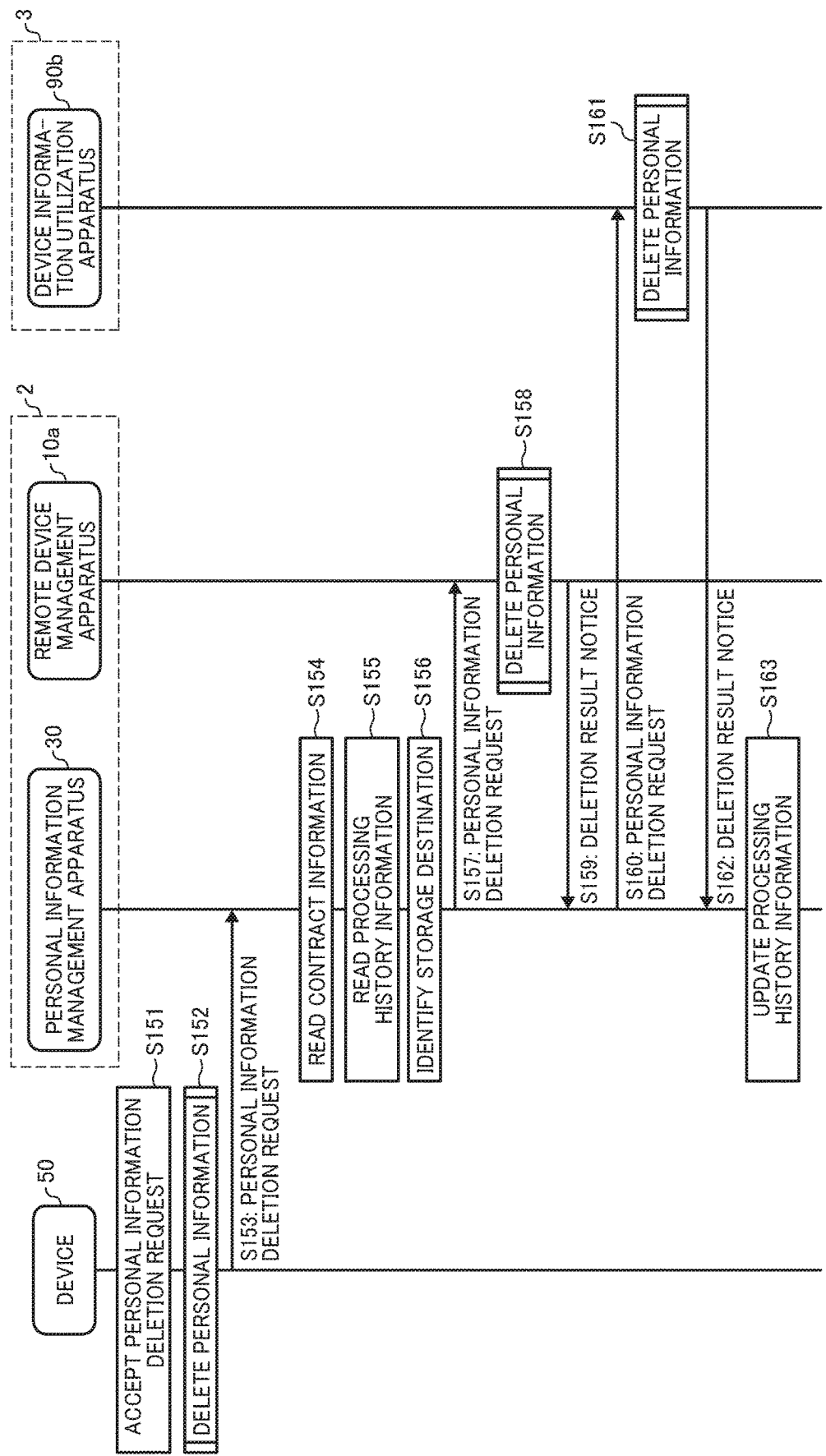
FIG. 29 is a sequence diagram illustrating an example of a process for deleting the personal information in the remote device management system.

A description is now given of a process for receiving a request for deleting personal information from the administrator of the device 50 with reference to FIG. 29 to FIG. 31. FIG. 29 is a sequence diagram illustrating an example of the process for deleting the personal information in the remote device management system.

In step S151, the acceptance unit 56 of the device 50 accepts a request for deleting personal information of the administrator of the device 50 who has performed the input operation through the input screen. The personal information deletion request includes the customer ID of the administrator who performed the input operation. In this example, the personal information deletion request includes the customer ID "AAA". In step S152, when the request for deleting the personal information is accepted by the acceptance unit 56, the device 50 deletes the personal information included in the device information stored in the device information management DB 5003. A process of deleting the personal information stored in the device 50 in response to the deletion request from the administrator of the device 50 is described with reference to FIG. 30. FIG. 30 is a flowchart illustrating an example of the process for deleting the personal information in response to the request from the administrator.

In step S171, the device information processing unit 54 acquires the customer ID included in the request for deleting the personal information accepted by the acceptance unit 56. In step S172, the storage/reading unit 59 reads the device information stored in the device information management DB 5003. In step S173, when there is an item to which user information corresponding to the customer ID acquired in step S171 is included among the items included in the device information read in step S172, the determination unit 55 advances the process to step S174. On the other hand, when there is no item to which the user information corresponding to the customer ID acquired in step S171 is included among the items included in the device information read in step S172, the determination unit 55 advances the process to step S175.

In step S174, among the items included in the device information read out in step S172, the device information processing unit 54 deletes data associated with all items for which the personal flag is set. Specifically, the device information processing unit 54 deletes, for example, the data associated with all items (device manager name, telephone number, address, IP address, user name, and counter) with the personal flag set among the device information illustrated in FIG. 18.

In step S175, the determination unit 55 ends the process when there is no other device information by searching the device information management DB 5003 by the storage/reading unit 59. On the other hand, the determination unit 55 searches the device information management DB 5003 with the storage/reading unit 59, and if there is additional device information, repeats the processing from step S173. FIG. 31 is a diagram illustrating an example of the device information from which the personal information has been deleted. In the device information illustrated in FIG. 31, data associated with all items with personal flags set has been deleted by the processing of step S174. Compared with the device information illustrated in FIG. 18, the device information illustrated in FIG. 31 has the data of the items "device administrator name", "telephone number", "address" and "IP address", included in the device specific information and "user name" and "counter" included in the event history information deleted. The data to be deleted is the data of the device event, the event occurrence time, and the personal data information including the personal flag and the user information. The deleted data in the device information illustrated in FIG. 31 is replaced with asterisks (******). This allows the device information processing unit 54 to delete just the data associated with the personal data information from the device information stored in the device information management DB 5003. Note that the data deleted by the device information processing unit 54** is not limited to the data described above. For example, data in which the personal flag is not deleted, or the personal flag is not set, may be deleted.

Returning to FIG. 29, the description of the processing for deleting personal information in the remote device management system 1 is continued. In step S153, the data exchange unit 51 of the device 50 transmits the personal information deletion request requesting deletion of the personal information to the personal information management apparatus 30. Specifically, the storage/reading unit 59 of the device 50 reads the destination information 5005 indicating the destination of the personal information management apparatus 30 by searching the storage unit 5000. Then, the data exchange unit 51 transmits the personal information deletion request to the personal information management apparatus 30 indicated by the destination information 5005 read by the storage/reading unit 59. Here, the personal information deletion request includes the customer ID for identifying the administrator of the device 50 that has performed the input operation accepted by the acceptance unit 56 in step S151. In this example, the personal information deletion request includes the customer ID "AAA". The data exchange unit 31 of the personal information management apparatus 30 receives the personal information deletion request transmitted from the device 50.

In step S154, the storage/reading unit 39 of the personal information management apparatus 30 searches the contract information management DB 3001 (refer to FIG. 13A) using the customer ID received in step S153 as a search key and reads associated contract information. In this example, the storage/reading unit 39 reads the contract information associated with the customer ID "AAA".

In step S155, the storage/reading unit 39 of the personal information management apparatus 30 searches the processing history information management DB 3003 (refer to FIG. 14) using the model number ID included in the contract information read in step S154 as a search key and reads the processing history information associated with the model number ID. In this example, the storage/reading unit 39 reads the processing history information associated with the model number ID "MP30-1234".

In step S156, the determination unit 33 of the personal information management apparatus 30 identifies the storage destination of the personal information based on the processing history information read in step S155. Specifically, the determination unit 33 identifies the storage destination of the device information including the personal information based on the processing server information, the transmission destination information, and the information indicating the processing history included in the processing history information. In the processing history information illustrated in FIG. 14, the determination unit 33 identifies the remote device management apparatus 10*a* corresponding to "manageA.co.jp" and the device information utilization apparatus 90*b* corresponding to "remoteB.co.eu" as the storage destinations of the device information.

In step S157, the data exchange unit 31 of the personal information management apparatus 30 transmits the personal information deletion request to the remote device management apparatus 10*a* identified as the storage destination in step S156. The personal information deletion request includes the same customer ID as the customer ID included in the personal information deletion request received in step S153. The data exchange unit 11*a* of the remote device management apparatus 10*a* receives the personal information deletion request transmitted from the personal information management apparatus 30.

In step S158, when the personal information deletion request is received in step S157, the remote device management apparatus 10*a* deletes the personal information included in the device information stored in the device information management DB 1007*a*. A description is now given of a process of deleting personal information stored in the remote device management apparatus 10*a* in response to the request from the administrator of the device 50, similar to the case of the device 50, with reference to FIG. 30.

In step S171, the device information processing unit 12*a* acquires the customer ID included in the personal information deletion request received by the data exchange unit 11*a*. In step S172, the storage/reading unit 19*a* reads the device information stored in the device information management DB 1007*a*. In step S173, when there is an item to which user information corresponding to the customer ID acquired in step S171 is included among the items included in the device information read in step S172, the determination unit 14*a* advances the process to step S174. On the other hand, when there is no item to which the user information corresponding to the customer ID acquired in step S171 is included among the items included in the device information read in step S172, the determination unit 14*a* advances the process to step S175.

In step S174, among the items included in the device information read out in step S172, the device information processing unit 12*a* deletes data associated with all items for which the personal flag is set. In step S175, the determination unit 14*a* ends the process when there is no other device information by searching the device information management DB 1007*a* by the storage/reading unit 19*a*. On the other hand, the determination unit 14*a* searches the device information management DB 1007*a* with the storage/reading unit 19*a* and repeats the processing from step S173 when there is additional device information. The device information from which the personal information has been deleted by the device information processing unit 12a is the same as the device information illustrated in FIG. 31, and the description thereof is omitted. This allows the device information processing unit 12a to delete just the data associated with the personal data information from the device information stored in the device information management DB 1007a.

Returning to FIG. 29, the description of the processing for deleting personal information in the remote device management system 1 is continued. In step S159, the data exchange unit 11a of the remote device management apparatus 10a transmits the deletion result notification indicating that the personal information has been deleted to the personal information management apparatus 30. The deletion result notification includes the device information ID and the model number ID of the device information whose personal information has been deleted by the device information processing unit 12a, the destination information of the remote device management apparatus 10a that has been deleted, the processing history information indicating that the personal information has been deleted, and the processing time at which the deletion processing was executed. The data exchange unit 31 of the personal information management apparatus 30 receives the deletion result notification transmitted from the remote device management apparatus 10a.

In step S160, the data exchange unit 31 of the personal information management apparatus 30 transmits the personal information deletion request to the device information utilization apparatus 90b identified as the storage destination in step S156. The personal information deletion request includes the same customer ID as the customer ID included in the personal information deletion request received in step S153. The data exchange unit 91b of the device information utilization apparatus 90b receives the personal information deletion request transmitted from the personal information management apparatus 30.

In step S161, when the personal information deletion request is received in step S160, the device information utilization apparatus 90b deletes the personal information included in the device information stored in the device information management DB 9003b. A description is now given of a process of deleting personal information stored in the device information utilization apparatus 90b in response to the request from the individual user, similar to the case of the device 50 and the remote device management apparatus 10a, with reference to FIG. 30.

In step S171, the device information processing unit 92b acquires the customer ID included in the personal information deletion request received by the data exchange unit 91b. In step S172, the storage/reading unit 99b reads the device information stored in the device information management DB 9003b. In step S173, when there is an item to which user information corresponding to the customer ID acquired in step S171 is included among the items included in the device information read in step S172, the determination unit 94b advances the process to step S174. On the other hand, when there is no item to which the user information corresponding to the customer ID acquired in step S171 is included among the items included in the device information read in step S172, the determination unit 94b advances the process to step S175.

In step S174, among the items included in the device information read out in step S172, the device information processing unit 92b deletes data associated with all items for which the personal flag is set. In step S175, the determination unit 94b ends the process when there is no other device information by searching the device information management DB 9003b by the storage/reading unit 99b. On the other hand, the determination unit 94b searches the device information management DB 9003b with the storage/reading unit 99b and repeats the processing from step S173 when there is additional device information. The device information from which the personal information has been deleted by the device information processing unit 92b is the same as the device information illustrated in FIG. 31, and the description thereof is omitted. This allows the device information processing unit 92b to delete just the data associated with the personal data information from the device information stored in the device information management DB 9003b.

Returning to FIG. 29, the description of the processing for deleting personal information in the remote device management system 1 is continued. In step S162, the data exchange unit 91b of the device information utilization apparatus 90b transmits the deletion result notification indicating that the personal information has been deleted to the personal information management apparatus 30. The deletion result notification includes the device information ID and the model number ID of the device information whose personal information has been deleted by the device information processing unit 92b, the destination information of the device information utilization apparatus 90b that has been deleted, the processing history information indicating that the personal information has been deleted, and the processing time at which the deletion processing was executed. The data exchange unit 31 of the personal information management apparatus 30 receives the deletion result notification transmitted from the device information utilization apparatus 90b.

In step S163, the processing history information management unit 32 of the personal information management apparatus 30 updates the processing history information stored in the processing history information management DB 3003 based on the deletion result notification received in step S159 and step S162. The processing history information updated by the processing history information management unit 32 is the same as the content illustrated in FIG. 28 and the description thereof is omitted. Unlike when requested by the individual user, when the personal information management apparatus 30 receives the request to delete the personal information from the administrator of the device 50, the data of all items to which the personal data information is added among the items included in the device information is deleted. Therefore, the personal information management apparatus 30 can change the data to be deleted based on who (the administrator of the device 50 or the individual user) has requested the deletion of the personal information and can identify from which apparatus the personal information has been deleted. Note that the order of the processing of steps S157 to S159 and the processing of steps S160 to S162 illustrated in FIG. 29 may be reversed or may be performed in parallel.

Figure 32:
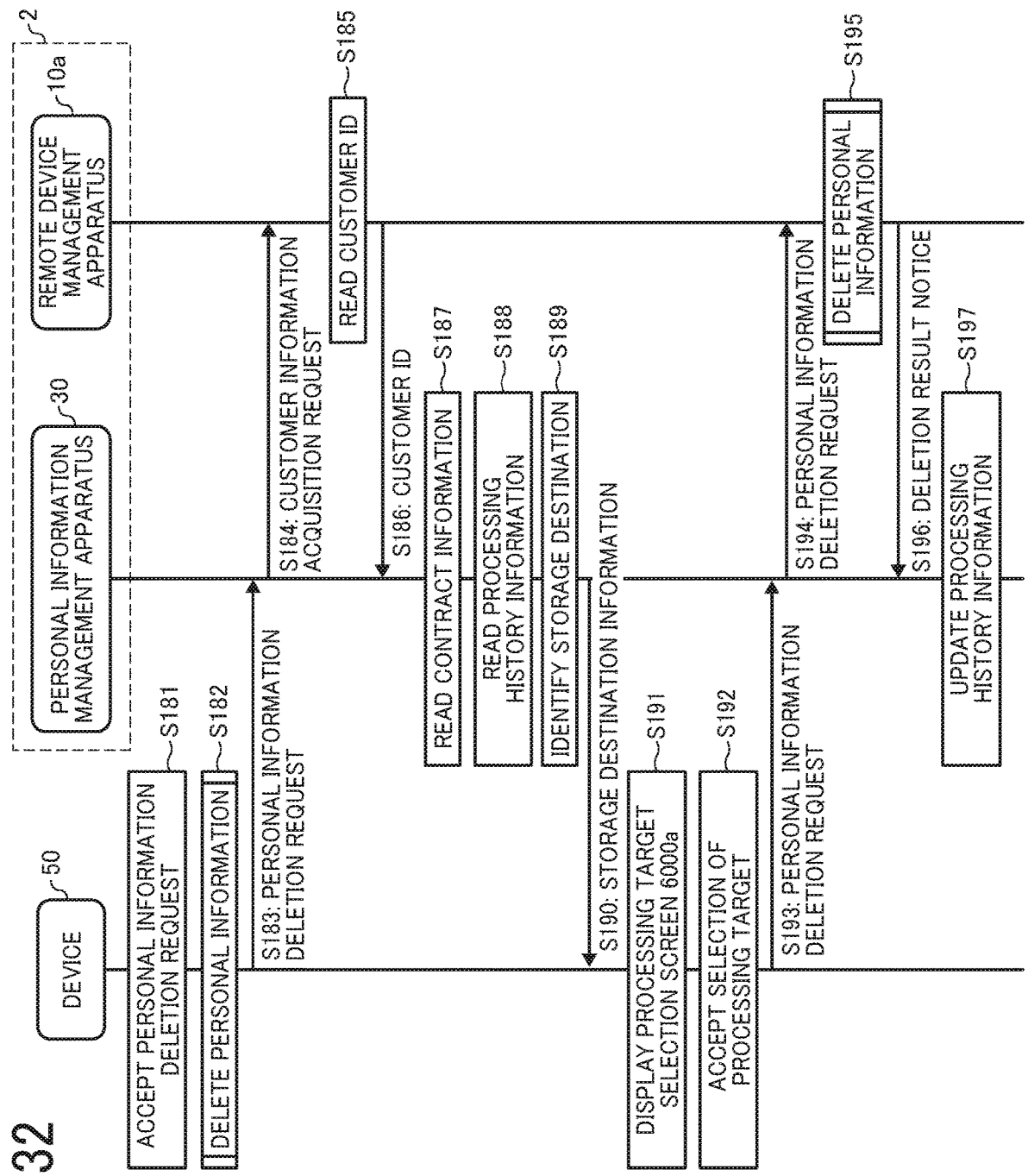
FIG. 32 is a sequence diagram illustrating an example of a process of selecting data to be processed in the remote device management system.

A description is now given of a process for allowing a user to select data to be processed. FIG. 32 is a sequence diagram illustrating an example of a process of selecting data to be processed in the remote device management system. Note that the processing of steps S181 to S189 illustrated in FIG. 32 is the same as the processing of steps S101 to S109 illustrated in FIG. 25, and the description thereof is omitted. FIG. 32 illustrates a process performed when a request for deleting personal information from an individual user is received. The same process is performed when a request for deleting personal information from an administrator of the device 50 is received.

In step S190, the data exchange unit 31 of the personal information management apparatus 30 transmits, to the device 50, storage destination information indicating the information of the storage destination identified based on the processing history information in step S189. The storage destination information includes a device information ID for identifying the device information stored in the device identified as the storage destination in step S189, information (name) for identifying the device 50*b* that generated the device information, a name and destination information of the device identified as the storage destination, area information (for example, area name) for identifying the area to which the device identified as the storage destination belongs, and information on the processing time at which the device information was processed. The storage destination information is an example of apparatus identification information for identifying a processing apparatus in which device information (device event data) is stored. Thereby, the data exchange unit 51 of the device 50 receives the storage destination information transmitted from the personal information management apparatus 30.

Figure 33:
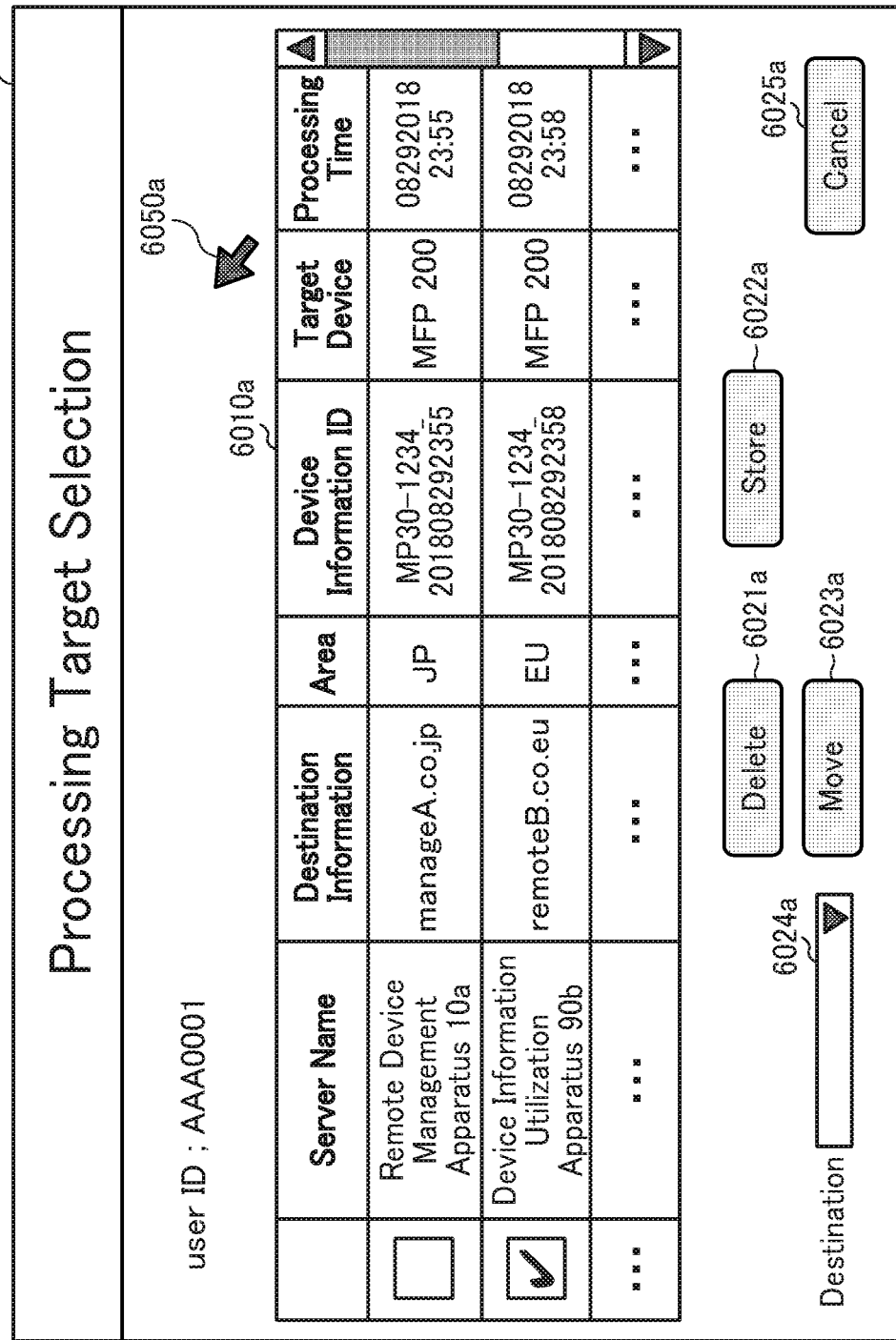
FIG. 33 is a diagram illustrating an example of a processing target selection screen.

In step S191, the display control unit 57 of the device 50 causes the display (for example, the panel display 240*a* illustrated in FIG. 5) to display the processing target selection screen 6000*a* including the storage destination information received by the data exchange unit 51. FIG. 33 is a diagram illustrating an example of the processing target selection screen. The processing target selection screen 6000*a* illustrated in FIG. 33 is an example of a data selection screen for allowing the user to select processing target data (device information). The processing target selection screen 6000*a* includes a processing target selection area 6010*a* for selecting processing target data (device information), a "Delete" button 6021*a* to be pressed when deleting the data (device information) selected in the processing target selection area 6010*a*, a "Store" button 6022*a* to be pressed when only the data (device information) selected in the processing target selection area 6010*a* is not to be deleted, a "Move" button 6023*a* to be pressed when moving the data (device information) selected in the processing target selection area 6010*a*, a "Destination" input area 6024*a* for inputting destination information or a server name indicating a move destination of data (device information), a "Cancel" button 6025*a* to be pressed when canceling the process of selecting the processing target, and a pointer 6050*a* for performing an input operation.

The processing target selection area 6010*a* indicates information (data identification information and processing content identification information) included in the storage destination information received in step S190. The user confirms the processing content identification information such as the area and the processing time or the data identification information of the target device or the like indicated in the processing target selection area 6010*a* to select data to be deleted or not to be deleted. For example, the user confirms the area indicated in the processing target selection area 6010 and selects a check box (left side of the processing target selection area 6010) associated with the specific area to select the processing of the apparatus belonging to the specific area. In addition, for example, the user confirms the target device indicated in the processing target selection area 6010 and selects a check box (the left side of the processing target selection area 6010) associated with the target device to request processing only for the apparatus in which device information generated by the specific target device (device 50) is stored. That is, the device 50 can request deletion of the data selected according to the processing content by displaying the processing target selection screen 6000*a* or 6000*b* including the data identification information and the processing content identification information. The information included in the processing target selection area 6010*a* is not limited to this example and may include a manufacturer name of the device 50 or the like as information for identifying the device 50 associated with the data identification information. Further, the information included in the processing target selection area 6010*a* may include, as the processing history information associated with the processing content identification information, information indicating the content of a service or the like in which the device information is used by the associated device. The processing target selection area 6010*a* includes at least one data (information) associated with the data identification information and the processing content identification information.

In step S192, the acceptance unit 56 of the device 50 accepts the selection of the processing target by the selection of the check box (storage destination information) and the "Delete" button 6021*a* included in the processing target selection area 6010*a* by the user. In the example of FIG. 33, the acceptance unit 56 accepts items associated with the server name "Device Information Utilization Apparatus 90*b*", the area "EU", the device information ID "MP30-1234_201808292355", and the like as deletion targets.

In step S193, the data exchange unit 51 of the device 50 transmits to the personal information management apparatus 30 a personal information deletion request requesting deletion of personal information associated with the data to be deleted selected in step S192. Here, the personal information deletion request includes storage destination information associated with the processing target selected in step S192. The data exchange unit 31 of the personal information management apparatus 30 receives the personal information deletion request transmitted from the device 50. In step S192, when the user selects the check box (storage destination information) and selects the "Store" button 6022*a* included in the processing target selection area 6010*a*, the acceptance unit 56 of the device 50 accepts selection of data not to be deleted. Then, in step S193, the data exchange unit 51 of the device 50 transmits the personal information deletion request requesting deletion of the personal information relating to data not selected in step S192 to the personal information management apparatus 30. In this case, the personal information deletion request includes storage destination information associated with the data not selected in step S192.

In step S194, the data exchange unit 31 of the personal information management apparatus 30 transmits the personal information deletion request to the remote device management apparatus 10*a* that is the storage destination indicated in the personal information deletion request received in step S193. The data exchange unit 11*a* of the remote device management apparatus 10*a* receives the personal information deletion request transmitted from the personal information management apparatus 30.

In step S195, when the personal information deletion request is received in step S194, the remote device management apparatus 10*a* deletes the personal information included in the device information stored in the device information management DB 1007*a*. The details of the personal information deletion process are the same as step S111 of FIG. 25 and the description of FIG. 26, and thus description thereof is omitted.

In step S196, the data exchange unit 11a of the remote device management apparatus 10a transmits a deletion result notification indicating that the personal information has been deleted to the personal information management apparatus 30. The deletion result notification includes the device information ID and the model number ID of the device information whose personal information has been deleted by the device information processing unit 12a, the destination information of the remote device management apparatus 10a that has been deleted, the processing history information indicating that the personal information has been deleted, and the processing time at which the deletion processing was executed. The data exchange unit 31 of the personal information management apparatus 30 receives the deletion result notification transmitted from the remote device management apparatus 10a. In step S197, the processing history information management unit 32 of the personal information management apparatus 30 updates the processing history information stored in the processing history information management DB 3003 based on the deletion result notification received in step S196. The processing history information updated by the processing history information management unit 32 is the same as the content illustrated in FIG. 28 and the description thereof is omitted. Thereby, the remote device management system 1 can delete the personal information included in the device information selected by the user according to the processing content from the storage destination where the personal information is stored. Further, the user can select the device information to be deleted according to the area where the device is installed or the type of the device 50 from which the device information is generated, so that the user can flexibly select the personal information to be deleted.

FIG. 32 illustrates the process of deleting the processing target data (personal information) selected by the user. When the "Move" button 6023a is selected on the processing target selection screen 6000a illustrated in FIG. 33, moving of the selected data to be processed is executed. In this case, the remote device management system 1 moves data (device information) to the move destination (input area 6024a) input by the user. Moving the data (device information) is a process of deleting the device information and transmitting the deleted device information to another apparatus. Further, the processing target selection screen 6000a illustrated in FIG. 33 may include a "Transfer" button pressed when executing the transfer processing of the data (device information) selected in the processing target selection area 6010a and an input area for inputting destination information or a server name indicating a transfer destination of data (device information). In this case, when the "Transfer" button is selected, processing for transferring the selected processing target data is performed. The remote device management system 1 executes data (device information) transfer processing to a transfer destination designated by the user. The data (device information) transfer process is a process of transmitting the device information stored in the transfer source to the transfer destination while keeping the device information stored in the transfer source.

Figure 34:
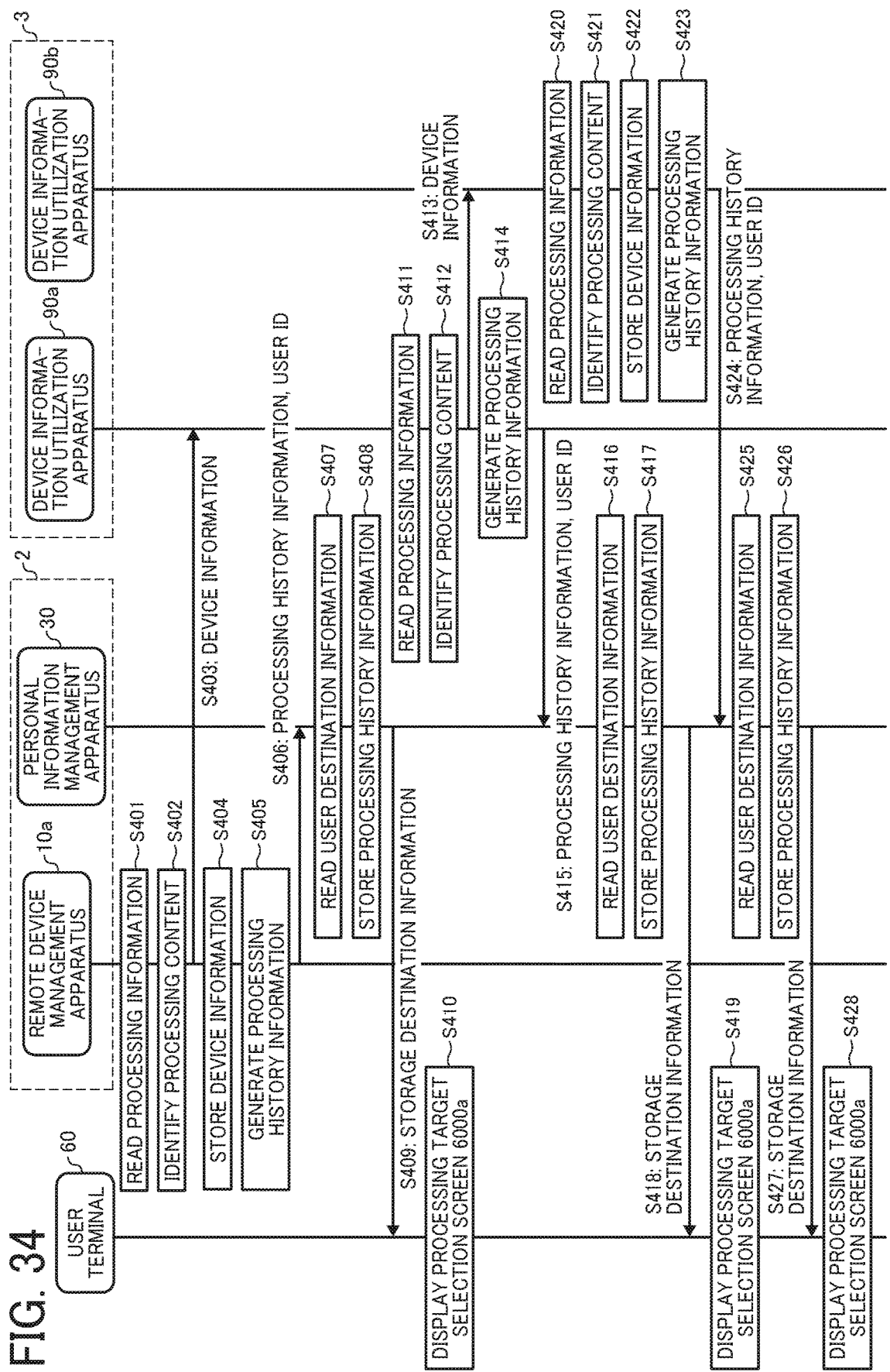
FIG. 34 is a sequence diagram illustrating another example of the process of selecting data to be processed in the remote device management system.

A description is now given of another example of the process of selecting a processing target by the device 50 with reference to FIG. 34 to FIG. 36. FIG. 34 and FIG. 35 are sequence diagrams illustrating another example of the process of selecting data to be processed in the remote device management system. The processing illustrated in FIGS. 34 and 35 queries the user whether or not to delete the stored device information when storing the device information. Referring to FIG. 34, processing in which the user of the device 50 is inquired about whether or not the device information is deleted every time the processing history information is stored in the personal information management apparatus 30 in the storage process of the device information illustrated in FIG. 19 is described. Since the processing of steps S401 to S405, the processing of steps S411 to S414, and the processing of steps S420 to S423 in FIG. 34 are the same as the processing of steps S51 to S55, the processing of steps S58 to S61, and the processing of steps S64 to S67 in FIG. 19 respectively, description thereof is omitted.

In step S406, the data exchange unit 11a of the remote device management apparatus 10a transmits the processing history information generated by the processing history information generation unit 13a and the user ID included in the device information stored in step S404 to the personal information management apparatus 30. Thereby, the data exchange unit 31 of the personal information management apparatus 30 receives the processing history information and the user ID transmitted from the remote device management apparatus 10a.

In step S407, the storage/reading unit 39 of the personal information management apparatus 30 searches the user destination information management DB 3002 (refer to FIG. 13B) using the user ID received in step S406 as a search key, and reads the user destination information associated with the user ID. In step S408, the processing history information management unit 32 of the personal information management apparatus 30 stores the processing history information received in step S406 in the processing history information management DB 3003 (refer to FIG. 14). Note that the order of the processing in step S407 and the processing in step S408 may be reversed or may be executed in parallel.

In step S409, the data exchange unit 31 of the personal information management apparatus 30 transmits the storage destination information indicating the storage destination of the device information associated with the user ID received in step S406, to the user terminal 60 corresponding to the user destination information read in step S407, based on the processing history information stored in the processing history information management DB 3003. Thereby, the data exchange unit 61 of the user terminal 60 receives the storage destination information transmitted from the personal information management apparatus 30. Here, when a plurality of pieces of user destination information have been read in step S407 by the data exchange unit 31 of the personal information management apparatus 30, the storage destination information may be transmitted to all user destinations, or the storage destination information may be transmitted to just one user destination according to a priority settings of the applications set in advance.

In step S410, the display control unit 63 of the user terminal 60 causes the display 108 of the user terminal 60 to display the processing target selection screen 6000a illustrated in FIG. 33. Thereby, the user of the user terminal 60 can confirm that the device information including his or her personal information has been stored in the cloud environment and can select data (device information) to be processed. Then, the user of the user terminal 60 selects processing target data using the processing target selection screen 6000a, the acceptance unit 62 of the user terminal 60 accepts the selection of the data to be processed, and the data exchange unit 61 transmits to the personal information management apparatus 30 a personal information deletion request for requesting deletion of the personal information relating to the selected processing target data. Thereby, the personal information deletion process as illustrated in FIG. 25 is executed.

Similarly, in step S415, the data exchange unit 91a of the device information utilization apparatus 90a transmits the processing history information generated by the processing history information generation unit 93a and the user ID included in the device information received in step S403 to the personal information management apparatus 30. Thereby, the data exchange unit 31 of the personal information management apparatus 30 receives the processing history information and the user ID transmitted from the device information utilization apparatus 90a.

In step S416, the storage/reading unit 39 of the personal information management apparatus 30 searches the user destination information management DB 3002 (refer to FIG. 13B) using the user ID received in step S415 as a search key, and reads the user destination information associated with the user ID. In step S417, the processing history information management unit 32 of the personal information management apparatus 30 stores the processing history information received in step S416 in the processing history information management DB 3003 (refer to FIG. 14). Note that the order of the processing in step S416 and the processing in step S417 may be reversed or may be executed in parallel.

In step S418, the data exchange unit 31 of the personal information management apparatus 30 transmits the storage destination information indicating the storage destination of the device information associated with the user ID received in step S406, to the user terminal 60 corresponding to the user destination information read in step S416, based on the processing history information stored in the processing history information management DB 3003. Thereby, the data exchange unit 61 of the user terminal 60 receives the storage destination information transmitted from the personal information management apparatus 30.

In step S419, the display control unit 63 of the user terminal 60 causes the display 108 of the user terminal 60 to display the processing target selection screen 6000a illustrated in FIG. 33. Thereby, the user of the user terminal 60 can confirm that the device information including his or her personal information has been stored in the cloud environment and can select data (device information) to be processed. Then, the user of the user terminal 60 selects processing target data using the processing target selection screen 6000a, the acceptance unit 62 of the user terminal 60 accepts the selection of the data to be processed, and the data exchange unit 61 transmits to the personal information management apparatus 30 a personal information deletion request for requesting deletion of the personal information relating to the selected processing target data. Thereby, the personal information deletion process as illustrated in FIG. 25 is executed.

Similarly, in step S424, the data exchange unit 91b of the device information utilization apparatus 90b transmits the processing history information generated by the processing history information generation unit 93b and the user ID included in the device information received in step S413 to the personal information management apparatus 30. Thereby, the data exchange unit 31 of the personal information management apparatus 30 receives the processing history information and the user ID transmitted from the device information utilization apparatus 90b.

In step S425, the storage/reading unit 39 of the personal information management apparatus 30 searches the user destination information management DB 3002 (refer to FIG. 13B) using the user ID received in step S415 as a search key, and reads the user destination information associated with the user ID. In step S426, the processing history information management unit 32 of the personal information management apparatus 30 stores the processing history information received in step S416 in the processing history information management DB 3003 (refer to FIG. 14). Note that the order of the processing in step S425 and the processing in step S426 may be reversed or may be executed in parallel.

In step S427, the data exchange unit 31 of the personal information management apparatus 30 transmits the storage destination information indicating the storage destination of the device information associated with the user ID received in step S406, to the user terminal 60 corresponding to the user destination information read in step S425, based on the processing history information stored in the processing history information management DB 3003. Thereby, the data exchange unit 61 of the user terminal 60 receives the storage destination information transmitted from the personal information management apparatus 30. Thereby, the data exchange unit 61 of the user terminal 60 receives the storage destination information transmitted from the personal information management apparatus 30.

In step S428, the display control unit 63 of the user terminal 60 causes the display 108 of the user terminal 60 to display the processing target selection screen 6000a illustrated in FIG. 33. Thereby, the user of the user terminal 60 can confirm that the device information including his or her personal information has been stored in the cloud environment and can select data (device information) to be processed. Then, the user of the user terminal 60 selects processing target data using the processing target selection screen 6000a, the acceptance unit 62 of the user terminal 60 accepts the selection of the data to be processed, and the data exchange unit 61 transmits to the personal information management apparatus 30 a personal information deletion request for requesting deletion of the personal information relating to the selected processing target data. Thereby, the personal information deletion process as illustrated in FIG. 25 is executed.

Thereby, the remote device management system 1 displays the processing target selection screen 6000a on the user terminal 60 when the processing history information is stored (acquired) in the personal information management apparatus 30. Accordingly, the user can select the data (device information) to be processed, and the personal information relating to the selected data (device information) to be processed can be deleted from the cloud environment. FIG. 35 illustrates an example in which the user selects data to be processed each time the personal information management apparatus 30 acquires or stores the processing history information. Alternatively, the process of transmitting the storage destination information from the personal information management apparatus 30 to the user terminal 60 may be executed according to a timing (frequency, number of times, etc.) set in advance.

A description is now given of another example of the processing of selecting the processing target by the device 50 reference to FIG. 35. The processing in FIG. 35 is a process in which the remote device management apparatus 10a queries the user of the device 50 whether or not the device information is to be deleted, when the device information is stored in the remote device management apparatus 10a, in the storage processing of the device information illustrated in FIG. 19. Note that the processing of steps S451 to S454 in FIG. 35 is the same as the processing of steps S51 to S54 illustrated in FIG. 19, and thus description thereof is omitted.

In step 455, the data exchange unit 11*a* of the remote device management apparatus 10*a* transmits a user destination information acquisition request for requesting user destination information of the individual user identified by the user ID included in the device information stored in step S454 to the personal information management apparatus 30. The user destination information acquisition request includes the user ID included in the device information stored in step S454. Thereby, the data exchange unit 31 of the personal information management apparatus 30 receives the user destination information acquisition request transmitted from the remote device management apparatus 10*a*.

In step S456, the storage/reading unit 39 of the personal information management apparatus 30 searches the user destination information management DB 3002 (refer to FIG. 13B) using the user ID included in the user destination information acquisition request received in step S455 as a search key, and reads the user destination information associated with the user ID. In step S457, the data exchange unit 31 of the personal information management apparatus 30 transmits the user destination information read in step S456 to the remote device management apparatus 10*a*. Here, when a plurality of pieces of user destination information are read in step S456, the data exchange unit 31 of the personal information management apparatus 30 may transmit all the user destination information to the remote device management apparatus 10*a*, or one piece of user destination information may be transmitted to the remote device management apparatus 10*a* in accordance with the priority of the applications set in advance. Thereby, the data exchange unit 11*a* of the remote device management apparatus 10*a* receives the user destination information transmitted from the personal information management apparatus 30.

In step S458, the data exchange unit 11*a* of the remote device management apparatus 10*a* transmits the storage destination information indicating that the device information is stored in the remote device management apparatus 10*a*, to the user terminal 60 associated with the user destination information received in step S457. Thereby, the data exchange unit 61 of the user terminal 60 receives the storage destination information transmitted from the remote device management apparatus 10*a*.

In step S459, the display control unit 63 of the user terminal 60 causes the display 108 of the user terminal 60 to display the processing target selection screen 6000*a* illustrated in FIG. 33. Thereby, the user of the user terminal 60 can confirm that the device information including his or her personal information has been stored in the remote device management apparatus 10*a* and can select data (device information) to be processed. In step S460, the acceptance unit 62 of the user terminal 60 accepts the selection of the processing target by the selection of the check box (storage destination information) and the "Delete" button 6021*a* included in the processing target selection area 6010*a* by the user. Here, the description is given on the assumption that the selection to delete the device information stored in the remote device management apparatus 10*a* has been accepted by the acceptance unit 56.

In step S461, the data exchange unit 61 of the user terminal 60 transmits to the remote device management apparatus 10*a* a personal information deletion request requesting deletion of personal information associated with the data to be deleted selected in step S460. Here, the personal information deletion request includes storage destination information associated with the processing target selected in step S460. The data exchange unit 11*a* of the remote device management apparatus 10*a* receives the personal information deletion request transmitted from the user terminal 60.

In step S462, the remote device management apparatus 10*a* deletes the personal information included in the device information to be deleted indicated in the personal information deletion request received in step S461 from among the device information stored in the device information management DB 1007*a*. The details of the personal information deletion processing are the same as the processing illustrated in FIG. 26, and the description thereof is omitted. In step S463, the processing history information generation unit 13*a* of the remote device management apparatus 10*a* generates the processing history information indicating the history of processing performed on the device information. In this example, the processing history information generation unit 13*a* generates the processing history information indicating the history of "personal information stored in the remote device management apparatus 10*a*" as the processing history. Note that when a selection to store the device information stored in the remote device management apparatus 10*a* in step S460 (for example, the selection of the "Store" button 6022*a* or the "Cancel" button 6025*a*) is received, the remote device management apparatus 10*a* does not execute the process of step S462, and causes the processing history information generation unit 13*a* to generate the history information indicating the history of "stored in the remote device management apparatus 10*a*". The steps S464 to S477 are the same as the steps S56 to S69 illustrated in FIG. 19, and the description thereof is omitted.

The remote device management system 1 enables the user to select the data (device information) to be processed, and delete the personal information relating to the selected processing target data (device information) from the storage destination indicated in the storage destination information by displaying the storage destination information transmitted from the management system 2 to the user terminal 60 at a timing set in advance on the user terminal 60, as illustrated in FIGS. 34 and 35.

A description is now given of another example of the processing target selection screen with reference to FIG. 36. The processing target selection screen 6000*b* illustrated in FIG. 36 includes, in addition to the configuration of the processing target selection screen 6000*a*, an item selection area 6030*b* for selecting processing target data for each item included in the device information. The item selection area 6030*b* includes a target data selection area 6031*b* for selecting data (device information) to be processed and an item information selection area 6035*b* for selecting item information indicating an item to be processed. The user selects data (device information) to be processed in the target data selection area 6031*b*, and by selecting item information in the item information selection area 6035*b*, deletion of data corresponding to the item information selected in the item information selection area 6035*b* in the device information selected in the target data selection area 6031*b* can be requested. The remote device management system 1, by displaying the processing target selection screen 6000*b* on the user terminal 60, enables selecting the item included in the device information, not just the entire device information, and deletes only the data corresponding to the selected item from the storage destination where the device information is stored. Note that a processing target selection area 6010*b*, a "Delete" button 6021*b*, a "Store" button 6022*b*, a "Move" button 6023*b*, a "Destination" input area 6024*b*, a "Cancel" button 6025*b*, and pointer 6050*b* included in the processing target selection screen 6000*b* are the same as the processing target selection area 6010a, the "Delete" button 6021a, the "Store" button 6022a, the "Move" button 6023a, the "Destination" input area 6024a, the "Cancel" button 6025a, and the pointer 6050a included in the processing target selection screen 6000a illustrated in FIG. 33. The processing target selection screen 6000b is an example of a data selection screen.

Note that although the process of selecting the processing target using the user terminal 60 has been described in FIG. 34 to FIG. 36, alternatively the processing of selecting a processing target illustrated in FIG. 34 to FIG. 36 may be executed using the device 50. Also, in the processes illustrated in FIG. 25 to FIG. 33 described above, the respective processes may be executed using the user terminal 60 instead of the device 50.

Figure 37:
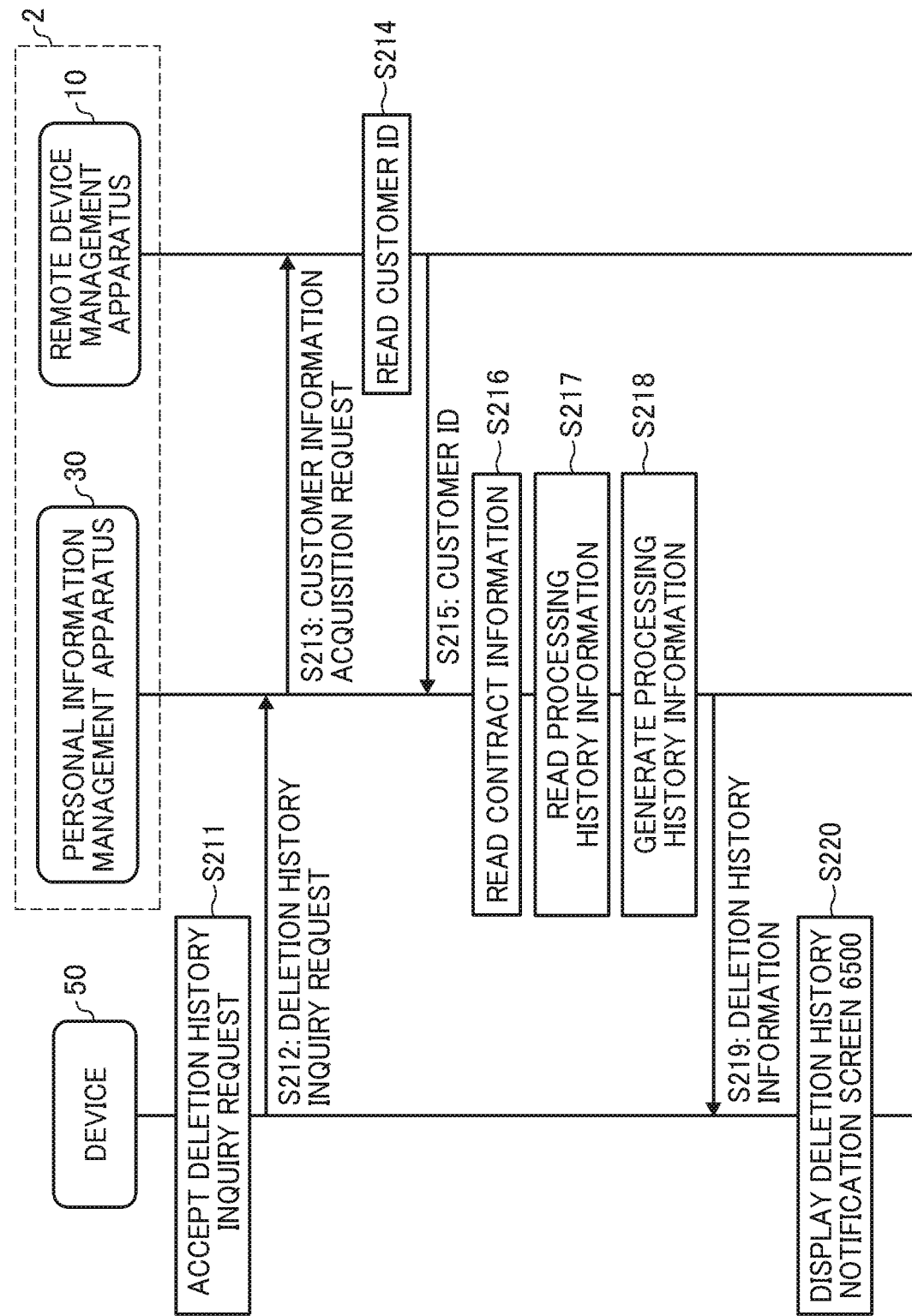
FIG. 37 is a sequence diagram illustrating an example of a deletion history inquiry process in the remote device management system.

A description is now given of a process in a case where the user requests an inquiry of personal information in order to confirm that the personal information has been deleted with reference to FIG. 37 and FIG. 38. FIG. 37 is a sequence diagram illustrating an example of a deletion history inquiry process in the remote device management system. FIG. 37 illustrates an example in which an individual user (for example, user ID "AAA0001") requests a deletion history inquiry. FIG. 37 illustrates the deletion history inquiry process using the device 50. However, the deletion history inquiry process may be performed using the user terminal 60 instead of the device 50.

In step S211, the acceptance unit 56 of the device 50 accepts the deletion history inquiry request according to an input operation on an input screen. In step S212, when the inquiry request is received in step S211, the data exchange unit 51 of the device 50 transmits the deletion history inquiry request to the personal information management apparatus 30. Specifically, the storage/reading unit 59 of the device 50 reads the destination information 5005 indicating the destination of the personal information management apparatus 30 by searching the storage unit 5000. Then, the data exchange unit 51 transmits the deletion history inquiry request to the personal information management apparatus 30 indicated by the destination information 5005 read by the storage/reading unit 59. The deletion history inquiry request includes the user ID for identifying the individual user who has made the inquiry request accepted by the acceptance unit 56. In this example, the deletion history inquiry request includes the user ID "AAA0001". Thereby, the data exchange unit 31 of the personal information management apparatus 30 transmits the deletion history inquiry request.

In step S213, when the personal information deletion request is received in step S212, the data exchange unit 31 of the personal information management apparatus 30 transmits the customer information acquisition request to the remote device management apparatus 10a. The customer information acquisition request includes the same user ID as the user ID included in the deletion history inquiry request received in step S211. The data exchange unit 11a of the remote device management apparatus 10a receives the customer information acquisition request transmitted from the personal information management apparatus 30.

In step S214, the storage/reading unit 19a of the remote device management apparatus 10a searches the user information management DB 1001a (refer to FIG. 10) using the user ID included in the customer information acquisition request received in step S213 as a search key, and reads the customer ID associated with this user ID. In this example, the storage/reading unit 19a reads the customer ID "AAA" associated with the user ID "AAA0001".

In step S215, the data exchange unit 11a of the remote device management apparatus 10a transmits the customer ID read in step S214 to the personal information management apparatus 30. The data exchange unit 31 of the personal information management apparatus 30 receives the customer ID transmitted from the remote device management apparatus 10.

In step S216, the storage/reading unit 39 of the personal information management apparatus 30 searches the contract information management DB 3001 (refer to FIG. 13A) using the customer ID received in step S215 as a search key and reads associated contract information. In this example, the storage/reading unit 39 reads the contract information associated with the customer ID "AAA".

In step S217, the storage/reading unit 39 of the personal information management apparatus 30 searches the processing history information management DB 3003 (refer to FIG. 14) using the model number ID included in the contract information read in step S216 as a search key and reads the processing history information associated with the model number ID. In this example, the storage/reading unit 39 reads the processing history information associated with the model number ID "MP30-1234".

In step S218, the generation unit 34 of the personal information management apparatus 30 generates deletion history information indicating the deletion history of the personal information based on the processing history information read in step S217. Specifically, the generation unit 34 generates the deletion history information using the processing history information whose processing history is "deleted". The deletion history information generated by the generation unit 34 includes processing server information (for example, server name or destination information) included in the processing history information whose processing history is "deleted", area information (for example, area) for identifying the area to which the device indicated by the processing server information belongs, a device information ID for identifying the deleted device information, information (target device) for identifying the device 50 that generated the device information, and information on the processing time at which the device information was deleted is included.

In step S219, the data exchange unit 31 of the personal information management apparatus 30 transmits the deletion history information generated in step S218 to the device 50. Thereby, the data exchange unit 51 of the device 50 receives the deletion history information transmitted from the personal information management apparatus 30. In step S220, the display control unit 57 of the device 50 causes the display (for example, the panel display 240a illustrated in FIG. 5) to display the deletion history notification screen 6500 including the deletion history information received by the data exchange unit 51. FIG. 38 is a diagram illustrating an example of the deletion history notification screen. The deletion history notification screen 6500 illustrated in FIG. 38 is a display screen for presenting the deletion history of the personal information to the user. The deletion history notification screen 6500 includes a deletion history display area 6510 for displaying the deleted personal information, a "Close" button 6520 pressed to close the deletion history notification screen 6500, and a pointer 6550 for performing an input operation. The deletion history display area 6510 displays information included in the deletion history information received in step S219. Accordingly, the user can confirm whether the personal information for which the deletion request has been made has been deleted, for example, by checking the area, target device, processing time, and the like displayed in the deletion history display area 6510. Also, the personal information management apparatus 30 notifies the user that the personal information requested to be deleted by the user has been deleted by transmitting the deletion history information indicating the history of the deletion processing of the personal information to the device 50. Further, the remote device management system 1 enables the user to confirm that the personal information has been deleted in response to the request from the user by displaying the deletion history information transmitted from the personal information management apparatus 30 on the device 50.

The deletion history notification screen 6500 illustrated in FIG. 38 may be displayed on the device 50 as a processing result of the processing for deleting personal information illustrated in FIG. 25 to FIG. 36. In this case, the data exchange unit 31 of the personal information management apparatus 30 that has performed the processing of step S116 illustrated in FIG. 25 or the processing of step S163 illustrated in FIG. 29 transmits the deletion history information indicating the deletion history of the personal information to the device 50. The display control unit 57 of the device 50 causes the display (for example, the panel display 240*a* illustrated in FIG. 5) to display the deletion history notification screen 6500 including the deletion history information received by the data exchange unit 51. FIG. 37 illustrates an example of the inquiry processing of the deletion history of the personal information. However, the same processing is executed when an inquiry regarding the transfer history or the move history is executed. In this case, in step S219, the data exchange unit 31 of the personal information management apparatus 30 transmits the transfer history information generated by the generation unit 34 whose processing history is "transferred" or the move history information whose processing history is "moved" to the device 50. Then, the display control unit 57 of the device 50 displays a transfer history notification screen including the transfer history information or a move history notification screen including the move history information received by the data exchange unit 51, for example, on the panel display 240*a* illustrated in FIG. 5. Furthermore, the device 50 or the user terminal 60 on which the deletion history notification screen 6500 is displayed may be different from the device 50 or the user terminal 60 that has received the personal information deletion request or the personal information inquiry request but used by the same user. Further, the deletion history notification screen 6500 may have a configuration including the content of the device information on which the deletion processing of the personal information as illustrated in FIG. 27 or 31 has been performed, as the deletion history information.

Figure 39:
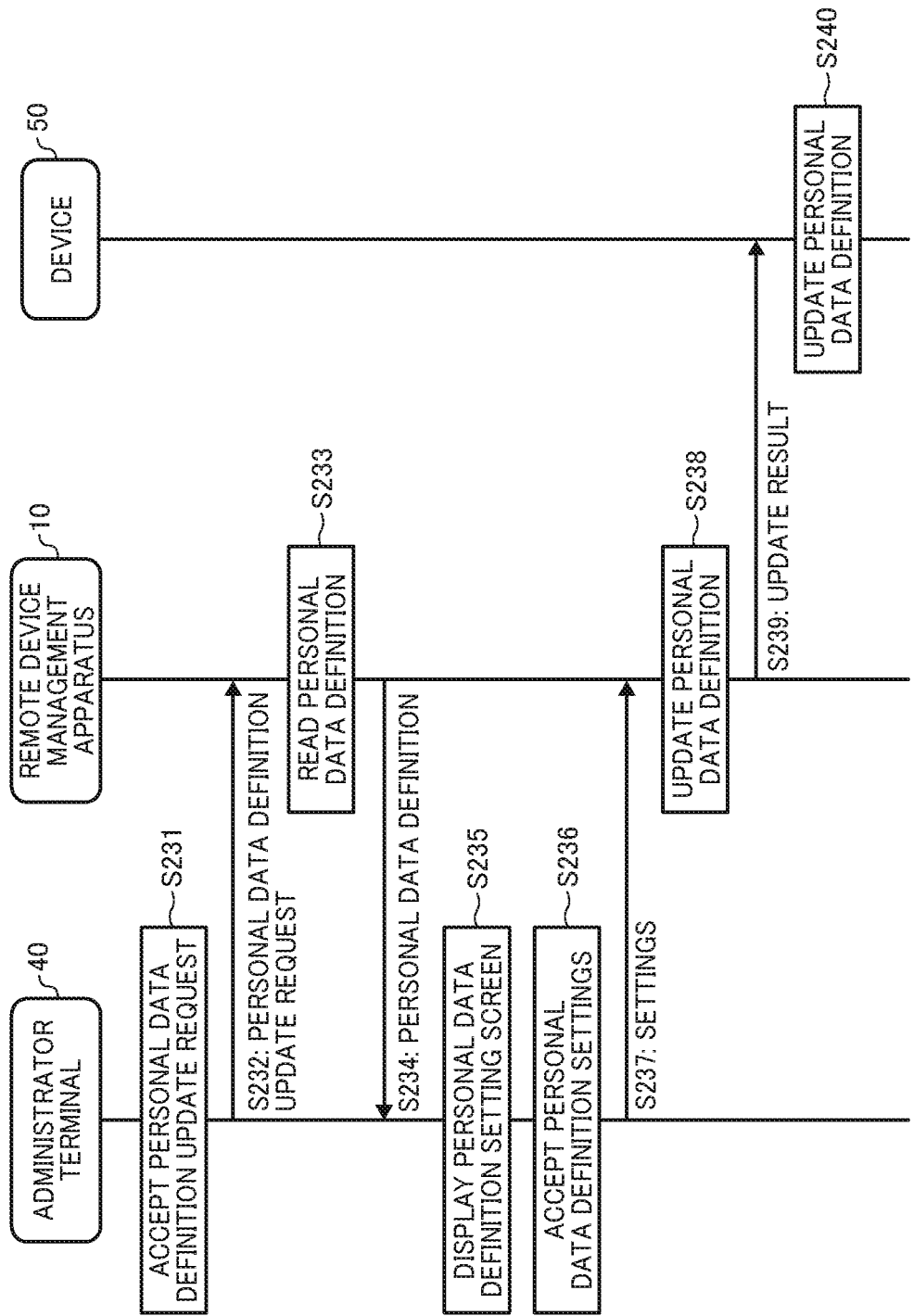
FIG. 39 is a sequence diagram illustrating an example of a personal data definition update process in the remote device management system.
Figure 40:
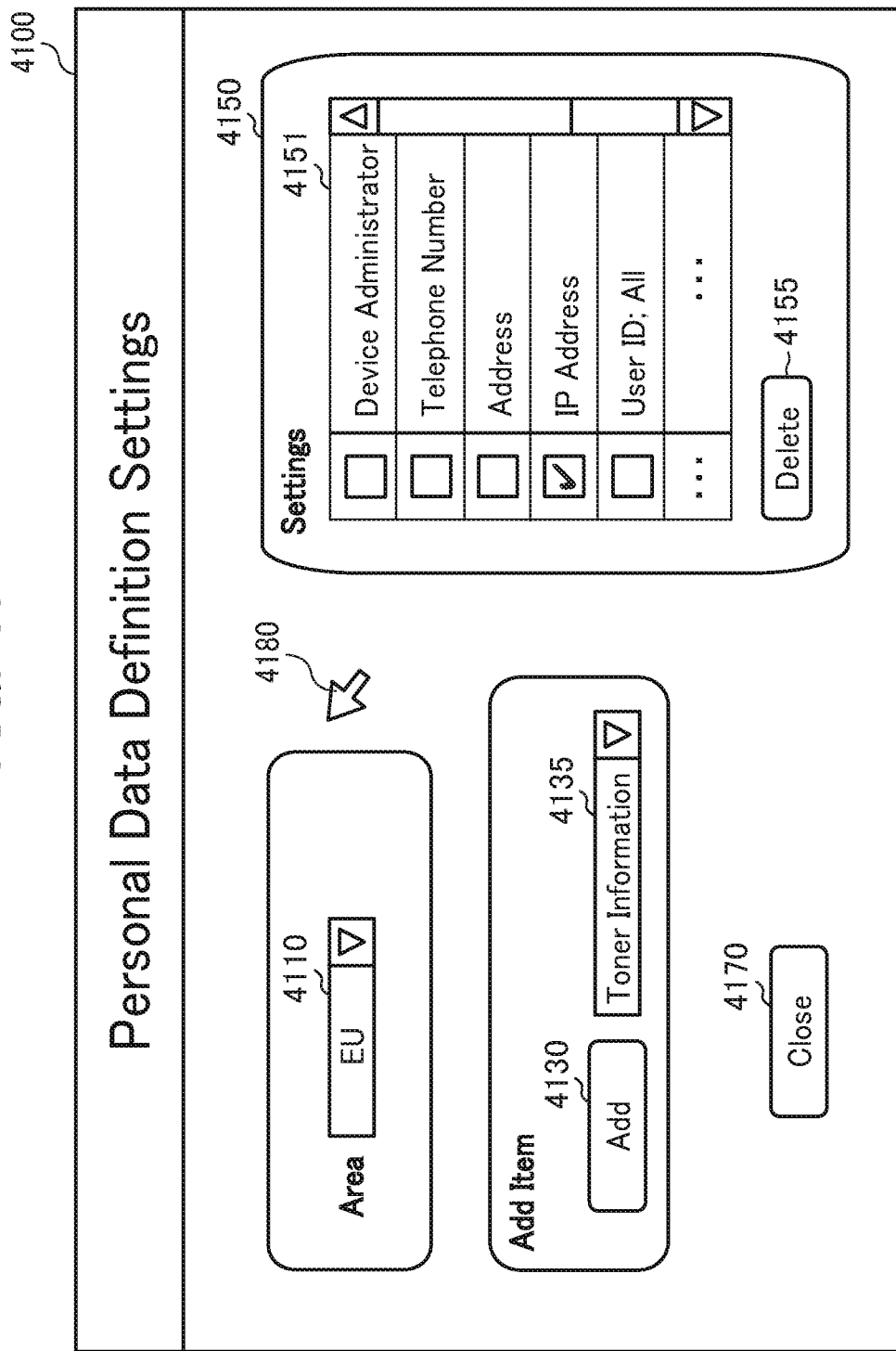
FIG. 40 is a diagram illustrating an example of a personal data definition setting screen.

A description is now given of a process of updating a personal data definition for adding personal data information to device event data indicating the content of an event generated by the device 50 with reference to FIG. 39 and FIG. 40. FIG. 39 is a sequence diagram illustrating an example of a personal data definition update process in the remote device management system.

In step S231, the acceptance unit 42 of the administrator terminal 40 accepts a request for updating the personal data definition according to an input operation on an input screen or the like. In step S232, when the update request is received in step S231, the data exchange unit 41 of the administrator terminal 40 transmits a personal data definition update request to the remote device management apparatus 10. This personal data definition update request includes area information (for example, area) indicating an area corresponding to the personal data definition to be updated. Thereby, the data exchange unit 11 of the remote device management apparatus 10 receives the personal data definition update request transmitted from the administrator terminal 40.

In step S233, the storage/reading unit 19 of the remote device management apparatus 10 searches the personal data definition management DB 1003 by using the area information included in the personal data definition update request received in step S232 as a search key and reads the personal data definition indicating the personal data definition corresponding to the area information.

In step S234, the data exchange unit 11 of the remote device management apparatus 10 transmits the personal data definition read in step S233 to the administrator terminal 40. Thereby, the data exchange unit 41 of the administrator terminal 40 receives the personal data definition transmitted from the remote device management apparatus 10.

In step S235, the display control unit 43 of the administrator terminal 40 causes the display 108 of the administrator terminal 40 to display the personal data definition setting screen 4100 including the personal data definition received in step S234. FIG. 40 is a diagram illustrating an example of the personal data definition setting screen. The personal data definition setting screen 4100 illustrated in FIG. 40 is the display screen for the system administrator to set or update the personal data definition. The personal data definition setting screen 4100 includes an "Area" input area 4110 in which an area for setting personal data definition can be selected or input, an "Add" button 4130 pressed when adding a setting item, an input area 4135 for selecting or inputting the setting item to be added, a "Settings" display area 4150 in which setting items set as personal data definitions are displayed, a "Close" button 4170 pressed when closing the personal data definition setting screen 4100, and a pointer 4180 for executing an input operation. The "Settings" display area 4150 includes a setting item selection area 4151 for selecting a setting item to be deleted and a "Delete" button 4155 pressed when deleting the setting item selected by the setting item selection area 4151.

In step S236, the acceptance unit 42 of the administrator terminal 40 accepts the personal data definition settings in response to an input operation on the personal data definition setting screen 4100 displayed in step S235. In this case, the acceptance unit 42 accepts input to the "Add" button 4130 or the "Delete" button 4155 included in the personal data definition setting screen 4100, and thereby sets the addition or deletion of the item included in the personal data definition. In step S237, the data exchange unit 41 of the administrator terminal 40 transmits settings information indicating the setting content received in step S236 to the remote device management apparatus 10. Thereby, the data exchange unit 11 of the remote device management apparatus 10 receives the settings information transmitted from the administrator terminal 40.

In step S238, the setting unit 15 of the remote device management apparatus 10 updates the personal data definition stored in the personal data definition management DB 1003 based on the settings information received in step S237.

In step S239, the data exchange unit 11 of the remote device management apparatus 10 transmits, to the device 50, update information indicating the settings updated in step S238. Thereby, the data exchange unit 51 of the device 50 receives the update information transmitted from the remote device management apparatus 10. In step S240, the storage/reading unit 59 of the device 50 updates the personal data definition stored in the personal data definition management DB 5001, based on the update information received in step S239.

Thereby, the remote device management apparatus 10 can flexibly update the personal data definition used for identifying the personal information by the processing of the system administrator using the administrator terminal 40. The device 50 can execute a process of adding the personal data information (refer to FIG. 17) using the personal data definition updated by the remote device management apparatus 10. FIG. 39 illustrates the process of updating the personal data definition. The setting unit 15 of the remote device management apparatus 10 may newly set the personal data definition associated with an area different from the personal data definition management table stored in the personal data definition management DB 1003. Accordingly, the remote device management system 1 flexibly sets and modifies personal data definitions in order to define information to be handled as personal information in response to various factors such as user requests, social situations, changes in laws and regulations, and the like.

A description is now given of an example of a process of identifying the user of the device 50 with reference to FIG. 41 to FIG. 55. First, a process of identifying a user using an authentication server 70 (an authentication server 70*a* or an authentication server 70*b*) is described with reference to FIG. 41 to FIG. 44.

Figure 41:
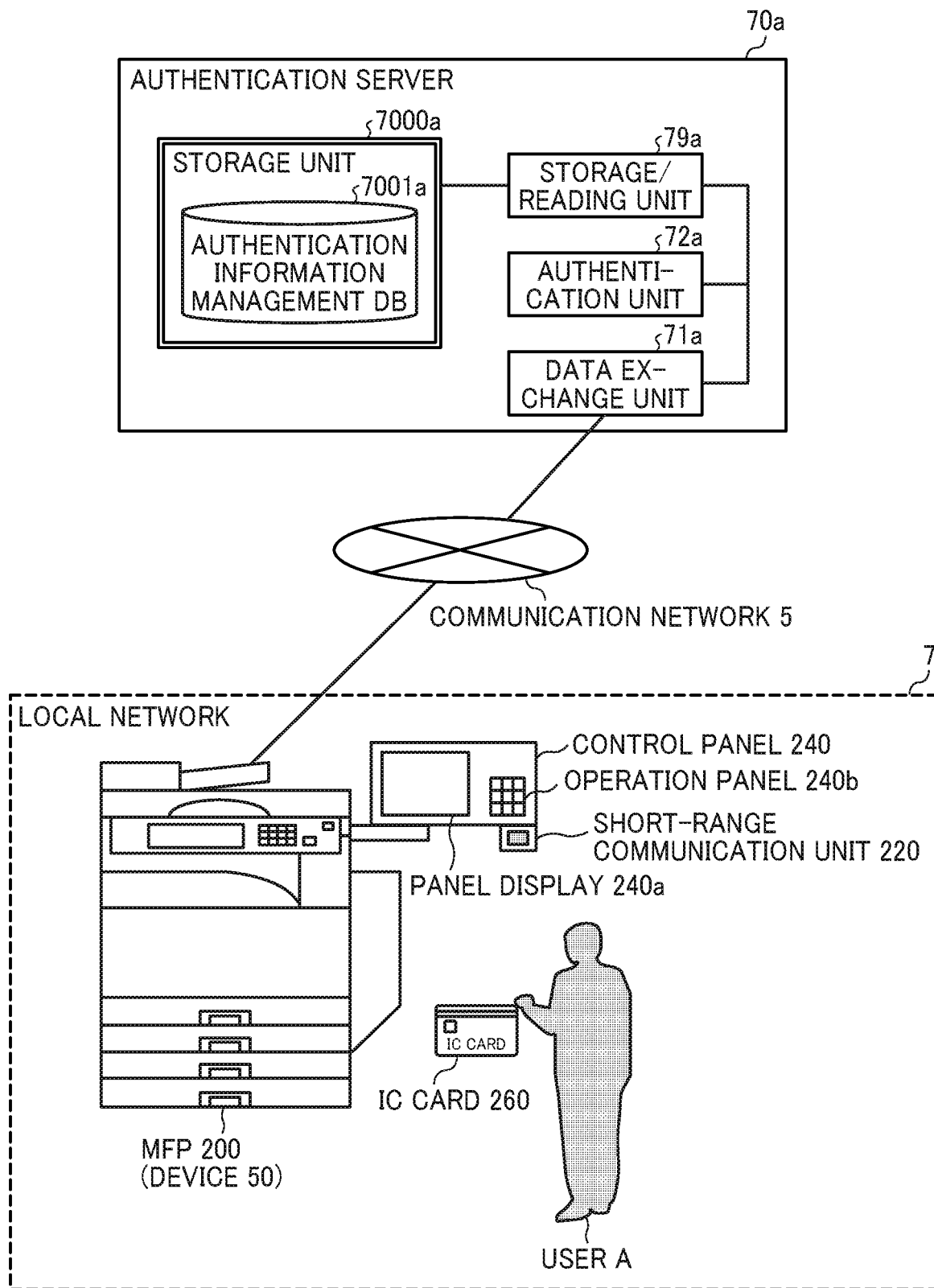
FIG. 41 is a conceptual diagram illustrating an example of a user using the device.

FIG. 41 is a conceptual diagram illustrating an example of the user using the device. As illustrated in FIG. 41, the MFP 200 as an example of the device 50 is communicably connected to the authentication server 70*a* through the communication network 5. MFP 200 executes user authentication using the authentication server 70*a*, for example, when user A executes short-distance wireless communication by bringing his or her IC card 260 close to (or over) the short-range communication unit 220 of MFP 200. Authentication information including a user ID and password of the user A (individual user) is stored in the IC card 260.

The authentication server 70*a* is a server computer connected to the communication network 5 and executes authentication of the user who uses the MFP 200. The authentication server 70*a* executes user authentication using, for example, Lightweight Directory Access Protocol (LDAP). Note that the authentication method by the authentication server 70*a* is not limited to the LDAP. The authentication server 70*a* has the same hardware configuration as the computer illustrated in FIG. 4.

Functions executed by the authentication server 70*a* include a data exchange unit 71*a*, an authentication unit 72*a*, and a storage/reading unit 79*a*. These units are functions that are implemented by or that are caused to function by operating any of the elements illustrated in FIG. 41 in cooperation with the instructions of the CPU 101 of the authentication server 70*a* according to the control program expanded from the HD 104 of the authentication server 70*a* to the RAM 103 of the authentication server 70*a*. The authentication server 70*a* has a storage unit 7000*a* implemented by the HD 104 or the like of the authentication server 70*a* illustrated in FIG. 4.

The data exchange unit 71*a* is implemented by a command from the CPU 101 of the authentication server 70*a* and the network I/F 109 of the authentication server 70*a* illustrated in FIG. 4, and exchanges data (information) with another device, apparatus, or terminal through the communication network 5. The data exchange unit 71*a* receives the authentication request transmitted from the device 50 and transmits the authentication result by the authentication unit 72*a* to the device 50.

The authentication unit 72*a* is a function implemented by a command from the CPU 101 of the authentication server 70*a* illustrated in FIG. 4 and executes authentication of a user who uses the device 50. The authentication unit 72*a* executes the authentication of the user who uses the device 50 that has transmitted the authentication request, using, for example, an authentication request received by the data exchange unit 71*a* and an authentication information management table (refer to FIG. 42) described below.

The storage/reading unit 79*a* is implemented by a command from the CPU 101 of the authentication server 70*a* illustrated in FIG. 4 and has a function of storing various data in the storage unit 7000*a* and reading various data from the storage unit 7000*a*. The authentication information management DB 7001*a* (refer to FIG. 42) is stored in the storage unit 7000*a*.

Figures 42, 43:
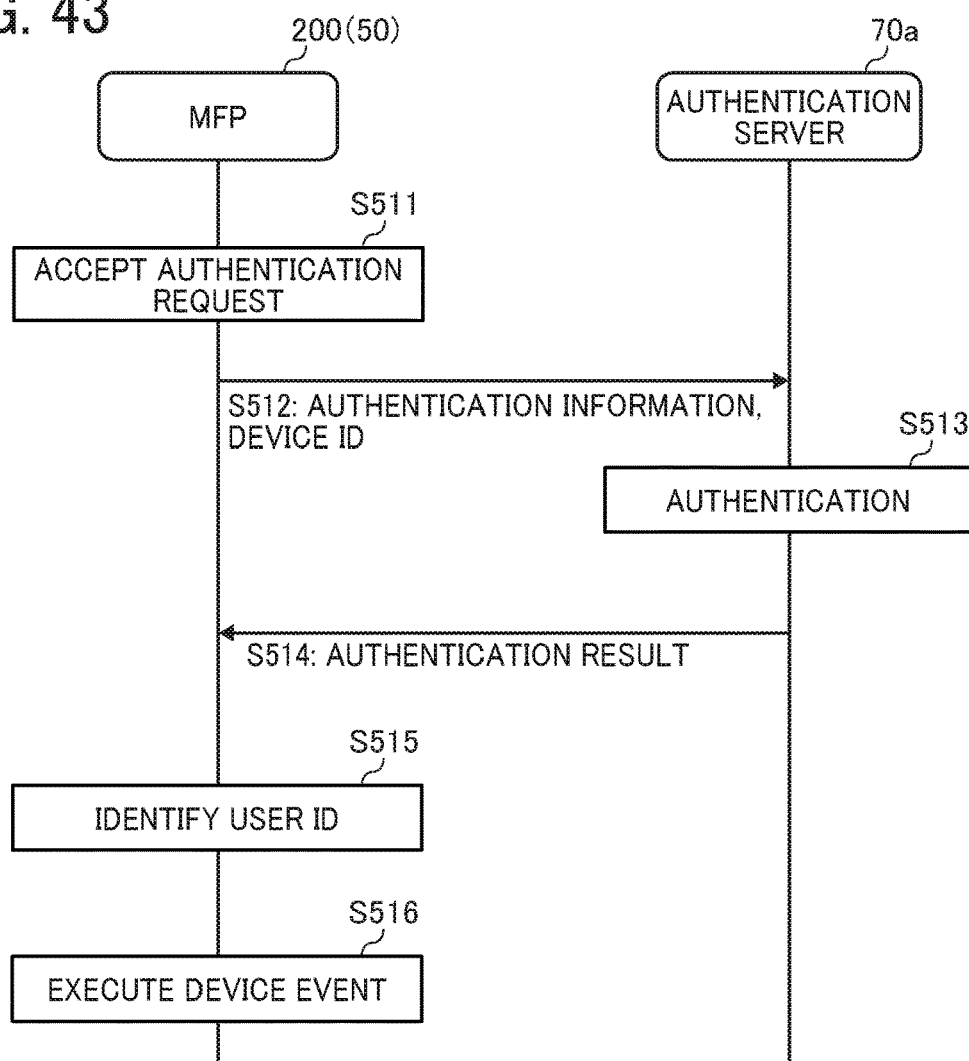
FIG. 42 is a conceptual diagram illustrating an example of an authentication information management table.
FIG. 43 is a sequence diagram illustrating an example of a user authentication process in the device.

FIG. 42 is a conceptual diagram illustrating an example of the authentication information management table. The authentication information management DB 7001*a* storing the authentication information management table as illustrated in FIG. 42 is stored in the storage unit 7000*a*. The authentication information management table stores the user ID for identifying the individual user who uses the MFP 200 and the password in association with each device ID for identifying the MFP 200.

FIG. 43 is a sequence diagram illustrating an example of a user authentication process in the device. In step S511, as illustrated in FIG. 41, when the user A brings his or her IC card 260 close to the short-range communication unit 220 of the MFP 200, the acceptance unit 56 of the MFP 200 accepts the authentication request of the user A (individual user) with the short-range wireless communication such as NFC. The authentication request includes authentication information including the user ID and password of the user A. Instead of the IC card 260 the user A may use an authentication terminal such as a smartphone in which authentication information (user ID and password) is stored. As the short-range wireless communication, for example, Bluetooth, millimeter-wave wireless communication, QR code, visible light, environmental sound, ultrasonic wave, or the like may be used. The user ID is an example of user identification information for identifying the user. The authentication request accepted by the acceptance unit 56 is an example of communication data transmitted and received by the short-range wireless communication.

In step S512, when the acceptance unit 56 accepts the authentication request, the data exchange unit 51*a* of the MFP 200 transmits the authentication information included in the authentication request and the device ID for identifying the MFP 200 to the authentication server 70*a*. Thereby, the data exchange unit 71*a* of authentication server 70*a* receives the authentication information and the device ID transmitted from the MFP 200.

In step S513, the authentication unit 72*a* of the authentication server 70*a* authenticates the user A using the authentication information and the device ID received by the data exchange unit 71*a*. Specifically, the storage/reading unit 79*a* searches for a combination of the user ID, password, and device ID in the authentication information management DB 7001*a* (refer to FIG. 42) matching the combination of the user ID, password, and device ID included in the authentication information received in step S512. When there is a match with the combination of the user ID, password, and device ID in the authentication information management DB 7001a, the authentication unit 72a determines that the user A who has sent the authentication request is an authorized user. When there is no match, the authentication unit 72a determines that the user A is not an authorized user. When the authentication unit 72a determines that the user A is not an authorized user, the data exchange unit 71a sends to the MFP 200 a notification indicating that the user A is not an authorized user. In the following description, it is assumed that the user A is determined to be an authorized user.

In step S514, the data exchange unit 71a transmits the authentication result to the MFP 200. Thereby, the data exchange unit 51 of the MFP 200 receives the authentication result. In step S515, the determination unit 55 of the MFP 200 identifies the user ID of the authenticated user A based on the authentication result. The processing of steps S511 to S515 corresponds to the processing of identifying the user of the device 50 illustrated in the processing of step S11 of FIG. 15 or step S311 of FIG. 22. Then, in step S516, the device event execution unit 52 of the MFP 200 executes the device event such as copying, printing, or scanning, as illustrated in step S12 in FIG. 15. Thereby, the MFP 200 can handle device event data generated by the executed device event as the personal information of user A. The remote device management system 1 can identify to which user the generated device information belongs as the personal information, by generating the device information including the device event data and the user information by the device information generation unit 53 of the MFP 200.

In step S511, the user A may input the authentication information (user ID and password) to the operation panel 240b of MFP 200 and issue the authentication request. In this case, when the user A inputs the authentication information to the operation panel 240b, the acceptance unit 56 of the MFP 200 accepts the authentication request of user A (individual user). The authentication information used for user authentication is not limited to the user ID and password but may be a keyword or the like. In this case, when the user A inputs the keyword to the operation panel 240b, the acceptance unit 56 of the MFP 200 accepts the authentication request of user A (individual user), and the data exchange unit 51 transmits the authentication information including the input keyword to the authentication server 70a. Then, the authentication unit 72a of the authentication server 70a authenticates the user A using the keyword included in the authentication information received by the data exchange unit 71a and the keyword stored in the authentication information management table.

Note that, in FIG. 41 to FIG. 43, an example in which the device 50 is the MFP 200 has been described. However, alternatively other devices 50 such as the electronic whiteboard 300, the video conference terminal 400, the projector 500, the mediating device 600, or the PC 700 may also have a configuration in which the device event data generated by performing the same user authentication process is treated as the personal information.

Figure 44:
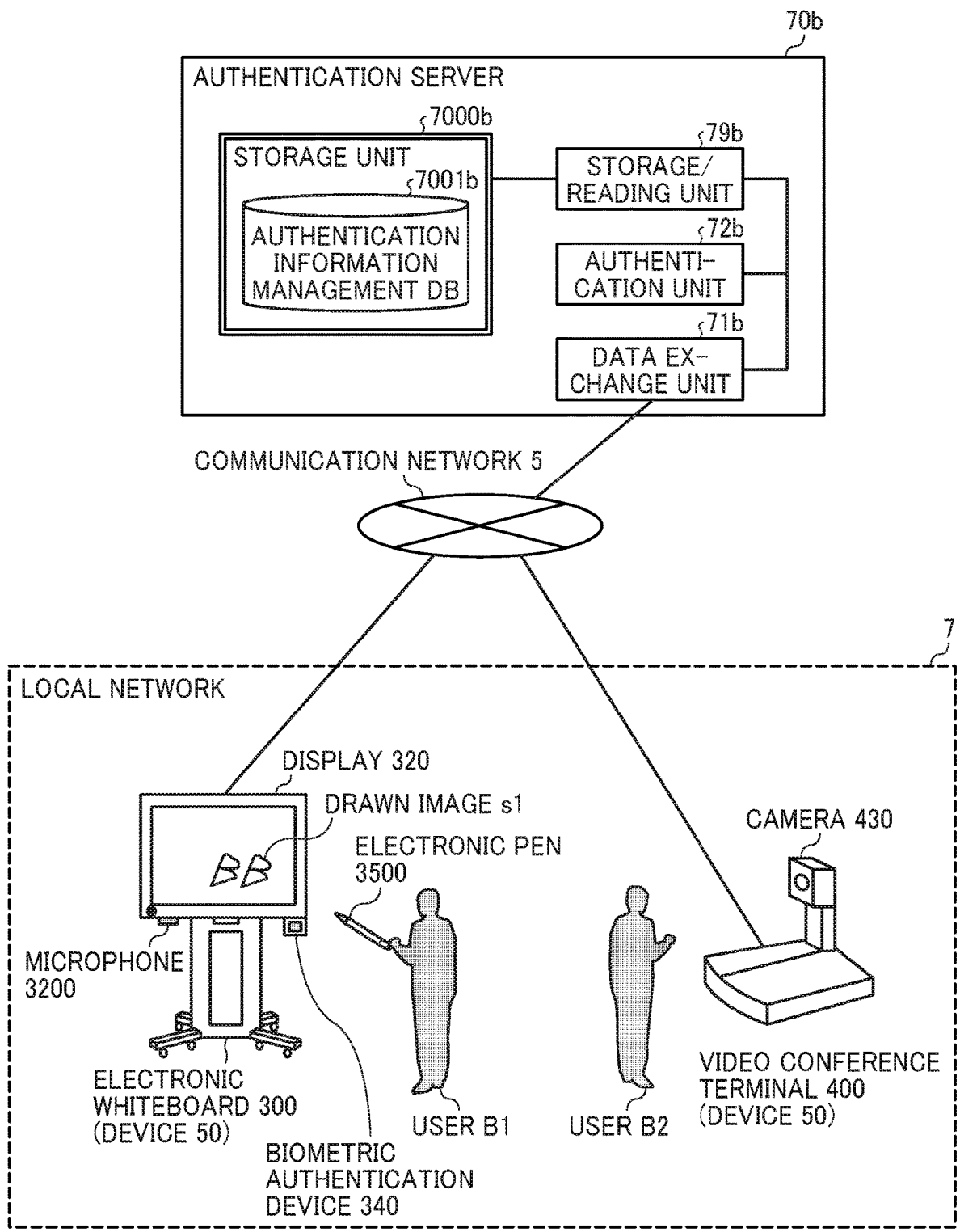
FIG. 44 is a conceptual diagram illustrating another example of the user using the device.

A description is now given of a user authentication process using biometric with reference to FIG. 44. FIG. 44 is a conceptual diagram illustrating another example of the user using the device. The processing between the device 50 and the authentication server 70b is the same as the processing illustrated in FIG. 43.

As illustrated in FIG. 44, the electronic whiteboard 300 and the video conference terminal 400, which are examples of the device 50, are communicably connected to the authentication server 70b through the communication network 5. The electronic whiteboard 300 or the video conference terminal 400 accepts input of biometric information on the living body of the user B1 or the user B2, respectively. The authentication server 70b executes the user authentication process using the authentication information stored in an authentication information management DB 7001b and biometric information of the user received by the data exchange unit 71b. The authentication information management DB unit 71b stores an authentication information management table storing the biometric information for each user associated with each user ID (an example of user identification information), instead of the authentication information management table illustrated in FIG. 43.

The electronic whiteboard 300 receives, for example, a drawn image s1 in which the user B1 drew on the display 320 using the electronic pen 3500, as the biometric information of the user B1. The drawn image s1 includes a keyword, a symbol, a signature including the name of the user, or the like set in advance for each user. The drawn image s1 is an example of drawing data. In this case, when the user B1 draws the keyword or the like on the display 320, the acceptance unit 56 of the electronic whiteboard 300 accepts the authentication request of the user B1 (individual user), and the data exchange unit 51 transmits the authentication information including the drawn image s1 to the authentication server 70b. Then, the authentication unit 72b of the authentication server 70b uses the drawn image s1 included in the authentication information received by the data exchange unit 71b and the biometric information for each user stored in the authentication information management table to execute authentication of the user B1. Accordingly, the electronic whiteboard 300, which is an example of the device 50, can authenticate the user B1 who drew the drawn image s1 using the biometric information such as the content or the handwriting illustrated in the drawn image s1 and identify the user ID associated with the user B1.

The electronic whiteboard 300 receives, for example, a fingerprint of the user B1 input by the user B1 to a biometric authentication device 340 as the biometric information of the user B1. In this case, when the fingerprint of the user B1 is optically read by the biometric authentication device 340, the acceptance unit 56 of the electronic whiteboard 300 accepts the authentication request of the user B1 (individual user), and the data exchange unit 51 transmits the authentication information including fingerprint image data of the fingerprint of the user B1 read by the biometric authentication device 340 to the authentication server 70b. Then, the authentication unit 72b of the authentication server 70b uses the fingerprint image data included in the authentication information received by the data exchange unit 71b and the biometric information for each user stored in the authentication information management table to execute authentication of the user B1. Accordingly, the electronic whiteboard 300, which is an example of the device 50, can authenticate the user B1 using the biometric information such as the fingerprint indicated by the fingerprint image data read by the biometric authentication device 340 and identify the user ID of the user B1.

Further, the electronic whiteboard 300 receives, for example, a user voice B1 picked up by the microphone 3200 as the biometric information of the user B1 In this case, when the voice of the user B1 is picked up by the microphone 3200, the acceptance unit 56 of the electronic whiteboard 300 accepts the authentication request of the user B1 (individual user), and the data exchange unit 51 transmits the authentication information including audio data relating to the voice collected by the microphone 3200 to the authentication server 70b. Then, the authentication unit 72b of the authentication server 70b authenticates the user B1 using the audio data included in the authentication information received by the data exchange unit 71b and the biometric information for each user stored in the authentication information management table. Thereby, the electronic whiteboard 300, which is an example of the device 50, uses biometric information such as a voiceprint given by the audio data of the voice collected by the microphone 3200 to authenticate the user B1 who has used the voice and identify the user ID of the user B1.

In addition, the video conference terminal 400 receives, for example, a captured image including an image of the face of the user B2 captured by the camera 430 as the biometric information of the user B2. In this case, when the captured image including the face of the user B2 is acquired by the camera 430, the acceptance unit 56 of the video conference terminal 400 accepts the authentication request of the user B2 (individual user), and the data exchange unit 51 transmits the authentication information including the captured image data obtained by the camera 430 to the authentication server 70b. Then, the authentication unit 72b of the authentication server 70b uses the facial image of the user B2 indicated in the captured image data included in the authentication information received by the data exchange unit 71b and the biometric information of each user stored in the authentication information management table to execute the authentication process for the user B2. Thereby, the video conference terminal 400, which is an example of the device 50, can authenticate the user B2 by facial recognition processing using the biometric information such as the facial image included in the captured image data, and identify the user ID of the user B2.

Furthermore, the video conference terminal 400 receives, for example, a captured image (captured moving image) including motion information indicating the motion (gesture) of the user B2 captured by the camera 430 as the biometric information of the user B2. In this case, when the captured image (captured video) is acquired by the camera 430, the acceptance unit 56 of the video conference terminal 400 accepts an authentication request of the user B2 (individual user), and the data exchange unit 51 transmits the authentication information including the captured image data obtained by the camera 430 to the authentication server 70b. Then, the authentication unit 72b of the authentication server 70b executes motion analysis using motion information indicated in the captured image data included in the authentication information received by the data exchange unit 71b and the biometric information for each user stored in the authentication information management table, to execute the authentication of the user B2. Thereby, the video conference terminal 400, which is an example of the device 50, uses the biometric information such as the motion information included in the captured image data to authenticate the user B2 who has performed the motion (gesture) related to the motion information and to identify the user ID of the user B2.

As described above, the device 50 can identify the user who uses the device 50 by performing authentication using various biometric information and treat the device event data generated by the executed device event as the personal information of the authenticated user A.

In FIG. 44, an example in which the device 50 is the electronic whiteboard 300 or the video conference terminal 400 has been described. Alternatively, other devices 50 such as the MFP 200, the projector 500, the mediating device 600, or the PC 700 may be configured to perform the same user authentication process using the same biometric information.

Figure 45:
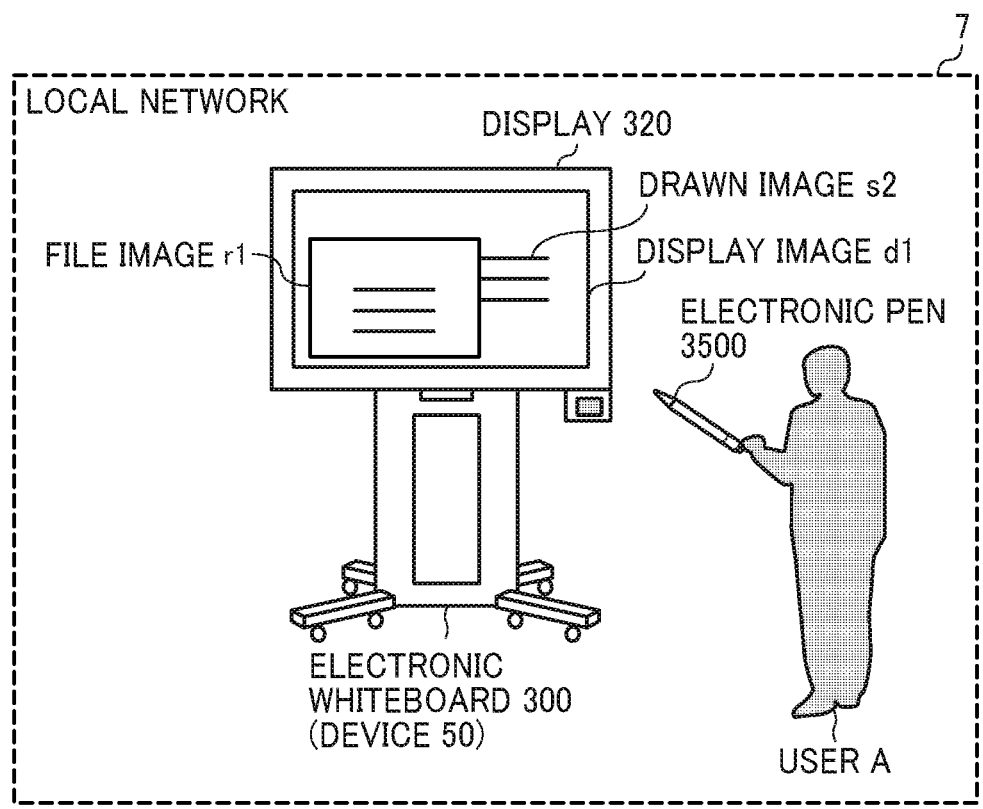
FIG. 45 is a conceptual diagram illustrating an example of the user using the electronic whiteboard.

A description is now given of the device information generated by the electronic whiteboard 300 as an example of the device 50 with reference to FIG. 45 and FIG. 46. FIG. 45 is a conceptual diagram illustrating the user using the electronic whiteboard. As illustrated in FIG. 45, the electronic whiteboard 300 displays a drawn image s2 in which the user A drew on the display 320 using the electronic pen 3500, and a display image d1 including a file image r1 of a material file on the display 320. The device event executed by the electronic whiteboard 300 is, for example, an event such as a conference using the display 320. The device event execution unit 52 of the electronic whiteboard 300 acquires the image data of the display image d1 including the drawn image s2 drawn on the display 320 and the file image r1 displayed on the display 320 as the device event data generated by the device event.

FIG. 46 is a diagram illustrating an example of the device information generated by the electronic whiteboard. The device information illustrated in FIG. 46 is different from the device information generated by the MFP 200 illustrated in FIG. 18 and includes the image data ("XXX.pdf" and "xxx.pdf") displayed on the display 320 as the event history information. The image data is treated as the personal information of the user A (user ID; "BBB0001"). Therefore, in the image data included in the device information illustrated in FIG. 46, the personal flag is "SET" and "IWB45-5678; BBB0001" is associated as the user information. Thus, the electronic whiteboard 300 can treat the image data displayed on the display 320, which is the device event data generated by the executed device event, as the personal information of the user A.

Figure 47:
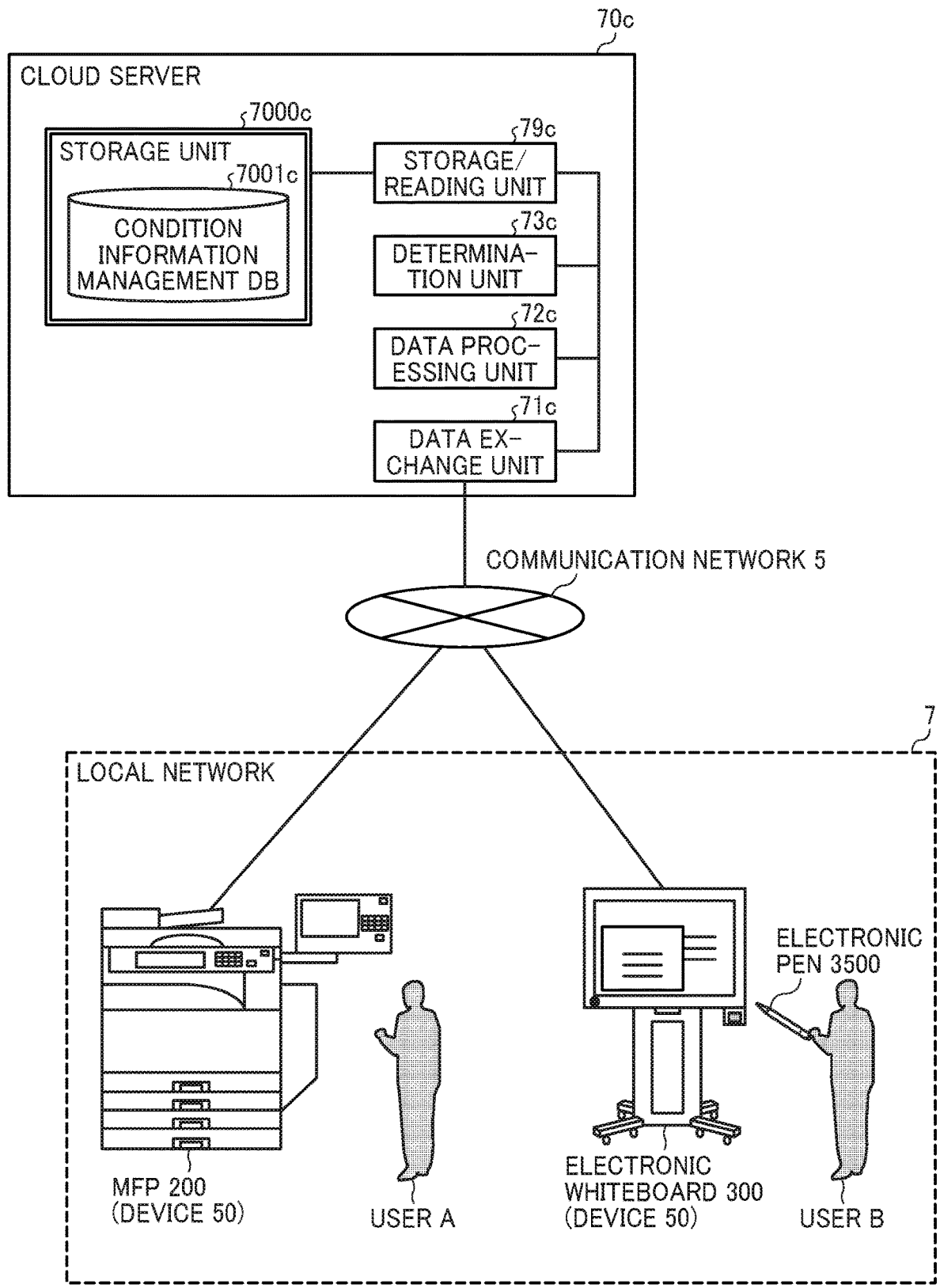
FIG. 47 is a conceptual diagram illustrating an example of a cloud server having a character recognition function being used.
Figure 48:
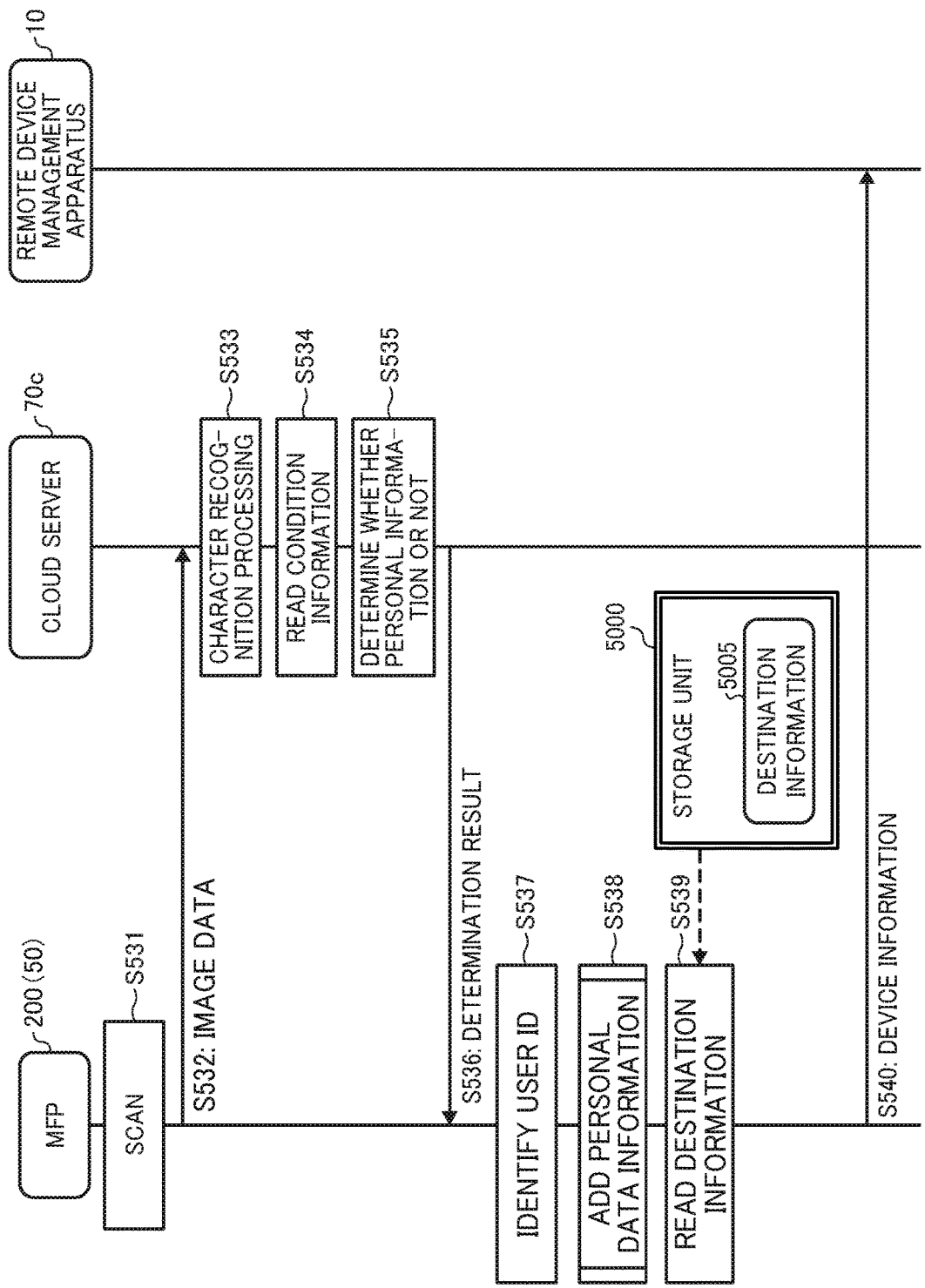
FIG. 48 is a sequence diagram illustrating an example of an identification process of the personal information in the cloud server.

A description is now given of a process of generating the device information by a character recognition process using the cloud server 70c with reference to FIG. 47 to FIG. 49. Note that FIG. 47 and FIG. 49 are described on the assumption that the user authentication illustrated in FIG. 42 to FIG. 44 has been performed in advance. FIG. 47 is a conceptual diagram illustrating the cloud server having a character recognition function being used. As illustrated in FIG. 47, the MFP 200 and the electronic whiteboard 300, which are examples of the device 50, are communicably connected to the cloud server 70c through the communication network 5. The user A performs, for example, scan processing of a document using the MFP 200, and the MFP 200 transmits the processed image data to the cloud server 70c. Further, the user B performs drawing or the like using the electronic pen 3500 on the display 320 of the electronic whiteboard 300, for example, and the electronic whiteboard 300 transmits image data such as a drawn image to the cloud server 70c.

The cloud server 70c is a server computer connected to the communication network 5 and executes an analysis process on image data. The cloud server 70c has the same hardware configuration as the computer illustrated in FIG. 4 and includes an optical character recognition (OCR) module and performs OCR processing of the image data transmitted from the device 50.

Functions executed by the cloud server 70c include a data exchange unit 71c, a data processing unit 72c, a determination unit 73c, and a storage/reading unit 79c. These units are functions implemented by or caused to function by operating any of the elements illustrated in FIG. 47 in cooperation with the instructions of the CPU 101 of the cloud server 70c according to the control program expanded from the HD 104 of the cloud server 70c to the RAM 103 of the cloud server 70c. The cloud server 70c has a storage unit 7000c implemented by the HD 104 or the like of the cloud server 70c illustrated in FIG. 4.

The data exchange unit 71c is implemented by a command from the CPU 101 of the cloud server 70c and the network I/F 109 of the cloud server 70c illustrated in FIG. 4, and exchanges data (information) with another device, apparatus, or terminal through the communication network 5. The data exchange unit 71c receives, for example, the image data transmitted from the device 50 and transmits the determination result by the determination unit 73c to the device 50.

The data processing unit 72c is implemented by a command from the CPU 101 of the cloud server 70c illustrated in FIG. 4 and executes processing on image data transmitted from the device 50. The data processing unit 72c performs OCR processing of the image data transmitted from the device 50, for example.

The determination unit 73c is a function implemented by a command from the CPU 101 of the cloud server 70c illustrated in FIG. 4 and determines whether the image data transmitted from the device 50 is the personal information. The determination unit 73c, for example, uses the processing data subjected to the character recognition (OCR) processing by the data processing unit 72c and condition information stored in a condition information management DB 7001c to determine whether the image data corresponding to the processing data is the personal information. The determination unit 73c determines that the image data corresponding to the processing data is the personal information when the character string included in the processing data includes characters, numbers, symbols, and the like corresponding to the information included in the condition information.

The storage/reading unit 79c is implemented by a command from the CPU 101 of the cloud server 70c illustrated in FIG. 4 and has a function of storing various data in the storage unit 7000c and reading various data from the storage unit 7000c. In the storage unit 7000c, the condition information management DB 7001c storing the condition information indicating conditions for determining the presence or absence of the personal information is stored. The condition information stored in the condition information management DB 7001c is information including characters, signs, and the like that frequently appear in data treated as the personal information, including characters, numbers, special symbols, bar codes, and the like representing a person's name, telephone number, address, and the like.

FIG. 48 is a sequence diagram illustrating an example of an identification process of the personal information in the cloud server. Note that FIG. 48 illustrates a case where the device 50 is the MFP 200, but the same processing may be performed by other devices 50 such as the electronic whiteboard 300, the mediating device 600, or the PC 700.

In step S531, the device event execution unit 52 of the MFP 200 scans a document as the device event. The device event execution unit 52 acquires the scanned image data as the device event data. In step S532, the data exchange unit 51 of the MFP 200 transmits the image data acquired by the device event execution unit 52 to the cloud server 70c. Thereby, the data exchange unit 71c of the cloud server 70c receives the image data transmitted from the MFP 200.

In step S533, the data processing unit 72c of the cloud server 70c performs the character recognition processing on the image data received by the data exchange unit 71c The data processing unit 72c acquires the data processed by the character recognition processing. In step S534, the storage/reading unit 79c of the cloud server 70c reads the condition information stored in the condition information management DB 7001c. In step S535, the determination unit 73c of the cloud server 70c uses the processing data processed in step S533 and the condition information read in step S534 to determine whether the image data received in step S522 is the personal information. Specifically, when the character string included in the processing data related to the image data includes the character, the number, the sign, or the like corresponding to the information included in the condition information, the determination unit 73c determines that the image data is the personal information. On the other hand, when the character string included in the processing data related to the image data does not include the character, the number, the sign, and the like corresponding to the information included in the condition information, the determination unit 73c determines that the image data is not the personal information.

In step S536, the data exchange unit 71c of the cloud server 70c transmits a determination result by the determination unit 73c to the MFP 200. Thereby, the data exchange unit 51 of the MFP 200 receives the determination result transmitted from the cloud server 70c. In step S537, the determination unit 55 of the MFP 200 identifies the user ID of the user to whom the image data acquired by the device event execution unit 52 as the personal information belongs to, based on the determination result received in step S536. In this case, the determination unit 55 identifies the user ID of the user authenticated by the user authentication process illustrated in FIG. 41 to FIG. 44.

In step S538, the device information generation unit 53 of the MFP 200 adds the personal data information to the device event data including the image data acquired in step S531. The details of the personal data information adding process are the same as the process illustrated in FIG. 17. In this case, the device information generation unit 53 adds personal data information to the image data determined to be the personal information by the cloud server 70c. In step S539, the storage/reading unit 59 of the MFP 200 reads the destination information 5005 of the remote device management apparatus 10 stored in the storage unit 5000. Then, in step S540, the data exchange unit 51 of the MFP 200 transmits the device information generated in step S538 to the remote device management apparatus 10 indicated by the destination information 5005 read in step S539.

FIG. 49 is a diagram illustrating an example of the device information including the personal information identified by the character recognition process. The device information illustrated in FIG. 49 is different from the device information illustrated in FIG. 18 in that image data ("YYY.pdf" and "AAA.pdf") acquired as the event history information by the scan process or the like by the MFP 200 is included. The image data ("YYY.pdr") determined to be the personal information by the determination unit 73c of the cloud server 70c is treated as, for example, the personal information of the user A (user ID; "AAA0001"). Therefore, the image data of "YYY.pdf" has the personal flag "SET" and is associated with "MP30-1234; AAA0001" as the user information. On the other hand, the image data ("AAA.pdf") determined not to be the personal information by the determination unit 73c of the cloud server 70c is not treated as the personal information. Therefore, the personal data information is not added to the image data of "AAA.pdf". Thereby, the device 50 such as the MFP 200 or the electronic whiteboard 300 can treat the image data including the personal information as the personal information of the user A among the image data which is the device event data generated by the executed device event.

Figure 50:
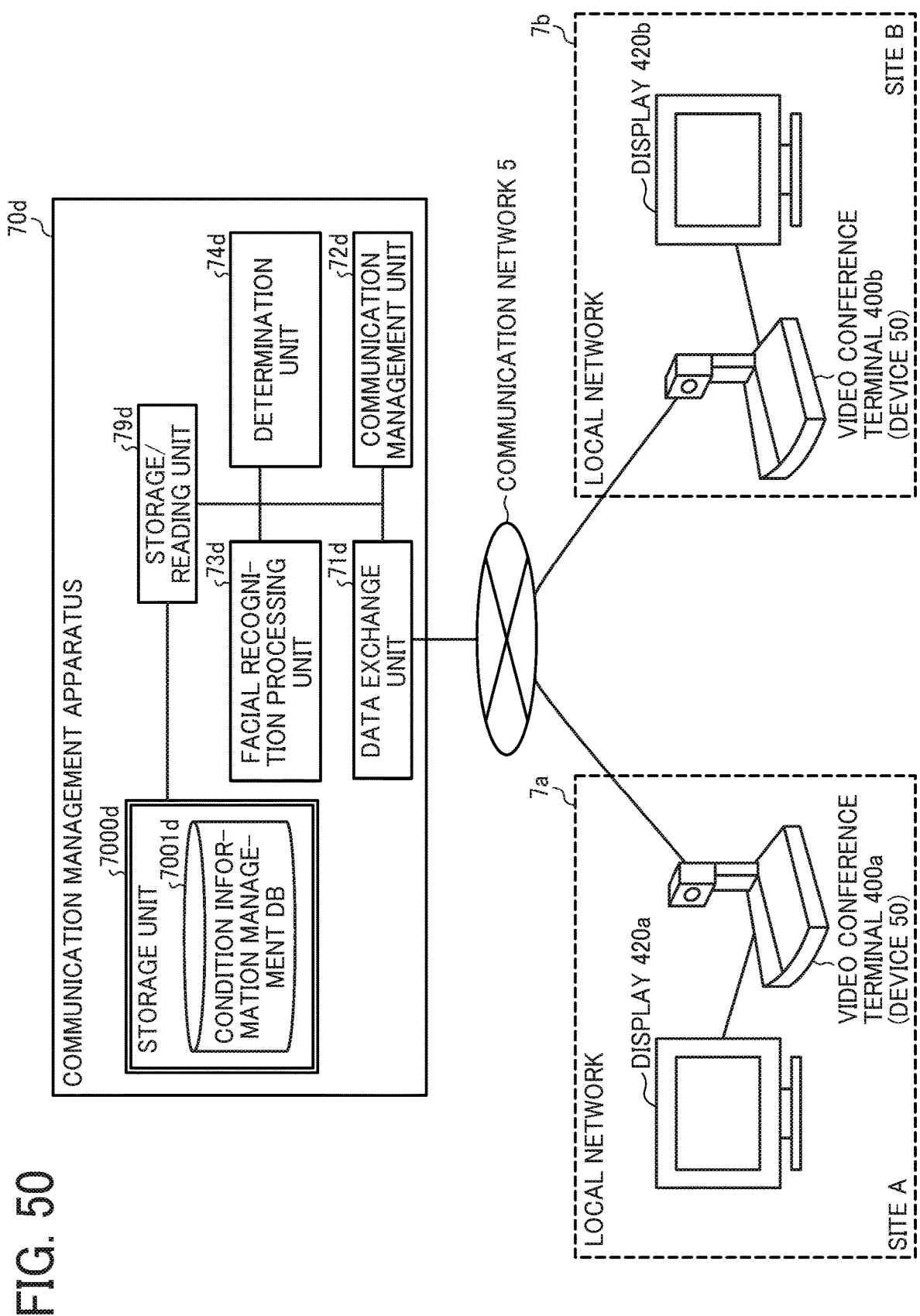
FIG. 50 is a conceptual diagram illustrating an example of the user using the video conference terminal.
Figure 51:
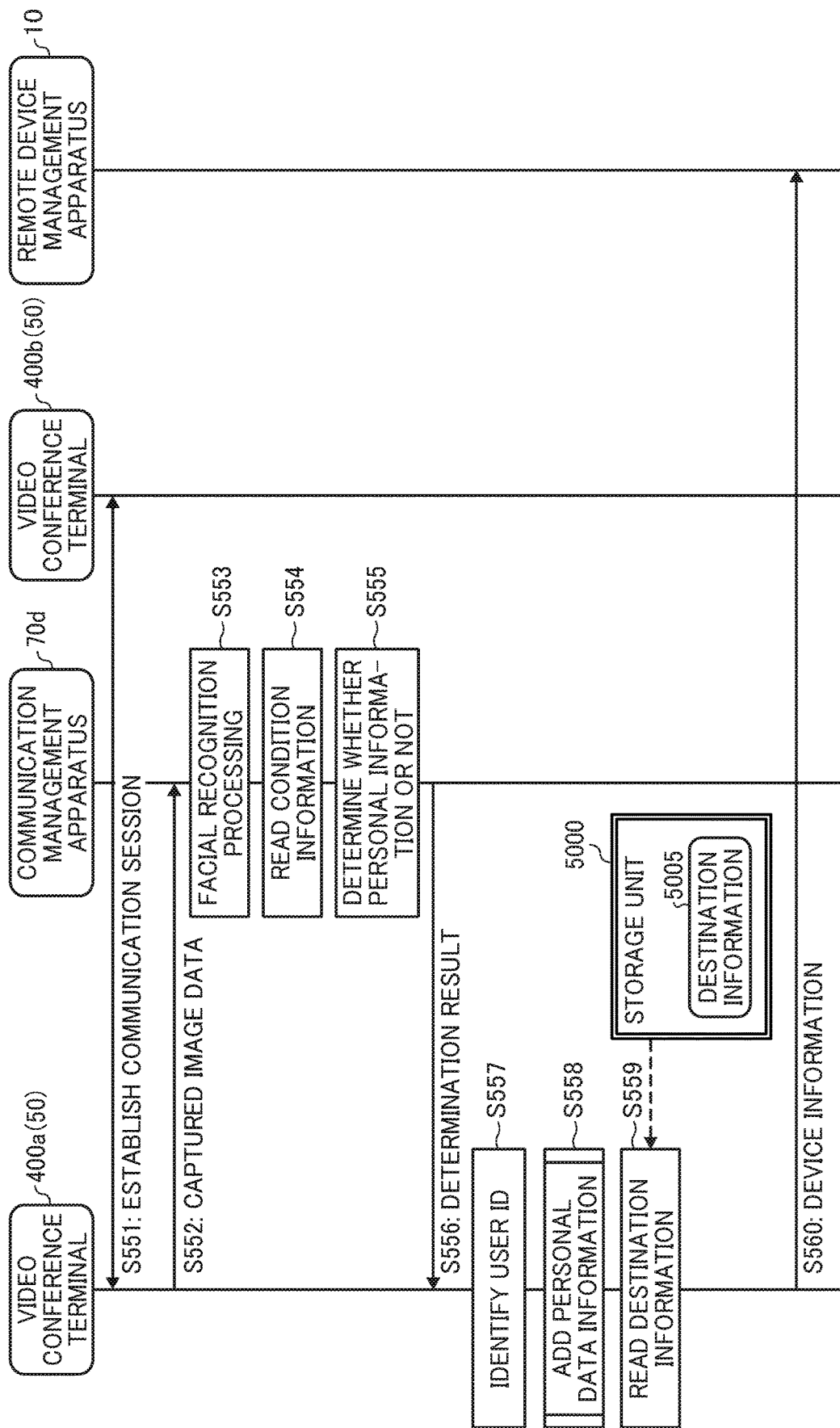
FIG. 51 is a sequence diagram illustrating an example of a process of identifying the personal information in a communication management apparatus.

A description is now given of a process in a case where captured image data generated by a video conference performed using the video conference terminal 400 is treated as the personal information, with reference to FIG. 50 to FIG. 52. FIG. 50 is a conceptual diagram illustrating the user using the video conference terminal. FIG. 50 illustrates a data provision system for transmitting content data in one direction from a video conference terminal 400*a*, which is an example of the device 50 located at the site A, to a video conference terminal 400*b*, which is an example of the device 50 located at the site B, or a communication system for transmitting content data between the video conference terminal 400*a* and the video conference terminal 400*b* in both directions. The communication system is, for example, a video conference system, a videophone system, a chat system, and the like. Note that "video conference" is used synonymously with "teleconference". The video conference terminal 400*a*, for example, transmits the captured image data displayed on a display 420*a* connected to the video conference terminal 400*a* to the video conference terminal 400*b* through the communication network 5, and the transmitted captured image data is displayed on a display 420*b* connected to the video conference terminal 400*b*.

The communication management apparatus 70*d* is a server computer that executes login authentication of the video conference terminal 400, management of communication by the video conference terminal 400, and the like. The communication management apparatus 70*d* establishes a communication session between the plurality of video conference terminals 400 through the communication network 5. The video conference terminal 400*a* and the video conference terminal 400*b* transmit and receive content data (captured image data) using the communication session established by the communication management apparatus 70*d*. The communication management apparatus 70*d* has the same hardware configuration as the computer illustrated in FIG. 4.

Functions executed by the communication management apparatus 70*d* include a data exchange unit 71*d*, a communication management unit 72*d*, a facial recognition processing unit 73*d*, a determination unit 74*d*, and a storage/reading unit 79*d*. These units are functions implemented by or caused to function by operating any of the elements illustrated in FIG. 50 in cooperation with the instructions of the CPU 101 of the communication management apparatus 70*d* according to the control program expanded from the HD 104 of the communication management apparatus 70*d* to the RAM 103 of the communication management apparatus 70*d*. The communication management apparatus 70*d* has a storage unit 7000*d* implemented by the HD 104 and the like of the communication management apparatus 70*d* illustrated in FIG. 4.

The data exchange unit 71*d* is implemented by a command from the CPU 101 of the communication management apparatus 70*d* and the network I/F 109 of the communication management apparatus 70*d* illustrated in FIG. 4, and exchanges data (information) with another device, apparatus, or terminal through the communication network 5. The data exchange unit 71*d* transmits the captured image data transmitted from the device 50 to another device 50, for example, using the communication session established by the communication management unit 72*d*.

The communication management unit 72*d* is implemented by a command from the CPU 101 of the communication management apparatus 70*d* illustrated in FIG. 4 and has a function of managing communication between a plurality of the video conference terminals 400. The communication management unit 72*d* executes, for example, login authentication of the user using the video conference terminal 400 or the video conference terminal 400 and establishes a communication session between the plurality of the video conference terminals 400.

The facial recognition processing unit 73*d* is implemented by a command from the CPU 101 of the communication management apparatus 70*d* illustrated in FIG. 4 and has a function of executing facial recognition processing on the captured image data transmitted from the device 50. The facial recognition processing unit 73*d* extracts an image of a person's face, for example, by using the captured image data transmitted from the device 50.

The determination unit 74*d* is a function implemented by a command from the CPU 101 of the communication management apparatus 70*d* illustrated in FIG. 4 and determines whether the image data transmitted from the video conference terminal 400 is the personal information. The determination unit 74*d*, for example, uses the processing data subjected to the facial recognition processing by the facial recognition processing unit 73*d* and condition information stored in a condition information management DB 7001*d* to determine whether the captured image data corresponding to the processing data is the personal information. When the facial image recognized by the facial recognition processing corresponds to a feature amount included in the condition information, the determination unit 74*d* determines that the captured image data corresponding to the processing data is the personal information.

The storage/reading unit 79*d* is implemented by a command from the CPU 101 of the communication management apparatus 70*d* illustrated in FIG. 4 and has a function of storing various data in the storage unit 7000*d* and reading various data from the storage unit 7000*d*. In the storage unit 7000*d*, a condition information management DB 7001*d* in which condition information indicating conditions for determining the presence or absence of the personal information is stored. The condition information stored in the condition information management DB 7001*d* is information used when a process (face matching process) of matching a person's face included in the facial recognition processed data is executed. The condition information is associated with the feature amount for identifying the person's face included in the image data and the user ID for identifying an individual user.

FIG. 51 is a sequence diagram illustrating an example of a process of identifying the personal information in the communication management apparatus. In step S551, the video conference terminal 400*a* and the video conference terminal 400*b* establish the communication session by the processing of the communication management unit 72*d* of the communication management apparatus 70*d*. Then, the device event execution unit 52 of the video conference terminal 400*a* starts the video conference which is the device event. In step S552, the data exchange unit 51 of the video conference terminal 400*a* transmits the captured image data generated by the video conference as the device event to the communication management apparatus 70*d*. Thereby, the data exchange unit 71*d* of the communication management apparatus 70*d* receives the captured image data transmitted from the video conference terminal 400*a*.

In step S553, the facial recognition processing unit 73*d* of the communication management apparatus 70*d* executes the facial recognition processing on the captured image data received by the data exchange unit 71*d*. Then, the facial recognition processing unit 73*d* acquires the data processed by the facial recognition processing. In step S554, the storage/reading unit 79*d* of the communication management apparatus 70*d* reads the condition information stored in the condition information management DB 7001d. In step S555, the determination unit 74d of the communication management apparatus 70d uses the processing data processed in step S553 and the condition information read in step S554 and determines whether the image data received in step S552 is the personal information. Specifically, when the facial image included in the processing data related to the captured image data corresponds to the feature amount included in the condition information, the determination unit 74d determines that the captured image data is the personal information of the individual user indicated by the user ID associated with the corresponding feature amount. On the other hand, when the facial image included in the processing data related to the captured image data does not correspond to the feature amount included in the condition information, the determination unit 74d determines that the captured image data is not the personal information.

In step S556, the data exchange unit 71d of the communication management apparatus 70d transmits the determination result by the determination unit 74d to the video conference terminal 400a. The determination result transmitted from the communication management apparatus 70d includes the user ID associated with the feature amount determined to be corresponding by the determination unit 74d. Thereby, the data exchange unit 51a of the video conference terminal 400a receives the determination result transmitted from the communication management apparatus 70d. In step S557, the determination unit 55a of the video conference terminal 400a determines the user ID included in the determination result received in step S556, as the user ID of the user who treats the captured image data acquired by the device event execution unit 52 as the personal information.

In step S558, the device information generation unit 53a of the video conference terminal 400a adds the personal data information to the device event data including the captured image data acquired in step S551. The details of the personal data information adding process are the same as the process illustrated in FIG. 17. In this case, the device information generation unit 53a adds the personal data information to the captured image data determined to be the personal information by the communication management apparatus 70d. In step S559, the storage/reading unit 59a of the video conference terminal 400a reads the destination information 5005a of the remote device management apparatus 10 stored in the storage unit 5000a. Then, in step S560, the data exchange unit 51a of the video conference terminal 400a transmits the device information generated in step S558 to the remote device management apparatus 10 indicated by the destination information 5005a read in step S559.

FIG. 52 is a diagram illustrating an example of the device information including the personal information identified by the facial recognition process. The device information illustrated in FIG. 52 is different from the device information illustrated in FIG. 18 and includes captured image data ("BBB.jpg" and "CCC.jpg") transmitted from the video conference terminal 400a as the event history information. The captured image data ("CCC.jpg") determined to be the personal information by the determination unit 74d of the communication management apparatus 70d is treated as, for example, the personal information of the user A (user ID; "CCC0001"). Therefore, the image data of "CCC.jpg" has the personal flag "SET" and is associated with "UCS60-4321; CCC0001" as the user information. On the other hand, captured image data ("BBB.jpg") determined by the determination unit 74d of the communication management apparatus 70d to be not the personal information is not treated as the personal information. Therefore, personal data information is not added to the captured image data of "BBB.jpg". As a result, the video conference terminal 400 can treat the image data including the user's facial image as the personal information of the user associated with the facial image among the captured image data which is device event data generated by the executed device event.

In FIG. 50 to FIG. 52, the process of identifying the personal information by the facial recognition processing of the image data transmitted from the video conference terminal 400 using the communication management apparatus 70d is described. Alternatively, the video conference terminal 400 may also be configured to identify the personal information by performing the character recognition processing (refer to FIGS. 47 to 49).

Figure 53:
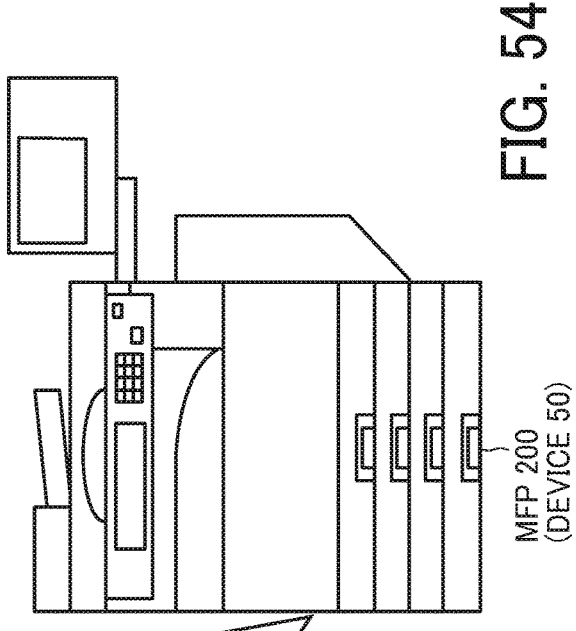
FIG. 53 is a conceptual diagram illustrating an example of the device having a plurality of storage areas.
Figure 54:
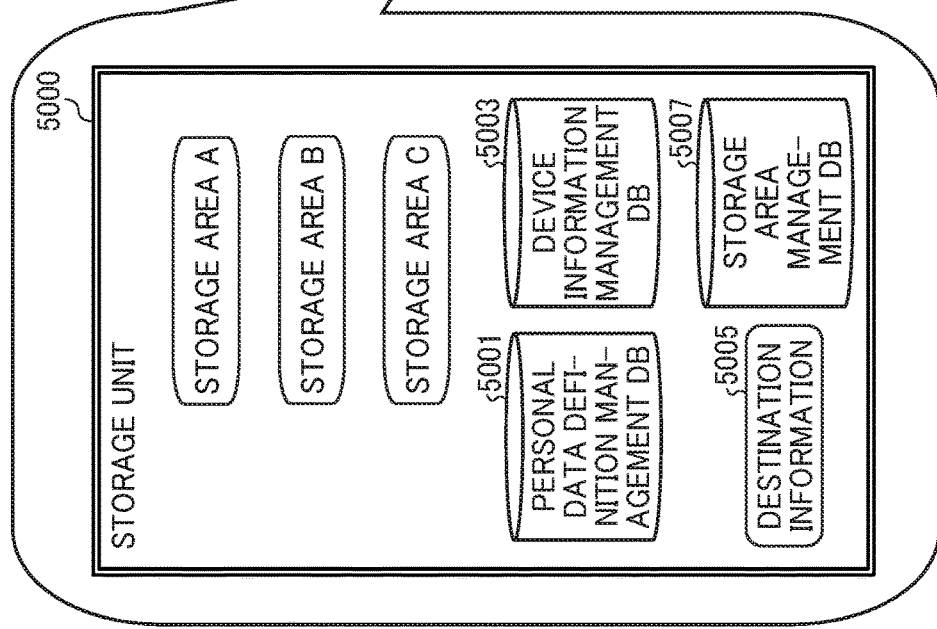
FIG. 54 is a conceptual diagram illustrating an example of a storage area management table.
Figure 55:
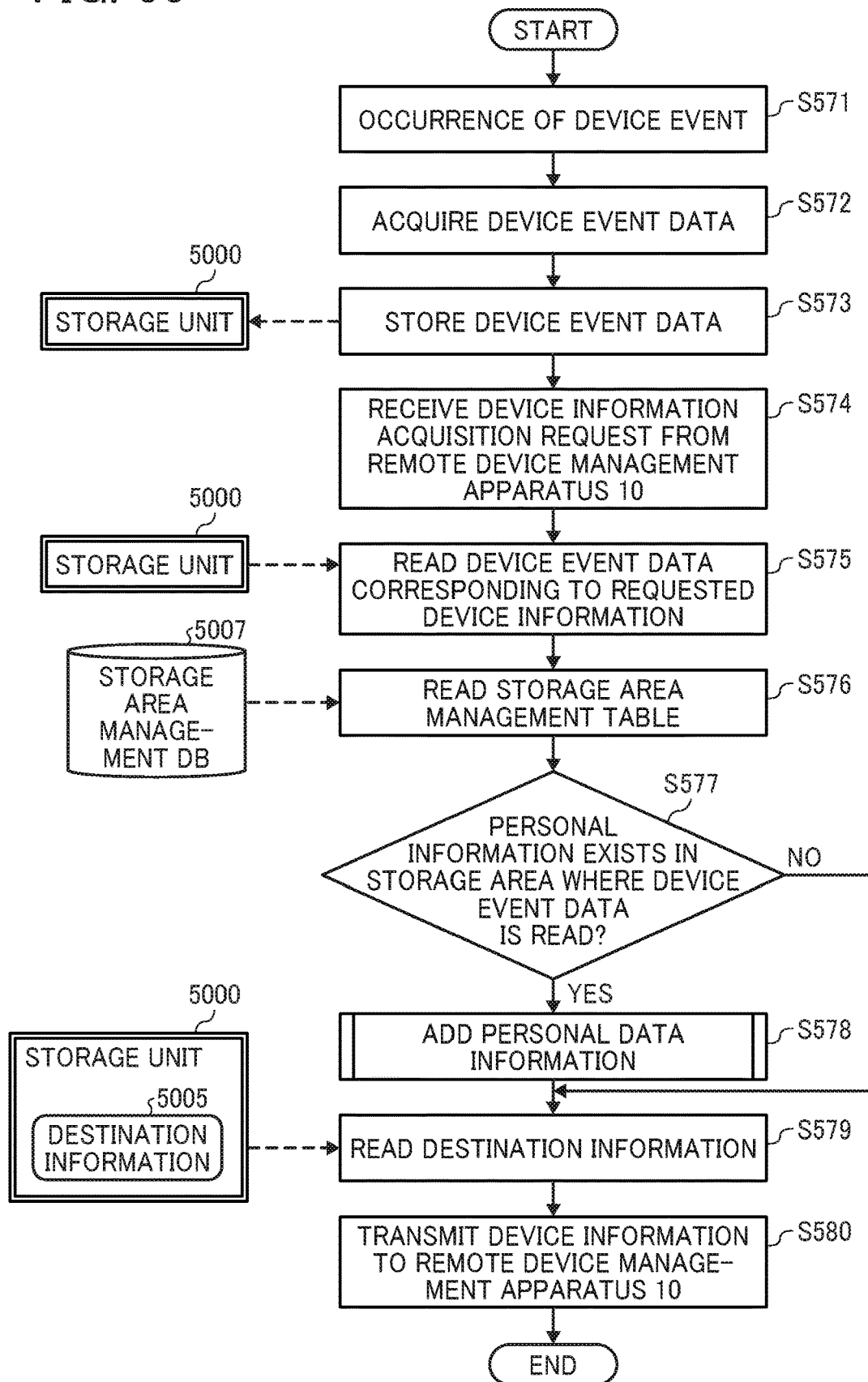
FIG. 55 is a flowchart illustrating an example of a process of providing the personal data information according to the storage area in which device event data is stored.

A description is now given of a process for identifying whether the information stored in the storage area is the personal information in accordance with the storage area in the device 50 where the device event data is stored, with reference to FIG. 53 to FIG. 55. In the following description, an example in which the device 50 is the MFP 200 is described, but the same configuration or processing is performed in other devices. FIG. 53 is a conceptual diagram illustrating an example of the device having a plurality of storage areas. As illustrated in FIG. 53, storage unit 5000 of MFP 200 has a plurality of storage areas (storage area A, storage area B, storage area C) in addition to the configuration illustrated in FIG. 9. The information stored in each of the plurality of storage areas is designated by a setting in advance. Further, a storage area management DB (refer to FIG. 54) is stored in the storage unit of MFP 200.

FIG. 54 is a conceptual diagram illustrating an example of a storage area management table. In the storage unit 5000, a storage area management DB 5007 storing the storage area management table as illustrated in FIG. 54 is stored. In the storage area management table, information indicating whether information to be treated as the personal information is stored is managed for each storage area of the storage unit 5000. In the example of the storage area management table illustrated in FIG. 54, the personal information is not stored in the storage areas A and B and the personal information is stored in the storage area C.

FIG. 55 is a flowchart illustrating an example of a process of providing the personal data information according to the storage area in which the device event data is stored. In step S571, the device event execution unit 52 of the WP 200 executes the device event according to a user operation or the like on the MFP 200. In this example, the device event execution unit 52 executes printing with the printer controller 232 illustrated in FIG. 5 or scanning with the scanner controller 231 illustrated in FIG. 5. In step S572, the device event execution unit 52 of the MFP 200 acquires device event data indicating the content of the executed device event. In step S573, the storage/reading unit 59 of MFP 200 causes the storage unit 5000 to store the device event data acquired by the device event execution unit 52. In this example, the storage/reading unit 59 stores the device event data in the storage area C of the storage unit 5000.

In step S574, the data exchange unit 51 of the MFP 200 receives a device information acquisition request from the remote device management apparatus 10 in response to a request from the system administrator of the remote device management system 1. The device information acquisition request includes, for example, identification information (for example, device information ID) for identifying the requested device information, or identification information (for example, device ID) for identifying the specific device 50 that generated the device information.

In step S575, the storage/reading unit 59 of the MFP 200 searches the storage unit 5000 using the identification information indicated in the device information acquisition request received in step S574 as a search key, thereby acquires the device event data corresponding to the requested device information. In this example, the storage/reading unit 59 reads the device event data stored in the storage area C.

In step S576, the storage/reading unit 59 of the MFP 200 reads the storage area management table stored in the storage area management DB 5007. In step S577, the determination unit 55 of the MFP 200 refers to the storage area management table read in step S576, and when the personal information exists in the storage area in which the device event data read in step S575 is stored, advances the process to step S578. On the other hand, when there is no personal information in the storage area where the device event data read in step S576 is stored, the determination unit 55 advances the process to step S579. In this example, since the storage area C in which the device event data read in step S576 is stored is the storage area of "personal information: yes" in the storage area management table, the determination unit 55 determines that the personal information exists in the storage area where the device event data is stored.

In step S578, the device information generation unit 53 of the MFP 200 executes a process of adding personal data information to the device event data read in step S576. The details of the personal data information adding process are the same as the process illustrated in FIG. 17. In step S579, the storage/reading unit 59 of the MFP 200 reads the destination information 5005 of the remote device management apparatus 10 stored in the storage unit 5000. Then, in step S580, the data exchange unit 51 of the MFP 200 transmits the device information generated in step S580 to the remote device management apparatus 10 indicated by the destination information 5005 read in step S579. Thereby, MFP 200 can determine whether to treat the device event data as the personal information in accordance with the storage area in which the device event data is stored.

As described above with reference to FIG. 41 to FIG. 55, the remote device management system 1 can set or identify the data to be treated as the personal information according to the type of the device 50. In each of the above examples, the item of data treated as the personal information may be added as the personal data definition illustrated in the personal data definition management table illustrated in FIG. 11, or aside from the personal data definition, the item of data treated as the personal information may be set in advance as a unique setting associated with the type of the device 50.

A description is now given of a modified example of the user information management table illustrated in FIG. 10. FIG. 56 is a conceptual diagram illustrating a modification of the user information management table. In the storage unit 1000 of the remote device management apparatus 10, the user information management DB 1001 storing the user information management table illustrated in FIG. 56 is stored as in FIG. 10. In the user information management table, the customer ID and the user ID as illustrated in FIG. 10 are managed for each common customer ID. The common customer ID is, for example, identification information given to identify the customer ID of a different device 50 having the same administrator with one customer ID. In the user information management table illustrated in FIG. 56, a common user ID is stored in association with a customer ID and a user ID. The common user ID is, for example, identification information for identifying a plurality of user IDs of individual users in different devices 50 with one user ID.

In the example of FIG. 56, the customer IDs "AAA" and "BBB" are associated with the common customer ID "XXX", assuming that the devices 50 corresponding to the respective customer IDs are under management of a common administrator. In addition, the individual user identified by the user ID associated with each of the customer IDs "AAA" and "BBB" uses the device 50 corresponding to each customer ID, a common user ID common to different devices 50 is associated with a different user ID for each customer ID. Thereby, the remote device management system 1 can provide added convenience when the user uses the device 50 by assigning a common customer ID and user ID among the plurality of devices 50. Even when the common customer ID or the common user ID illustrated in the user information management table illustrated in FIG. 56 is used, the remote device management system 1 executes the same processing or operation as described above.

As described above, the personal information management apparatus 30 (an example of the management apparatus) according to the embodiments of the present disclosure acquires the process history information (an example of apparatus identification information) for identifying the processing apparatus in which device event data is stored, from one or more of processing apparatuses (for example, the remote device management apparatus 10 or the device information utilization apparatus 90) that process the device event data indicating the content of the event executed by the device 50 to be managed. Then, based on the request to delete the device event data, the personal information management apparatus 30 makes a request to delete the device event data to the processing apparatus identified by the processing history information acquired by the data exchange unit 31. As a result, the personal information management apparatus 30 can identify the storage destination of the data acquired from the device based on the processing history information acquired from the processing apparatus and delete the device event data.

Further, the personal information management apparatus 30 (an example of the management apparatus) according to the embodiments of the present disclosure receives the deletion request for the device event data from the device 50 or the user terminal 60 (an example of a communication terminal) and based on the deletion request received, transmits the deletion history information indicating the deletion history of the device event data stored in the processing apparatus (for example, the remote device management apparatus 10 or the device information utilization apparatus 90) identified by the acquired processing history information (an example of apparatus identification information) to the device 50 or the user terminal 60. Thereby, the personal information management apparatus 30 can notify the user that the device event data requested to be deleted has been deleted.

The management system 2 according to the embodiments of the present disclosure includes the remote device management apparatus 10 communicably connected to the device 50 to be managed, and the personal information management apparatus 30 communicably connected to the remote device management apparatus 10 (an example of the management apparatus). The management system 2 stores the personal data definition (an example of the confidential data definition information) indicating a specific item including the personal information (an example of the confidential information) among the data items included in the device event data in the storage unit 1000, and adds the personal data information indicating the personal information (an example of the confidential data information) to the data of specific item included in the personal data definition among the device event data. Thereby, the management system 2 can identify the data corresponding to the personal information among the device event data by adding the personal data information to the item corresponding to the personal information to the device event data. In addition, it is possible to delete just the data of the item to which the personal data information is added.

Further, the management system according to the embodiments of the present disclosure updates the personal data definition (an example of the confidential data definition information) and transmits the updated personal data definition to the device 50. Thereby, the management system 2 can flexibly update the personal data definition used for identifying the personal information by the operation of the system administrator. The device 50 can execute the process of providing personal data information using the personal data definition updated by the management system 2.

Further, the server system 4 according to the embodiments of the present disclosure includes the management system 2 and the device information utilization apparatus 90 (an example of the data processing apparatus) communicably connected to the management system 2. The device information utilization apparatus 90 receives the device event data from the management system 2 and transmits the received device event data to the other device information utilization apparatus 90. Then, the device information utilization apparatus 90 transmits, to the management system 2, the processing history information indicating the history of the transmission of the device event data to the other device information utilization apparatuses 90. Thereby, the server system 4 can identify to which apparatus of the server system 4 the device information transmitted from the device 50 has been transmitted and what processing has been executed, by transmitting the processing history information from the device information utilization apparatus 90 to the personal information management apparatus 30.

The remote device management system 1 according to the embodiments of the present disclosure includes the management system 2 communicably connected to the device 50 to be managed, and the device 50 or the user terminal 60 (an example of the communication terminal). The device 50 or the user terminal 60 transmits a request to delete the device event data to the management system 2 and deletes the device event data stored in the processing apparatus (for example, the remote device management apparatus 10 or the device information utilization apparatus 90). The deletion history information indicating the deletion history is received from the management system 2. The device 50 or the user terminal 60 causes the display (for example, the panel display 240*a* or the display 108) to display the deletion history notification screen 6500 indicating the received deletion history information. Accordingly, the remote device management system 1 displays the deletion history information of the device event data transmitted from the management system 2 on the device 50 or the user terminal 60 and causes the user to confirm that the device event data has been deleted in response to the request from the user.

Further, in the remote device management system 1 according to the embodiments of the present disclosure, the device 50 or the user terminal 60 receives the data identification information for identifying the device event data and the processing content identification information for identifying the processing content for the device event data from the management system 2, and displays the processing target selection screen 6000*a* or 6000*b* (an example of the data selection screen) including the received data identification information and processing content identification information on the display, for example, the panel display 240*a* or the display 108. Then, the device 50 or the user terminal 60 accepts the selection of the device event data by using the processing target selection screen 6000*a* or 6000*b* and transmits the request to delete the selected device event data to the management system 2. Thereby, the remote device management system 1 displays the content of processing executed on the device event data on the device 50 or the user terminal 60, causes the user to select the data to be deleted while confirming the processing content, and deletes the selected data from the storage destination indicated by the processing content identification information.

The functions of the embodiments can be implemented by a computer executable program described in a legacy programming language such as an assembler, C, C++, C Java (registered trademark), an object-oriented programming language, or the like, and the program for executing the functions of the embodiments can be distributed through an electric communication line.

The programs for executing the functions of the embodiments may be stored and distributed on equipment readable recording media such as a ROM, an electrically erasable programmable read-only memory (EEPROM), an erasable programmable read-only memory (EPROM), a flash memory, a flexible disc, a compact disc-read only memory (CD-ROM), a compact disc-rewritable (CD-RW), a digital versatile disc-read only memory (DVD-ROM), a digital versatile disc-random access memory (DVD-RAM), a digital versatile disc-rewritable (DVD-RW), a Blu-ray disc, a Secure Digital (SD) card, a magneto-optical (MO) disc, and the like.

In addition, some or all of the functions of the embodiments may be mounted on a programmable device (PD) such as a field programmable gate array (FPGA) or implemented as an application specific integrated circuit (ASIC), and distributed by the recording medium as a circuit configuration data (bit stream data) downloaded to the PD in order to implement the functions of the embodiments on the PD, or as data described by Hardware Description Language (HDL), Very High Speed Integrated Circuits Hardware Description Language (VHDL), Verilog-HDL, etc. for generating circuit configuration data.

Although the management apparatus, the management system, the server system, the remote device management system, and the data deletion request method according to the embodiments of the present disclosure have been described above, the present disclosure can be modified within the scope of those skilled in the art, such as other embodiments, additions, modifications, deletions, etc., and as long as the effects of the present disclosure are exhibited in any of the embodiments, the embodiments are included in the scope of the present disclosure.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from those described above.

What is claimed is:

1. A management apparatus, comprising:
a memory that stores a plurality of instructions; and
a first processor configured to execute the plurality of instructions to:
acquire apparatus identification information for identifying a processing apparatus storing device event data indicating content of an event executed by a device to be managed from one or more processing apparatuses that process the device event data;
request deletion of the device event data to the processing apparatus identified by the acquired apparatus identification information, in response to a device event data deletion request;
store, in the memory, confidential data definition information indicating a specific item including confidential information among data items included in the device event data;
add the confidential data information for identifying the confidential information to the data of the specific item included in the confidential data definition information, among the device event data;
store, in the memory, the confidential data definition information in which the specific item differs by area;
update the confidential data definition information; and
transmit the updated confidential data definition information to the device.

2. The management apparatus of claim 1, wherein the first processor is further configured to:
receive the device event data deletion request from the device or a communication terminal; and
transmit deletion history information indicating a deletion history of the device event data stored in the processing apparatus identified by the acquired apparatus identification information to the device or the communication terminal, in response to the received device event data deletion request.

3. The management apparatus of claim 1, wherein the first processor is further configured to:
receive a request to move the device event data from the device or the communication terminal; and
transmit move history information indicating a move history of the device event data stored in the processing apparatus identified by the acquired apparatus identification information to the device or the communication terminal in response to the received request to move the device event data.

4. The management apparatus of claim 1, wherein the first processor is further configured to:
receive a device event data transfer request to transfer the device event data from the device or the communication terminal; and
transmit transfer history information indicating a transfer history of the device event data stored in the processing apparatus identified by the acquired apparatus identification information to the device or the communication terminal in response to the received device event data transfer request.

5. A management system, comprising:
a remote device management apparatus communicably connected to a device to be managed; and
a management apparatus communicably connected to the remote device management apparatus, the management apparatus including:
a first memory that stores a plurality of instructions; and
a first processor configured to execute the plurality of instructions to:
acquire apparatus identification information for identifying a processing apparatus storing device event data indicating content of an event executed by the device to be managed, from one or more processing apparatuses that process the device event data;
request deletion of the device event data to the processing apparatus identified by the acquired apparatus identification information, in response to a device event data deletion request;
store, in the first memory, confidential data definition information indicating a specific item including confidential information among data items included in the device event data;
add the confidential data information for identifying the confidential information to the data of the specific item included in the confidential data definition information, among the device event data;
store, in the first memory, the confidential data definition information in which the specific item differs by area;
update the confidential data definition information; and
transmit the updated confidential data definition information to the device.

6. A server system, comprising:
the management system of claim 5; and
a data processing apparatus communicably connected to the management system, the data processing apparatus including:
a second memory that stores a second plurality of instructions; and
a second processor that executes the second plurality of instructions to:
receive device event data from the management system;
process the received device event data to be transmitted to a not her data processing apparatus; and
transmit processing history information indicating a transmission history of the device event data to the other data processing apparatus, to the management system.

7. The server system of claim 6, wherein the second processor is further configured to:
process the device event data to be stored in the second memory included in the data processing apparatus; and
transmit the processing history information indicating a process history in which the device event data is stored in the second memory included in the data processing apparatus to the management system.

8. A remote device management system, comprising:
the management system of claim 5 communicably connected to a device to be managed; and
the device or a communication terminal.

9. The remote device management system of claim 8, wherein the device or the communication terminal comprises:
a second memory that stores a second plurality of instructions; and
a second processor that executes the second plurality of instructions to:
transmit the device event data deletion request to the management system;

receive deletion history information indicating a deletion history of device event data stored in the processing apparatus from the management system; and display on a display, a deletion history notification screen indicating the received deletion history information.

10. The remote device management system of claim 9, wherein the second processor is further configured to:

receive data identification information for identifying the device event data and processing content identification information for identifying a processing content for the device event data from the management system; and display on the display, a data selection screen including the received data identification information and the received processing content identification information.

11. The remote device management system of claim 10, wherein the second processor is further configured to:

accept a selection of device event data identified by the data identification information, using the data selection screen displayed on the display; and transmit a deletion request of the selected device event data to the management system.

12. A data deletion request method, comprising:

acquiring apparatus identification information for identifying a processing apparatus storing device event data, from one or more processing apparatuses that process device event data indicating content of an event executed by a device to be managed;

requesting deletion of the device event data to the processing apparatus identified by the acquired apparatus identification information, in response to a device event data deletion request;

storing confidential data definition information indicating a specific item including confidential information among data items included in the device event data;

adding the confidential data information for identifying the confidential information to the data of the specific item included in the confidential data definition information, among the device event data;

storing the confidential data definition information in which the specific item differs by area;

updating the confidential data definition information; and transmitting the updated confidential data definition information to the device.

* * * * *